(12) United States Patent
Nakayoshi et al.

(10) Patent No.: US 8,248,549 B2
(45) Date of Patent: *Aug. 21, 2012

(54) LIQUID CRYSTAL DISPLAY DEVICE, DISPLAY DEVICE AND MANUFACTURING METHOD THEREOF

(75) Inventors: Yoshiaki Nakayoshi, Ooamishirasato (JP); Kazuhiko Yanagawa, Mobara (JP)

(73) Assignees: Hitachi Displays, Ltd., Chiba-ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,735

(22) Filed: Dec. 7, 2010

(65) Prior Publication Data

US 2012/0019747 A1   Jan. 26, 2012

Related U.S. Application Data

(60) Continuation of application No. 12/292,728, filed on Nov. 25, 2008, now Pat. No. 7,872,696, which is a division of application No. 11/976,884, filed on Oct. 29, 2007, now Pat. No. 7,605,876, which is a division of application No. 11/409,076, filed on Apr. 24, 2006, now Pat. No. 7,307,673, which is a division of application No. 11/211,574, filed on Aug. 26, 2005, now Pat. No. 7,423,701, which is a division of application No. 10/237,911, filed on Sep. 10, 2002, now Pat. No. 6,970,222.

(30) Foreign Application Priority Data

Oct. 15, 2001   (JP) .................. 2001-317147

(51) Int. Cl.
*G02F 1/1343*   (2006.01)

(52) U.S. Cl. .............................. 349/39; 349/38; 349/111
(58) Field of Classification Search .................. None
See application file for complete search history.

(56) References Cited

U.S. PATENT DOCUMENTS

| | | |
|---|---|---|
| 5,060,036 A | 10/1991 | Choi |
| 5,185,601 A | 2/1993 | Takeda et al. |
| 5,686,980 A | 11/1997 | Hirayama et al. |
| 5,745,207 A | 4/1998 | Asada et al. |
| 5,771,082 A | 6/1998 | Chaudet et al. |
| 5,914,762 A | 6/1999 | Lee et al. |
| 5,946,066 A | 8/1999 | Lee et al. |

(Continued)

FOREIGN PATENT DOCUMENTS

CN   1242854 A   8/1998

(Continued)

OTHER PUBLICATIONS

JPO Office Action dated Apr. 8, 2008, in Japanese.

(Continued)

*Primary Examiner* — Lucy Chien
(74) *Attorney, Agent, or Firm* — Stites & Harbison, PLLC; Juan Carlos A. Marquez, Esq

(57) ABSTRACT

Image display device having an electrode forming layer which includes a plurality of gate lines, a plurality of drain lines, a plurality of switching elements and the a plurality of pixel electrodes, and having reference electrode layer between the electrode forming layer and a substrate where the electrode forming layer formed thereon, and the reference electrode layer and the electrode forming layer are insulated by insulating layer.

16 Claims, 63 Drawing Sheets

U.S. PATENT DOCUMENTS

| | | |
|---|---|---|
| 6,233,034 B1 | 5/2001 | Lee et al. |
| 6,256,081 B1 | 7/2001 | Lee et al. |
| 6,266,116 B1 | 7/2001 | Ohta et al. |
| 6,285,429 B1 | 9/2001 | Nishida et al. |
| 6,335,148 B2 | 1/2002 | Lee et al. |
| 6,356,330 B1 | 3/2002 | Ando et al. |
| 6,362,858 B1 | 3/2002 | Jeon et al. |
| 6,380,672 B1 | 4/2002 | Yudasaka |
| 6,404,470 B1 | 6/2002 | Kim et al. |
| 6,456,351 B1 | 9/2002 | Kim et al. |
| 6,469,765 B1 | 10/2002 | Matsuyama et al. |
| 6,493,046 B1 | 12/2002 | Ueda |
| 6,556,265 B1 | 4/2003 | Murade |
| 6,580,487 B1 | 6/2003 | Kim et al. |
| 6,587,162 B1 | 7/2003 | Kaneko et al. |
| 6,597,413 B2 | 7/2003 | Kurashina |
| 6,600,542 B2 | 7/2003 | Kim et al. |
| 6,611,310 B2 | 8/2003 | Kurahashi et al. |
| 6,639,640 B1 | 10/2003 | Matsuoka et al. |
| 6,646,707 B2 | 11/2003 | Noh et al. |
| 6,661,476 B1 | 12/2003 | Abe et al. |
| 6,667,790 B2 | 12/2003 | Yanagawa et al. |
| 6,671,019 B1 | 12/2003 | Petschek et al. |
| 6,721,028 B2 | 4/2004 | Kim et al. |
| 6,724,444 B2 | 4/2004 | Ashizawa et al. |
| 6,784,964 B2 | 8/2004 | Nakayoshi et al. |
| 2002/0041354 A1 | 4/2002 | Noh et al. |
| 2002/0048500 A1 | 4/2002 | Hermann et al. |
| 2003/0071952 A1 | 4/2003 | Yoshida et al. |
| 2003/0086045 A1 | 5/2003 | Ono et al. |

FOREIGN PATENT DOCUMENTS

| | | |
|---|---|---|
| JP | 2000-08408 | 9/1998 |
| JP | 2001-228493 | 12/2000 |
| JP | 3591513 | 4/2001 |

OTHER PUBLICATIONS

Chinese Office Action dated May 9, 2008 regarding Chinese patent application No. 2007100057283 in Chinese.

LIQUID CRYSTAL DISPLAY DEVICE, DISPLAY DEVICE AND MANUFACTURING METHOD THEREOF

CROSS-REFERENCE TO RELATED APPLICATION

This application is a Continuation of U.S. application Ser. No. 12/292,728 filed Nov. 25, 2008 now U.S. Pat. No. 7,872,696, which is a Divisional of U.S. application Ser. No. 11/976,884 filed Oct. 29, 2007 now U.S. Pat. No. 7,605,876, which is a Divisional of U.S. application Ser. No. 11/409,076 filed Apr. 24, 2006 now U.S. Pat. No. 7,307,673, which is a Divisional of U.S. application Ser. No. 11/211,574 filed Aug. 26, 2005 now U.S. Pat. No. 7,423,701, which is a Divisional of U.S. application Ser. No. 10/237,911 filed Sep. 10, 2002 now U.S. Pat. No. 6,970,222. Priority is claimed based on U.S. application Ser. No. 12/292,728 filed Nov. 25, 2008, which claims priority of U.S. application Ser. No. 11/976,884 filed Oct. 29, 2007, which claims priority of U.S. application Ser. No. 11/409,076 filed on Apr. 24, 2006, which claims priority of U.S. application Ser. No. 12/292,728 filed Nov. 25, 2008, which claims priority to U.S. application Ser. No. 11/211,574 filed Aug. 26, 2005, which claims priority to U.S. application Ser. No. 10/237,911 filed Sep. 10, 2002, which claims priority to Japanese Patent Application No. 2001-317147 filed on Oct. 15, 2001, and which is hereby incorporated by reference.

BACKGROUND OF THE INVENTION

1. Field of the Invention

The present invention relates to a liquid crystal display device, and more particularly to an active matrix type liquid crystal display device which can reduce holding capacity for holding lighting of pixels for a given time and feeding resistance thereof thus enhancing numerical aperture.

2. Description of the Related Art

An active matrix type liquid crystal display device generally adopts a system in which liquid crystal is sandwiched between a pair of substrates which face each other in an opposed manner and pixels are selected by pixel electrodes which are driven by a large number of switching elements represented by thin film transistors formed on one of the above-mentioned pair of substrates. One type of the liquid crystal display device adopting such a system is a so-called vertical field type in which on the other substrate (second substrate) which faces one substrate (first substrate) of the above-mentioned pair of substrates, color filters and common electrodes are formed or the color filters are also formed on the first substrate.

As another system, there exists a so-called IPS system in which counter electrodes which correspond to the common electrodes are formed on the above-mentioned first substrate side. Also with respect to this system, there has been known a system which forms color filters on either the first substrate side or the second substrate side.

The vertical field type liquid crystal display device includes a plurality of gate lines which extend in the first direction (usually horizontal scanning direction) and are arranged parallel to each other and a plurality of drain lines which extend in the second direction which crosses the gate lines (usually vertical scanning direction) and are arranged parallel to each other. The liquid crystal display device further includes switching elements such as thin film transistors or the like in the vicinity of respective crossing portions of the gate lines and drain lines and pixel electrodes which are driven by the switching elements.

In this vertical field type liquid crystal display device, the common electrodes are formed on the second substrate such that the common electrodes face the pixel electrodes in an opposed manner, an electric field is generated between the common electrodes and the selected pixel electrodes in the direction which approximately crosses a surface of the substrate at a right angle, and lighting of the pixels is performed by changing the orientation of liquid crystal molecules sandwiched between the pixel electrode and the common electrodes.

On the other hand, in the IPS type liquid crystal display device, gate lines, drain lines, and switching elements similar to those of the vertical field type liquid crystal display device are formed on an inner surface of the above-mentioned first substrate, comb-shaped pixel electrodes are formed on the same substrate, and counter electrodes are formed close to the pixel electrodes on the same substrate. Then, an electric field is generated between the selected pixel electrodes and the counter electrodes in the direction approximately parallel to a surface of the substrate, and lighting of the pixels is performed by changing the orientation direction of liquid crystal molecules arranged between the pixel electrodes and the counter electrodes. As a liquid crystal display device which has developed this type, there exists a liquid crystal display device which adopts a matted electrode as the counter electrodes and forms comb-shaped pixel electrodes as a layer above or below the counter electrodes.

In both of the above-mentioned type liquid crystal display devices, the charge storing capacity for holding the lighting time of the pixels which are lit due to selection at a given value (hereinafter, simply referred to as "holding capacity") is formed in regions where the pixel electrodes and the gate lines are overlapped or regions, where other electrode lines which are formed such that the other electrode lines transverse the pixel electrode forming region and the pixel electrodes, and feeding paths for storing charge in the holding capacity is formed of either the gate lines or the above-mentioned electrode lines.

SUMMARY OF INVENTION

In this manner, one electrode which forms the holding capacity is a linear electrode and the feeding is limited to one direction (extending direction of the electrode) and hence, the feeding resistance is large. Further, corresponding to the increase of the distance between the electrode and a feeding end, the voltage drop is remarkably increased so that there arises a case that the required charge cannot be fed. Further, since the above-mentioned gate line usually crosses the drain line, a crossing capacity is increased. As a result, this has been one of causes which make the rapid driving of liquid crystal display device difficult. As a countermeasure to cope with such a problem, there has been proposed a liquid crystal display device which uses the above-mentioned other electrode line. However, when the holding capacity is formed in the pixel electrode forming region, numerical aperture is reduced as a matter of course.

Further, along with the demand for high definition, the size of pixels per one pixel is reduced so that there has been a task that it is difficult to form the sufficient holding capacity.

Further, although it is effective to reduce the size of the holding capacity to enhance the numerical aperture, this brings about the reduction of the holding capacity. That is, there has been a task that there exists a trade-off relationship between the enhancement of numerical aperture and the assurance of holding capacity.

Accordingly, it is an object of the present invention to provide an active matrix liquid crystal display device which can reduce resistance of feeding electrodes which constitute holding capacities. It is another object of the present invention to provide a rapid driving active matrix type liquid crystal display device having high brightness by obviating the reduction of numerical aperture of pixels.

It is still another object of the present invention to realize an active matrix type liquid crystal display device which can satisfy both of the assurance of holding capacity and the enhancement of numerical aperture simultaneously.

Other objects and advantages of the present invention will be apparent from the explanation made hereinafter.

The typical constitution of the present invention lies in that on a switching element forming substrate of the liquid crystal display device, a transparent conductive layer (reference layer) having a large area which covers at least a major portion or a whole area of a pixel electrode forming region is formed, and switching elements (active elements), other electrodes and lines are formed over the transparent conductive layer by way of an insulation layer. Due to such a constitution, the feeding resistance with respect to the holding capacity can be largely reduced. Further, a trade-off between the enhancement of numerical aperture and the increase of holding capacity can be eliminated. Representative constitutions of the present invention are described hereinafter.

1)
In a liquid crystal display device in which liquid crystal is sandwiched between a first substrate and a second substrate which face each other in an opposed manner, and at least a plurality of gate lines which extend in the first direction and are arranged parallel to each other, a plurality of drain lines which extend in the second direction which crosses the gate lines and are arranged parallel to each other, a plurality of switching elements which are arranged at crossing portions of the gate lines and the drain lines, and pixel electrodes which are driven by the switching elements are formed on an inner surface of the first substrate, having an electrode forming layer which include the gate lines, the drain lines, the switching elements and the pixel electrodes, having a reference electrode layer arranged between the first substrate and the electrode forming layer with first insulation layer between the reference electrode layer and the electrode forming layer, and holding capacities of the pixels are formed between the pixel electrodes and the reference electrode layer.

Due to such a constitution, the feeding resistance with respect to the storage capacity is largely reduced so that it is possible to realize the liquid crystal display device which can realize both of the enhancement of numerical aperture of pixels and the assurance of holding capacity.

(2)
In the constitution (1), the electrode forming layer includes the gate lines, a gate insulation layer, the semiconductor layers, the drain lines, a passivation layer and the pixel electrodes in this order over the first insulation layer, and the holding capacity of the pixel is formed between the pixel electrodes and the reference electrode layer.

Since the holding capacity is constituted of the passivation layer, the gate insulation layer and the first insulation layer which are formed between the pixel electrode and the reference electrode layer, the distance to the reference electrode layer as viewed from the liquid crystal layer can be largely increased so that the influence of the electric field of the reference electrode layer on the electric field for driving liquid crystal can be attenuated.

3)
In the constitution (1), the reference electrode layer is arranged in the extension direction of the gate lines such that the reference electrode layer is arranged parallel to the gate lines and overlaps regions where the pixel electrodes are formed.

Due to such a constitution, the parasitic capacity between the gate line and the reference electrode layer can be reduced and the potential can be made stable.

(4)
In the constitution (1), the reference electrode layer is provided to a region of the first substrate which includes regions in which the gate lines, the drain lines and the pixel electrodes are formed.

Due to such a constitution, the reference electrode layer forms a so-called matted electrode so that the feeding resistance can be further reduced and the limitation imposed on the feeding direction can be eliminated.

(5)
In the constitution (1), the passivation layer is formed over the gate insulation layer, the pixel electrodes are formed over the passivation layer, and the whole or a portion of the pixel electrodes penetrate the passivation layer and are brought into contact with the gate insulation layer.

Due to such a constitution, holding capacity formed between the conductive layers and the pixel electrodes can be adjusted by changing the area that the pixel electrodes penetrate the passivation layer.

(6)
In the constitution (1), the passivation layer is formed over the gate insulation layer, the pixel electrodes are formed over the passivation layer, and the whole or a portion of the pixel electrodes in the pixel regions penetrate the passivation layer and the gate insulation layer and are brought into contact with the first insulation layer.

Due to such a constitution, holding capacity formed between the reference electrode layer and the pixel electrodes can be adjusted by changing the area that the pixel electrodes penetrate the passivation layer and the gate insulation layer.

(7)
In the constitution (1), the passivation layer is formed over the gate insulation layer, the pixel electrodes are formed over the passivation layer, and the switching elements include source electrodes on the gate insulation layer which are connected to the pixel electrodes via through holes formed in the passivation layer and extension portions which extend along the gate lines or the drain lines at one portions of the source electrodes.

Due to such a constitution, holding capacity can be adjusted by changing the length or the width of the extension portions of the source electrodes, that is, by changing the area that the source electrodes overlap the pixel electrodes.

(8)
In the constitution (1), the first insulation layer is formed of an organic insulation layer.

Due to such a constitution, the electric distance between the reference electrode layer and the electrode forming layer can be increased compared to a case in which the insulation layer is provided. Further, parasitic capacity between the reference electrode layer and the gate lines as well as the drain lines can be reduced.

(9)
In the constitution (1), the liquid crystal display device includes a light shielding layer which perform light shielding of gaps defined between the vicinities in the extension direction of the drain lines and the pixel electrodes.

Due to such a constitution, leaking of light can be prevented.

(10)

In the constitution (1), common electrodes which constitute pixels together with the pixel electrodes are formed on an inner surface of the second substrate.

(11)

In a liquid crystal display device in which liquid crystal is sandwiched between a first substrate and a second substrate which face each other in an opposed manner, and at least a plurality of gate lines which extend in the first direction and are arranged parallel to each other, a plurality of drain lines which extend in the second direction which crosses the gate lines and are arranged parallel to each other, a plurality of switching elements which are arranged at crossing portions of the gate lines and the drain lines, and pixel electrodes which are driven by the switching elements are formed on an inner surface of the first substrate, having an electrode forming layer which include the gate lines, the drain lines, the switching elements and the pixel electrodes, having a reference electrode layer arranged between the first substrate and the electrode forming layer with first insulation layer between the reference electrode layer and the electrode forming layer, and the electrode forming layer includes the gate insulation layer, the passivation layer, a second insulation layer and the pixel electrodes in this order over the first insulation layer, and holding capacities of the pixels are formed between the pixel electrodes and the reference electrode layer.

Due to such a constitution, the numerical aperture of the pixels can be enhanced. Since the area of the conductive layers is large, the feeding resistance can be reduced. Further, since the holding capacity is formed by the passivation layer, the gate insulation layer and the first insulation layer which are formed between the pixel electrodes and the reference electrode layer, the holding capacity can be easily controlled. Further, since the organic insulation layer is also formed over the switching elements, the pixel electrodes and the drain lines can overlap each other so that the numerical aperture is further enhanced. When the pixel electrodes and the drain lines overlap each other, it is possible to eliminate light shielding layers between the vicinities of the extension direction of the drain lines and the pixel electrodes so that the numerical aperture is further enhanced.

(12)

In the constitution (11), the reference electrode layer is arranged in the extension direction of the gate lines such that the reference electrode layer is arranged parallel to the gate lines and overlaps regions where the pixel electrodes are formed.

Due to such a constitution, the capacity between the gate lines and the reference electrode layers can be reduced so that the increase of holding capacity can be suppressed and the potential can be made stable.

(13)

In the constitution (11), the reference electrode layer is provided to a region of the first substrate which includes regions in which the gate lines, the drain lines and the pixel electrodes are formed.

Due to such a constitution, the reference electrode layer forms a so-called matted electrode so that the feeding resistance can be further reduced and the limitation imposed on the feeding direction can be eliminated.

(14)

In the constitution (11), the first organic insulation layer is formed of color filters.

Due to such a constitution, the numerical aperture of the pixels is enhanced. Since the area of the conductive layers is large, the feeding resistance can be reduced. Further, since the holding capacity is formed by the passivation layer, the gate insulation layer and the color filter layer which is made of organic material and exhibits small dielectric constant between the pixel electrodes and the reference electrode layer, the increase of parasitic capacity between lines can be suppressed. Still further, since the color filter layer is formed over the first substrate, the tolerance of alignment of the first substrate with the second substrate is increased.

(15)

In the constitution (14), the reference electrode layer is arranged in the extension direction of the gate lines such that the reference electrode layer is arranged parallel to the gate lines and overlaps regions where the pixel electrodes are formed.

Due to such a constitution, the capacity between the gate lines and the conductive layer can be reduced and the potential can be made stable.

(16)

In the constitution (14), the reference electrode layer is provided to a region of the first substrate which includes regions in which the gate lines, the drain lines and the pixel electrodes are formed.

Due to such a constitution, the reference electrode layer forms a so-called matted electrode so that the feeding resistance can be further reduced and the limitation imposed on the feeding direction can be eliminated.

(17)

In the constitution (11), the first insulation layer is an organic insulation layer.

Due to such a constitution, the electric distance between the reference electrode layer and the electrode forming layer can be increased compared to a case in which the insulation layer is provided. Further, the parasitic capacity between the reference electrode layer and the gate line as well as the drain line can be reduced.

(18)

In the constitution (11), the liquid crystal display device includes a light shielding layer which performs light shielding of gaps defined between the vicinities in the extension direction of the drain lines and the pixel electrodes.

Due to such a constitution, leaking of light can be prevented.

(19)

In the constitution (11), common electrodes which constitute pixels together with the pixel electrodes are formed on an inner surface of the second substrate.

(20)

In a liquid crystal display device in which liquid crystal is sandwiched between a first substrate and a second substrate which face each other in an opposed manner, and at least a plurality of gate lines which extend in the first direction and are arranged parallel to each other, a plurality of drain lines which extend in the second direction which crosses the gate lines and are arranged parallel to each other, a plurality of switching elements which are arranged at crossing portions of the gate lines and the drain lines, and pixel electrodes which are driven by the switching elements are formed on an inner surface of the first substrate, and pixel regions are formed of a plurality of pixel electrodes, having an electrode forming layer which include the gate lines, the drain lines, the switching elements and the pixel electrodes, having a reference electrode layer arranged between the first substrate and the electrode forming layer with first insulation layer between the reference electrode layer and the electrode forming layer, and the electrode forming layer includes the gate insulation layer, the passivation layer and the pixel electrode in this order over the first insulation layer and further includes a capacitive electrode layer which is formed over the first insulation layer and is connected to the pixel electrodes, and holding capacities of the pixels are formed among the pixel electrodes, the reference electrode layer and the capacitive electrode layer.

Due to such a constitution, the numerical aperture of the pixels can be enhanced. Since the area of the conductive layers is large, the feeding resistance can be reduced. Further, since the holding capacity can be adjusted by changing the area and size of the capacitive electrode layer, it is possible to realize both of the enhancement of numerical aperture and the assurance of holding capacity. Still further, when the organic insulation layer is formed between the passivation layer and the pixel electrodes, it is possible to make the pixel electrodes and the drain lines overlap each other and hence, the numerical aperture is further enhanced. When the pixel electrodes and the drain lines overlap each other, it is possible to eliminate light shielding layers between the vicinities of the extension direction of the drain lines and the pixel electrodes so that the numerical aperture is further enhanced.

(21)

In the constitution (20), the reference electrode layer is arranged in the extension direction of the gate lines such that the reference electrode layer is arranged parallel to the gate lines and overlaps regions where the pixel electrodes are formed.

Due to such a constitution, the capacity between the gate lines and the reference electrode layer can be reduced and the potential can be made stable.

(22)

In the constitution (20), the reference electrode layer is provided to a region of the first substrate which includes regions in which the gate lines, the drain lines and the pixel electrodes are formed.

Due to such a constitution, the reference electrode layer forms a so-called matted electrode so that the feeding resistance can be further reduced and the limitation imposed on the feeding direction can be eliminated.

(23)

In the constitution (20), the switching elements include source electrodes over the gate insulation layer which are connected to the pixel electrodes via through holes formed in the passivation layer, and the capacitive electrode layer is connected to the source electrodes and is provided to regions of the pixel electrodes.

Due to such a constitution, the holding capacity can be adjusted by changing the size of the capacitive electrode layer.

(24)

In the constitution (20), the first insulation layer is formed of color filters.

Due to such a constitution, the numerical aperture of the pixels can be enhanced. Since the area of the conductive layers is large, the feeding resistance can be reduced. Further, since the color filter layer is formed over the first substrate, the tolerance of alignment of the first substrate with the second substrate can be increased.

(25)

In the constitution (20), the capacitive electrode layer is formed over the passivation layer, the organic insulation layer is formed over the passivation layer, the pixel electrodes are formed over the organic insulation layer and are connected to the capacitive electrode layer via through holes formed in the organic insulation layer.

Due to such a constitution, the holding capacity can be adjusted by changing the size of the capacitive electrode layer.

(26)

In the constitution (20), the capacitive electrode layer is formed over the gate insulation layer, and the pixel electrodes are connected to the capacitive electrode layer via through holes formed in the passivation layer.

Due to such a constitution, the holding capacity can be adjusted by changing the size of the capacitive electrode layer.

(27)

In the constitution (20), the capacitive electrode layer is formed over the first insulation layer, and the pixel electrodes penetrate the passivation layer and are connected to the capacitive electrode layer via through holes formed in the gate insulation layer.

Due to such a constitution, the holding capacity formed between the conductive layer and the pixel electrodes can be adjusted by changing the area that the pixel electrodes penetrate the passivation layer and the gate insulation layer.

(28)

In the constitution (20), the first insulation layer is formed of an organic insulation layer.

Due to such a constitution, the electric distance between the reference electrode layer and the electrode forming layer can be increased compared to a case in which the insulation layer is provided. Further, parasitic capacity between the reference electrode layer and the gate lines as well as the drain lines can be reduced.

(29)

In the constitution (20), the liquid crystal display device includes a light shielding layer which performs light shielding of gaps defined between the vicinities in the extension direction of the drain lines and the pixel electrodes.

Due to such a constitution, leaking of light can be prevented.

(30)

In the constitution (20), common electrodes which constitute pixels together with the pixel electrodes are formed on an inner surface of the second substrate.

(31)

In a liquid crystal display device in which liquid crystal is sandwiched between a first substrate and a second substrate which face each other in an opposed manner, and at least a plurality of gate lines which extend in the first direction and are arranged parallel to each other, a plurality of drain lines which extend in the second direction which crosses the gate lines and are arranged parallel to each other, a plurality of switching elements which are arranged at crossing portions of the gate lines and the drain lines, and pixel electrodes which are driven by the switching elements are formed on an inner surface of the first substrate, and pixel regions are formed of a plurality of pixel electrodes, the improvement is characterized in that between an electrode forming layer which is constituted of the gate lines, the drain lines, the switching elements and the pixel electrodes including the pixel regions of the first substrate and the first substrate side, a reference electrode layer which is insulated by a first insulation layer with respect to the electrode forming layer is formed, wherein having an electrode forming layer which include the gate lines, the drain lines, the switching elements and the pixel electrodes, having a reference electrode layer arranged between the first substrate and the electrode forming layer with first insulation layer between the reference electrode layer and the electrode forming layer, and the electrode forming layer includes the gate insulation layer, the passivation layer and the pixel electrode in this order over the first insulation layer and further includes a capacitive electrode layer which is connected to the pixel electrodes between the first insulation layer and the passivation layer, and holding capacities of the pixels are formed among the pixel electrodes, the reference electrode layer and the capacitive electrode layer.

Due to such a constitution, the numerical aperture of pixels can be enhanced. Further, since the area of the reference electrode layer is large, the feeding resistance can be reduced. Still further, the holding capacity can be adjusted by changing the area and the shape of the capacitive electrode layer.

(32)

In the constitution (31), the reference electrode layer is arranged in the extension direction of the gate lines such that the reference electrode layer is arranged parallel to the gate lines and overlaps regions where the pixel electrodes are formed.

Due to such a constitution, the capacity between the gate lines and the reference electrode layer can be reduced. The increase of parasitic capacity between lines can be suppressed. Further, the potential can be made stable.

(33)

In the constitution (31), the reference electrode layer is provided to a region of the first substrate which includes regions in which the gate lines, the drain lines and the pixel electrodes are formed.

Due to such a constitution, the reference electrode layer forms a so-called matted electrode so that the feeding resistance can be further reduced and the limitation imposed on the feeding direction can be eliminated.

(34)

In the constitution (31), the organic insulation layer is formed of color filters.

Due to such a constitution, the numerical aperture of the pixels is enhanced. Since the area of the reference electrode layers is large, the feeding resistance can be reduced. Further, since the color filters are formed of organic films, the parasitic capacitance between lines can be reduced. Still further, since the color filter layer is formed over the first substrate, the tolerance of alignment of the first substrate with the second substrate is increased.

(35)

In the constitution (31), the first insulation layer is formed of an organic insulation layer.

Due to such a constitution, the electric distance between the reference electrode layer and the electrode forming layer can be increased compared to a case in which the insulation layer is provided. Further, the parasitic capacity between the reference electrode layer and the gate lines as well as the drain lines can be reduced.

(36)

In the constitution (31), the liquid crystal display device includes a light shielding layer which performs light shielding of gaps defined between the vicinities in the extension direction of the drain lines and the pixel electrodes.

Due to such a constitution, leaking of light can be prevented.

(37)

In the constitution (31), the capacitive electrode layer is formed over the first insulation layer, and the capacitive electrode layer is connected to the reference electrode layer via through holes which penetrate the first insulation layer.

Due to such a constitution, the holding capacity formed between the reference electrode layer and the pixel electrodes can be adjusted by changing the area of the capacitive electrode layer connected to the reference electrode layer.

(38)

In the constitution (31), the capacitive electrode layer is formed over the gate insulation layer, and the capacitive electrode layer is connected to the reference electrode layer via through holes which penetrate the gate insulation layer.

Due to such a constitution, the holding capacity formed between the reference electrode layer and the pixel electrodes can be adjusted by changing the area of the capacitive electrode layer connected to the reference electrode layer.

(39)

In the constitution (31), the capacitive electrode layer is formed over the passivation layer, and the capacitive electrode layer is connected to the reference electrode layer via through holes which penetrate the passivation layer, the gate insulation layer and the first insulation layer.

Due to such a constitution, the holding capacity formed between the reference electrode layer and the pixel electrodes can be adjusted by changing the area of the capacitive electrode layer connected to the reference electrode layer.

(40)

In the constitution (31), the capacitive electrode layer is formed over the gate insulation layer, a second capacitive electrode layer is formed over the first insulation layer, the pixel electrode is connected to the capacitive electrode layer via through holes formed in the passivation layer, and the second capacitive electrode layer is connected to the reference electrode layer via through holes formed in the first insulation layer.

Due to such a constitution, the holding capacity can be easily adjusted by changing the areas of the capacitive electrode layer and the second capacitive electrode layer. Further, the holding capacity can be further increased.

(41)

In the constitution (31), the first insulation layer is formed of an organic insulation layer.

Due to such a constitution, the electric distance between the reference electrode layer and the electrode forming layer can be increased compared to a case that the insulation layer is provided. Further, the parasitic capacity among the reference electrode layer, the gate lines and the drain lines can be reduced.

(42)

In the constitution (31), the liquid crystal display device includes a light shielding layer which performs light shielding of gaps defined between the vicinities in the extension direction of the drain lines and the pixel electrodes.

Due to such a constitution, leaking of light can be prevented.

(43)

In the constitution (31), common electrodes which constitute pixels together with the pixel electrodes are formed on an inner surface of the second substrate.

(44)

In a liquid crystal display device in which liquid crystal is sandwiched between a first substrate and a second substrate which face each other in an opposed manner, and at least a plurality of gate lines which extend in the first direction and are arranged parallel to each other, a plurality of drain lines which extend in the second direction which crosses the gate lines and are arranged parallel to each other, a plurality of switching elements which are arranged at crossing portions of the gate lines and the drain lines, pixel electrodes which are driven by the switching elements, and counter electrodes which generate an electric field for driving pixels between the pixel electrodes and the counter electrodes are formed on an inner surface of the first substrate, having an electrode forming layer which include the gate lines, the drain lines, the switching elements and the pixel electrodes, having a reference electrode layer arranged between the first substrate and the electrode forming layer with first insulation layer between the reference electrode layer and the electrode forming layer, and holding capacities of the pixels are formed among the pixel electrodes and the reference electrode layer.

Due to such a constitution, the liquid crystal display device can achieve both of the large numerical aperture and the large holding capacity. Further, since it is unnecessary to increase the areas of the pixel electrodes and the lines for forming the holding capacity, the numerical aperture is enhanced. Still further, since the area of the reference electrode layer is large, the feeding resistance can be reduced.

(45)

In the constitution (44), the counter electrodes are formed over the organic insulation layer, and the counter electrodes are connected to the reference electrode layer via through holes formed in the first insulation layer.

Due to such a constitution, the area of the reference electrode layer can be increased and hence, the feeding resistance to the counter electrodes can be reduced.

(46)

In the constitution (44), the counter electrodes are formed over the gate insulation layer, and the counter electrodes are connected to the reference electrode layer via through holes formed in the gate insulation layer and the first insulation layer.

Due to such a constitution, the area of the reference electrode layer can be increased and hence, the feeding resistance can be reduced.

(47)

In the constitution (44), the counter electrodes are formed over the passivation layer, and the counter electrodes are connected to the reference electrode layer via through holes formed in the passivation layer, the gate insulation layer and the first insulation layer.

Due to such a constitution, the area of the reference electrode layer can be increased and hence, the feeding resistance can be reduced.

(48)

In the constitution (44), the reference electrode layer is arranged, in the extension direction of the gate lines such that the reference electrode layer is arranged parallel to the gate lines and overlaps regions where the pixel electrodes are formed.

Due to such a constitution, the parasitic capacity formed between the gate lines and the reference electrode layer can be reduced and the potential can be made stable.

(49)

In the constitution (44), the reference electrode layer is provided to a region of the first substrate which includes regions in which the gate lines, the drain lines and the pixel electrodes are formed.

Due to such a constitution, the reference electrode layer forms a so-called matted electrode so that the feeding resistance can be further reduced and the limitation imposed on the feeding direction can be eliminated.

(50)

In the constitution (44), the counter electrodes are formed over the first insulation layer, the counter electrodes extend to the neighboring pixel regions by crossing the drain lines and are connected to the reference electrode layers of the neighboring pixel regions via through holes formed in the first insulation layer.

Due to such a constitution, even when the through holes are formed insufficiently, the feeding of electricity is performed through the counter electrodes from the neighboring pixel sides. Further, when the through holes which connect each counter electrode and each reference electrode are formed in a plural number for every pixel, the reliability of connection between the electrode layers can be enhanced.

(51)

In the constitution (44), the counter electrodes are formed over an organic insulation layer, conductive layers which extend to the neighboring pixel regions by crossing the drain lines are formed over the gate insulation layer, the counter electrodes are connected to the conductive layers via through holes formed in the gate insulation layer, and the conductive layers are connected to the reference electrode layer via through holes formed in the first insulation layer.

Due to such a constitution, even when the through holes are formed insufficiently, the feeding of electricity is performed through the conductive layers from the neighboring pixel sides. Further, when the through holes which connect each counter electrode and each reference electrode are formed in a plural number for every pixel, the reliability of connection between the electrode layers can be enhanced.

(52)

In the constitution (44), the counter electrodes are formed over a passivation layer, conductive layers which extend to the neighboring pixel regions by crossing the drain lines are formed over the gate insulation layer, the counter electrodes are connected to the conductive layers via through holes formed in the passivation layer and the gate insulation layer, and the conductive layers are connected to the reference electrode layer via through holes formed in the first insulation layer.

Due to such a constitution, even when the through holes are formed insufficiently, the feeding of electricity is performed through the conductive layers from the neighboring pixel sides. Further, when the through holes which connect each counter electrode and each reference electrode are formed in a plural number for every pixel, the reliability of connection between the electrode layers can be enhanced.

(53)

In the constitution (44), a color filter layer is formed between the reference electrode which is formed below the first insulation layer and the first substrate.

Due to such a constitution, it is possible to isolate the color filter layer from the liquid crystal layer with the use of the reference electrodes and hence, it is possible to prevent the liquid crystal from being contaminated by constituent materials of the color filter layer.

(54)

In the constitution (44), the counter electrodes are formed over the first insulation layer parallel to the extension direction of the gate lines, the counter electrodes extends over the pixel region, and the counter electrodes are connected to the reference electrodes in respective pixel regions via through holes formed in the first insulation layer.

Due to such a constitution, holding capacity is formed at portions where the counter electrodes and the pixel electrodes overlap each other, and the gate insulation layer functions as a dielectric of the holding capacity and hence, the constitution is suitable for increasing the holding capacity.

(55)

In the constitution (44), the counter electrodes are connected to the reference electrodes in respective pixel regions via through holes formed in the first insulation layer and the gate insulation layer in a penetrating manner, and holding capacities are formed at overlapping portions of the counter electrodes and the pixel electrodes.

(56)

In the constitution (44), the pixel electrodes are formed over the gate insulation layer, the counter electrodes are formed below the gate insulation layers, the counter electrodes are connected to the reference electrodes via through holes formed in the first insulation layer, and holding capacities are formed by the counter electrodes and the pixel electrodes.

(57)

In the constitution (44), the pixel electrodes and the counter electrodes are formed on the same layer.

(58)

In the constitution (44), the counter electrodes are formed over the pixel electrodes and are connected to the reference electrodes by way of through holes formed in a gate insulation film and a first insulation film.

(59)

In the constitution (44), the first insulation layer is formed of an organic insulation layer.

(60)

In a liquid crystal display device in which liquid crystal is sandwiched between a first substrate and a second substrate which face each other in an opposed manner, and at least a plurality of gate lines which extend in the first direction and are arranged parallel to each other, a plurality of drain lines which extend in the second direction which crosses the gate lines and are arranged parallel to each other, a plurality of switching elements which are arranged at crossing portions of the gate lines and the drain lines, and pixel electrodes which are driven by the switching elements are formed on an inner surface of the first substrate, having an electrode forming layer which include the gate lines, the drain lines, the switching elements and the pixel electrodes, having a counter electrode layer arranged between the first substrate and the electrode forming layer with first insulation layer between the reference electrode layer and the electrode forming layer, and the reference electrode layer overlapped substantially all region of the pixel electrode and function as a counter electrode, and holding capacities of the pixels are formed between the pixel electrodes and the counter electrode layer.

Due to such a constitution, the feeding resistance with respect to the holding capacity can be largely reduced so that the image quality is enhanced. Further, it is possible to realize both of the enhancement of numerical aperture and the assurance of holding capacity.

(61)

In the constitution (60), the counter electrode layer is arranged in the extension direction of the gate lines such that the counter electrode layer is arranged parallel to the gate lines and overlaps regions where the pixel electrodes are formed.

Due to such a constitution, an independent reference electrode layer is unnecessary, the parasitic capacity between the gate lines and the conductive layers can be reduced, and the potential can be made stable.

(62)

In the constitution (60), the counter electrode layer is provided to a region of the first substrate which includes regions in which the gate lines, the drain lines and the pixel electrodes are formed.

Due to such a constitution, the counter electrode layer forms a so-called matted electrode so that the feeding resistance can be further reduced and the limitation imposed on the feeding direction can be eliminated.

(63)

In the constitution (60), the whole or a portion of the layer constitution of insulation layers below the pixel electrodes and the whole or a portion of the region are removed.

Due to such a constitution, the strength of electric field generated between the pixel electrodes and the counter electrodes is increased so that the driving voltage can be reduced.

(64)

In the constitution (60), over the counter electrode layer, connection lines which are arranged parallel to the extension direction of the gate lines and are connected to counter electrodes which are disposed close to the counter electrode are formed.

(65)

In the constitution (60), below the counter electrode layer, connection lines which are arranged parallel to the extension direction of the gate lines and are connected to counter electrodes which are disposed close to the counter electrode are formed.

Due to the above-mentioned constitution (64) or (65), even when the through holes are formed insufficiently, the feeding of electricity is performed through the connection lines from the neighboring pixel sides. Further, when the through holes which connect each counter electrode with each reference electrode are formed in a plural number for every pixel, the reliability of connection of the electrode layers can be enhanced.

(66)

In the constitution (60), the first insulation layer is removed at portions of the pixel regions.

Due to such a constitution, a plurality of regions which differ in driving voltage can be formed in the pixel region so that the multi-domain effect can be obtained.

(67)

In the constitution (60), a color filter layer is formed between the reference electrodes which are arranged below the first insulation layer and the first substrate.

(68)

In the constitution (60), the first insulation layer is formed of an organic insulation layer.

(69)

In the constitution (68), the organic insulation layer is formed of color filters.

(70)

In a liquid crystal display device, liquid crystal sandwiched between a first substrate and a second substrate which face each other in an opposed manner;

a plurality of gate lines which extend in the first direction and are arranged parallel to each other;

a plurality of drain lines which extend in the second direction which crosses the gate lines and are arranged parallel to each other;

a plurality of switching elements which are arranged at crossing portions of the gate lines and the drain lines;

pixel electrodes which are driven by the switching elements are formed on an inner surface of the first substrate, counter electrodes which generate an electric field for driving pixels between the pixel electrodes formed on an inner surface of the first;

having an electrode forming layer which include the gate lines, the drain lines, the switching elements and the pixel electrodes, having a reference electrode layer arranged between the first substrate and the electrode forming layer with first insulation layer between the reference electrode layer and the electrode forming layer, the electrode forming layer is formed by laminating the gate insulation layer, the passivation layer, an organic insulation layer and counter electrodes in this order over the first insulation layer, the counter electrode layer is shared by a pixel region which is arranged close to the pixel region in the extension direction of the gate lines and a pixel region which is arranged close to the pixel region in the extension direction of the drain lines, the counter electrode layer is connected to the reference electrode layer via through holes which electrically penetrate the organic insulation layer, the passivation layer, the gate insulation layer and the first insulation layer, and holding capacities of the pixels are formed between the pixel electrodes and the reference electrode layer.

(71)

In the constitution (70), the liquid crystal display device includes a capacitive electrode layer which is disposed below the pixel electrodes and is formed between the first insulation layer and the gate insulation layer, and the capacitive electrode layer is connected to the reference electrode layer via through holes.

Due to such a constitution, the holding capacity can be increased and adjusted by the capacitive electrode layer.

(72)

In the constitution (70), removing regions are formed in the first insulation layer disposed below the pixel electrodes.

Due to such a constitution, the holding capacity formed between the pixel electrode and the reference electrode layer can be increased.

(73)

In the constitution (70), the first insulation layer is formed of an organic insulation layer.

(74)

In the constitution (73), the organic insulation layer is formed of color filters.

(75)

In an image display device in which at least a plurality of gate lines which extend in the first direction and are arranged parallel to each other, a plurality of drain lines which extend in the second direction which crosses the gate lines and are arranged parallel to each other, a plurality of switching elements which are arranged at crossing portions of the gate lines and the drain lines, and pixel electrodes which are driven by the switching elements are formed on an inner surface of the first substrate, having an electrode forming layer which include the gate lines, the drain lines, the switching elements and the pixel electrodes, having a reference electrode layer arranged between the first substrate and the electrode forming layer with first insulation layer between the reference electrode layer and the electrode forming layer, and the reference electrode layer is substantially formed over the whole surface of the pixel regions and shared by a plurality of pixels.

(76)

In the constitution (75), a semiconductor layer which constitutes the switching element has crystalline property.

(77)

An image display device being characterized in that a reference electrode layer formed between a substrate and a semiconductor having crystalline property, and having insulation layer between the reference electrode layer and the semiconductor, and the reference electrode layer is formed over substantially the whole surface of a pixel region and is shared by a plurality of pixels.

(78)

In the constitution (77), the reference electrode layer is formed of a transparent electrode.

(79)

A manufacturing method of an image display device comprises at least a first step in which a reference electrode layer which is shared by a plurality of pixels is formed on a substantially whole surface of a pixel region on a substrate, a second step in which an insulation layer is formed, and a third step in which a semiconductor layer is formed in this order, and thereafter, further comprise a fourth step in which laser beams are irradiated to the semiconductor layer.

(80)

A manufacturing method of an image display device comprises at least a first step in which a reference electrode layer which is shared by a plurality of pixels is formed on a substantially whole surface of a pixel region on a substrate, a second step in which an insulation layer is formed, and a third step in which a semiconductor layer is formed in this order, and thereafter, further comprises a fourth step in which ions are implanted into the semiconductor layer.

The present invention is not limited to the above-mentioned respective constitutions and the constitutions of embodiments which will be explained later and various modifications are considered without departing from the technical concept of the present invention.

EXPLANATION OF SYMBOLS

SUB1 . . . first substrate, SUB2 . . . second substrate, CF . . . color filter, BM . . . black matrix, CT . . . common electrode (or counter electrode), LC . . . liquid crystal (or liquid crystal layer), AL . . . orientation film, PAS . . . passivation layer, O-PAS(O-PAS1, OPAS2) . . . organic insulation layer (first organic insulation layer, second organic insulation layer), SD1 . . . source electrode, SD2 . . . drain electrode, DL . . . drain line (or drain line layer), GL . . . gate line (or gate line layer), GI . . . gate insulation layer, SM . . . metal shield, ST . . . reference electrode (or reference electrode layer), PX . . . pixel electrode (or pixel electrode layer), TH (TH1, TH2) . . . through hole, AS . . . semiconductor layer, Cstg . . . holding capacity or a storage capacity, NGI . . . gate insulation layer removed region, OC . . . overcoat layer, TED . . . second reference electrode, ML . . . metal layer, XP . . . organic insulation layer removed region, CT/ST . . . counter/reference electrode layer, BL . . . backlight, FL . . . front light

DESCRIPTION OF THE PREFERRED EMBODIMENTS

Preferred embodiments of the present invention are explained in detail hereinafter in conjunction with drawings which show the embodiments.

Figure 1:
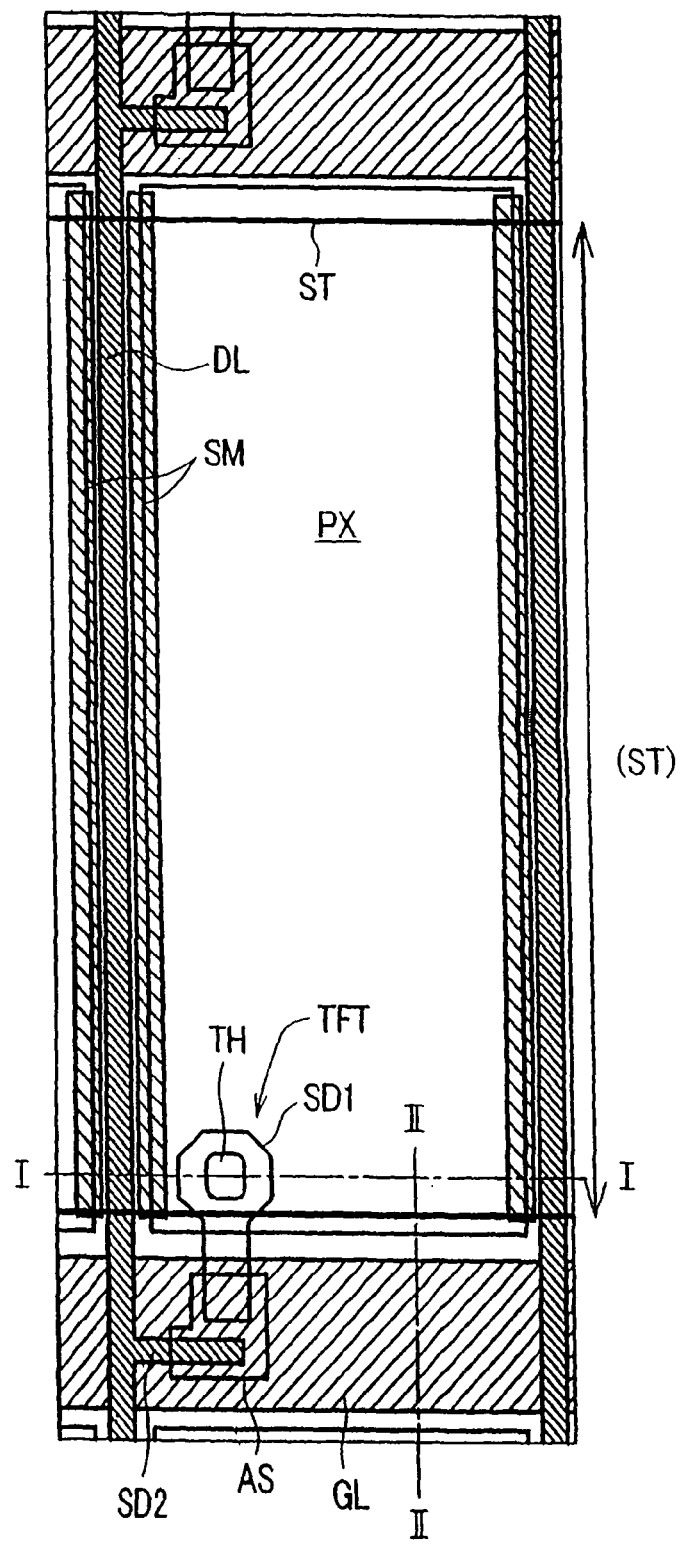
FIG. 1 is a plan view of the vicinity of one pixel of a liquid crystal display device for schematically explaining the pixel constitution of one embodiment of the present invention.

FIG. 1 is a plan view of the vicinity of one pixel of a vertical field type liquid crystal display device for schematically explaining the pixel constitution of the first embodiment of the present invention. In the drawings, reference symbol PX indicates a pixel electrode, DL indicates drain lines (video signal lines or data lines), GL indicates gate lines (scanning lines), SM indicates a light shielding film (metal shield) which performs light shielding between the pixel electrode and the drain line, ST indicates a reference electrode layer (also referred to as a conductive layer), SD1 indicates a source electrode, SD2 indicates a drain electrode, AS indicates a semiconductor layer, and TH indicates a through hole. Here, the above-mentioned gate lines, drain lines and respective electrodes are referred to as electrode layers when they are explained in conjunction with cross sections.

Figure 2:
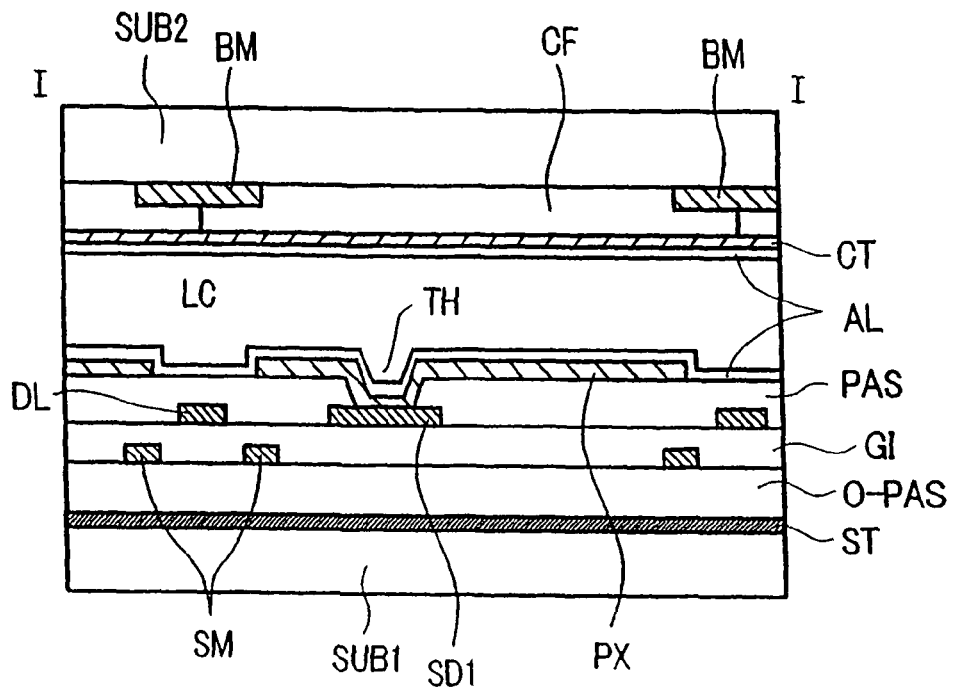
FIG. 2 is a cross-sectional view taken along a line I-I in FIG. 1.
Figure 3:
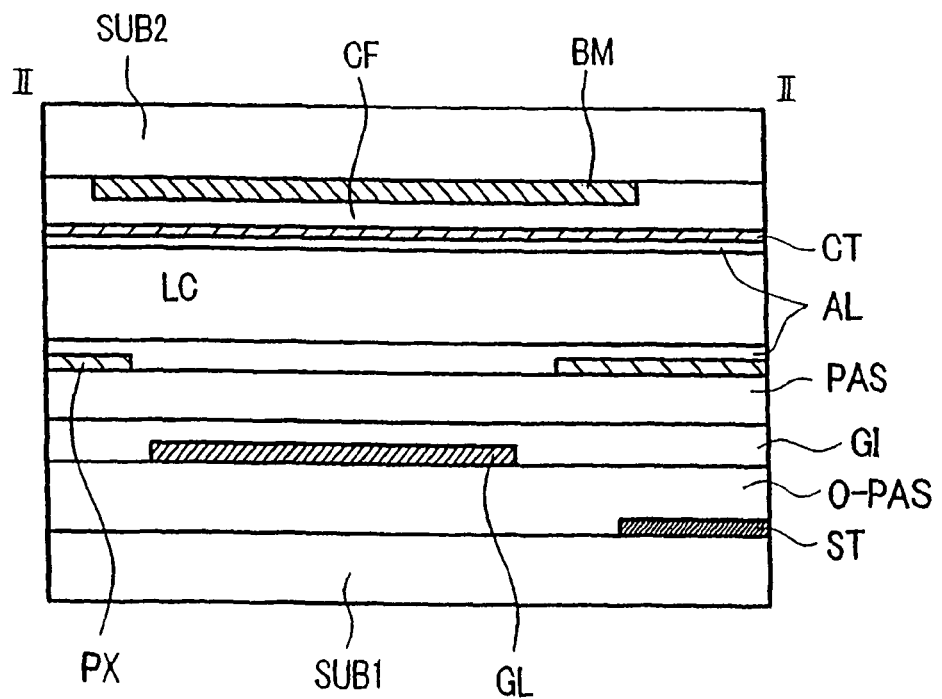
FIG. 3 is a cross-sectional view taken along a line II-II in FIG. 1.

FIG. 2 is a cross-sectional view taken along a line I-I in FIG. 1 and FIG. 3 is also a cross-sectional view taken along a line II-II in FIG. 1. Reference symbol SUB1 indicates a first substrate, ST indicates a reference electrode layer, O-PAS indicates an organic insulation layer, PAS indicates a passivation layer, AL indicates orientation films, CT indicates a common electrode, CF indicates color filters, BM indicates a black matrix, and SUB2 indicates a second substrate.

In FIG. 1 to FIG. 3, in the liquid crystal display device, liquid crystal (also referred to as a liquid crystal layer hereinafter) LC is filled in a gap defined between the first substrate SUB1 and the second substrate SUB2 which face each other in an opposed manner. On an inner surface of the first substrate SUB1, a plurality of gate lines GL which extend in the first direction and are arranged parallel to each other and a plurality of drain lines GL which extend in the second direction crossing the gate lines and are arranged parallel to each other are formed.

Thin film transistors TFT which constitute switching elements are provided to crossing portions of the gate lines GL and drain lines DL. Each thin film transistor TFT is constituted of the gate electrode which is formed of the gate line GL, the drain electrode SD2 which extends from the drain line DL, the semiconductor layer AS and the source electrode SD1. In the embodiment described hereinafter, the explanation of the thin film transistor TFT is omitted.

The source electrode SD1 of the thin film transistor TFT is connected to the pixel electrode layer PX via the through hole TH. The pixel electrode layer PX is formed on the substantially whole portion of a pixel region thus constituting a display region of the liquid crystal display device. A multi-layered portion which forms the gate line GL, the drain line DL, the thin film transistor TFT and the pixel electrode PX including the pixel regions of the first substrate SUB1 is referred to as an electrode forming layer. Between this electrode forming layer and the first substrate side SUB1, the reference electrode layer ST which insulates the electrode forming layer with the organic insulation layer O-PAS is provided.

Here, including respective embodiments which will be explained later, an inorganic insulation layer may be used in place of the organic insulation layer as O-PAS. By adopting the organic insulation layer, the parasitic capacity between the reference electrode layer and the gate line GL as well as the drain line DL can be further reduced.

With respect to the above-mentioned electrode forming layer, above the organic insulation layer O-PAS, the gate line layer GL, the gate insulation layer GI, the drain line layer DL, the thin film transistor TFT, the passivation layer PAS and the pixel electrode layer PX are formed in this order. Then, a holding capacity of the pixel (so-called Cstg) is formed between the pixel electrode layer PX and the reference electrode layer ST. That is, the holding capacity is formed between the pixel electrode layer PX and the reference electrode layer ST using the passivation layer PAS, the gate insulation layer GI and the organic insulation layer O-PAS as dielectrics. The reference electrode layer ST is formed over a wide area such that the reference electrode layer ST covers the whole pixel region.

As material of the organic insulation layer O-PAS, polysilazane can be used, for example. This material is coated using a SOG (Spin-On-Glass)method. The organic film material having low dielectric constant is effective for reducing the parasitic capacitance between lines. For example, various organic material such as, polyimide, polyamide, polyimide amide, acrylic resin, polyacrylic resin and benzocyclobutene can be used. Further, since it is necessary to make the transmission-type liquid crystal display device have the sufficient light transmitting characteristics, it is desirable to increase the light transmissivity. It is effective to utilize existing material layers to effectively enhance the light transmissivity. That is, when the color filter layers are utilized as the above-mentioned organic insulation layer, the light transmissivity is hardly impeded. To reduce the formation process of the organic insulation layer, it is desirable that the layer material has photosensitivity. The same goes for respective embodiments described later with respect to this point.

This is because that with the constitution which forms the through hole below the gate insulation layer, the number of photolithography processes can be reduced. Further, when the through hole is formed in the organic insulation layer at a position equal to the position of the through hole formed in the gate insulation layer, at the time of forming the thorough hole from the gate insulation layer or the insulation layer arranged above the gate insulation layer, patterning or collective forming which uses the upper insulation layer as a mask can be adopted and hence, it is not always necessary to make the layer material photosensitive. However, products of various constitutions are usually manufactured using the same process and the same material and hence, to produce a large kinds of products using the same manufacturing line, it is desirable to use material having photosensitivity. The same goes for respective embodiments which will be explained later with respect to this point as well.

Further, the film thickness of the organic insulation layer O-PAS can be easily set for each constitution by performing simulation based on disclosed contents of embodiments described later by those who are skilled in the art. That is, the film thickness can be calculated based on characteristics curves obtained from values on the planar structure or the cross-sectional structure of the substrates, the dielectric constant of the organic insulation layer and the like. By utilizing the calculated film thickness, the actual film thickness can be set by selecting the film thickness for each product or the range corresponding to the design concept with respect to the wiring resistance, the performance of peripheral driving circuits, using liquid crystal material, the target quality and the like. The same goes for respective embodiment which will be explained later.

Due to such a constitution, the feeding resistance with respect to the holding capacity is largely reduced so that it is possible to obtain the liquid crystal display device which satisfies both of the enhancement of the numerical aperture of the pixel and the assurance of the holding capacity. Since it is unnecessary to provide the feeding line to the pixel region, the numerical aperture of the pixel can be enhanced. Further, storage capacities can be formed by the passivation layer formed between the pixel electrode and the reference electrode layer, the gate insulation layer and the organic insulation layer which exhibits the small dielectric constant. Compared to a case in which only the organic insulation layer is formed, the distance from the liquid crystal layer to the reference electrode layer can be largely increased and hence, the influence of the electric field of the reference electrode layer to the electric field for driving the liquid crystal can be reduced.

Further, in this embodiment, the reference electrode layer ST may be configured such that the reference electrode layer ST extends parallel to the extending direction of the gate line GL and is overlapped to the region where the pixel electrode is formed. Due to such a constitution, the capacity between the gate line GL and the reference electrode layer can be reduced so that the increase of the parasitic capacity is suppressed and the potential can be stabilized.

Figure 4:
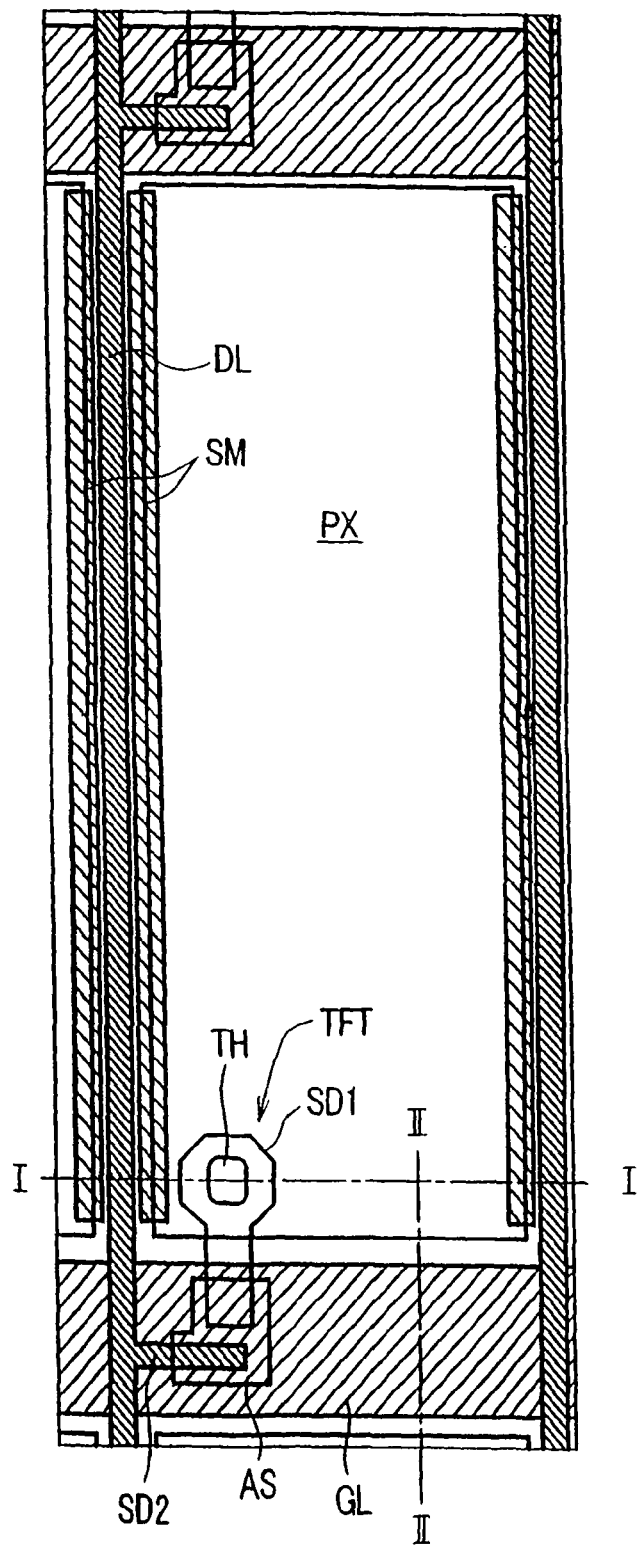
FIG. 4 is a plan view of the vicinity of one pixel of a liquid crystal display device for schematically explaining the pixel constitution of another embodiment of the present invention.
Figure 5:
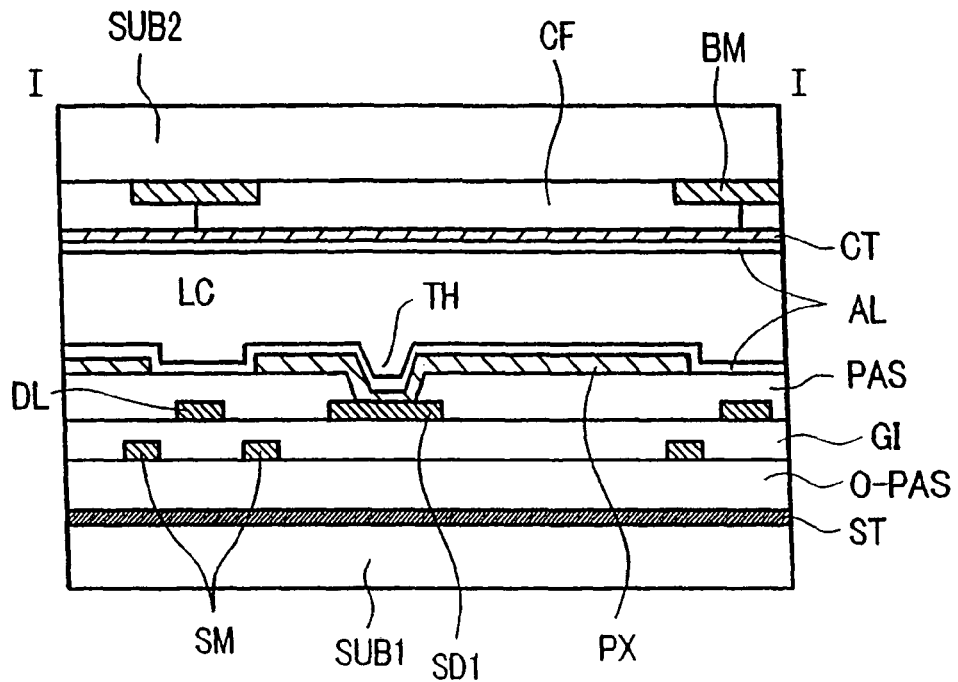
FIG. 5 is a cross-sectional view taken along a line I-I in FIG. 4.
Figure 6:
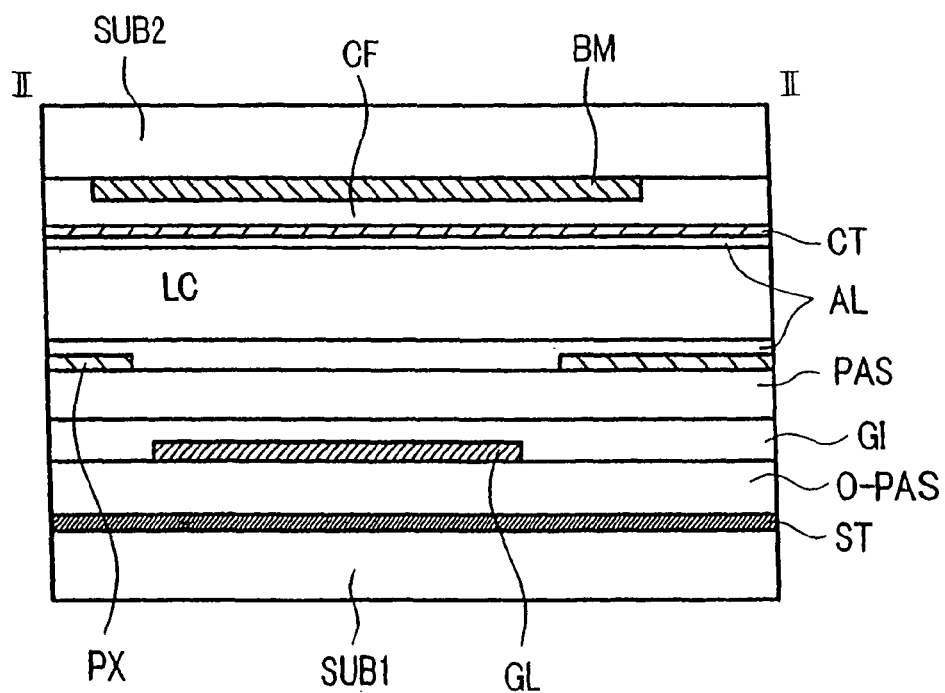
FIG. 6 is a cross-sectional view taken along a line II-II in FIG. 4.

FIG. 4 is a plan view of the vicinity of one pixel of a vertical field type liquid crystal display device for schematically explaining the pixel constitution of the second embodiment of the present invention, FIG. 5 is a cross-sectional view taken along a line I-I in FIG. 4, and FIG. 6 is a cross-sectional view taken along a line II-II in FIG. 4. Reference symbols in the drawings which are equal to those of the previous embodiment indicate identical functioning portions.

In this embodiment, the reference electrode layer ST has a region which includes regions where the gate line layer GL, the drain line DL and the pixel electrode layer PX of the first substrate SUB 1 are formed. The holding capacity is formed between the pixel electrode layer PX and the reference electrode layer ST. According to this embodiment, since the reference electrode layer ST is formed below the gate line layer GL, it is desirable to set the thickness of the organic insulation layer O-PAS to equal to or more than 1 .mu.m, for example, by taking the parasitic capacity of both electrode layers into account.

Due to such a constitution, in addition to advantageous effects similar to those of the first embodiment, since the reference electrode layer ST is formed of a so-called matted electrode, the feeding resistance can be further reduced and the limitation imposed on the feeding direction can be eliminated.

Figure 7:
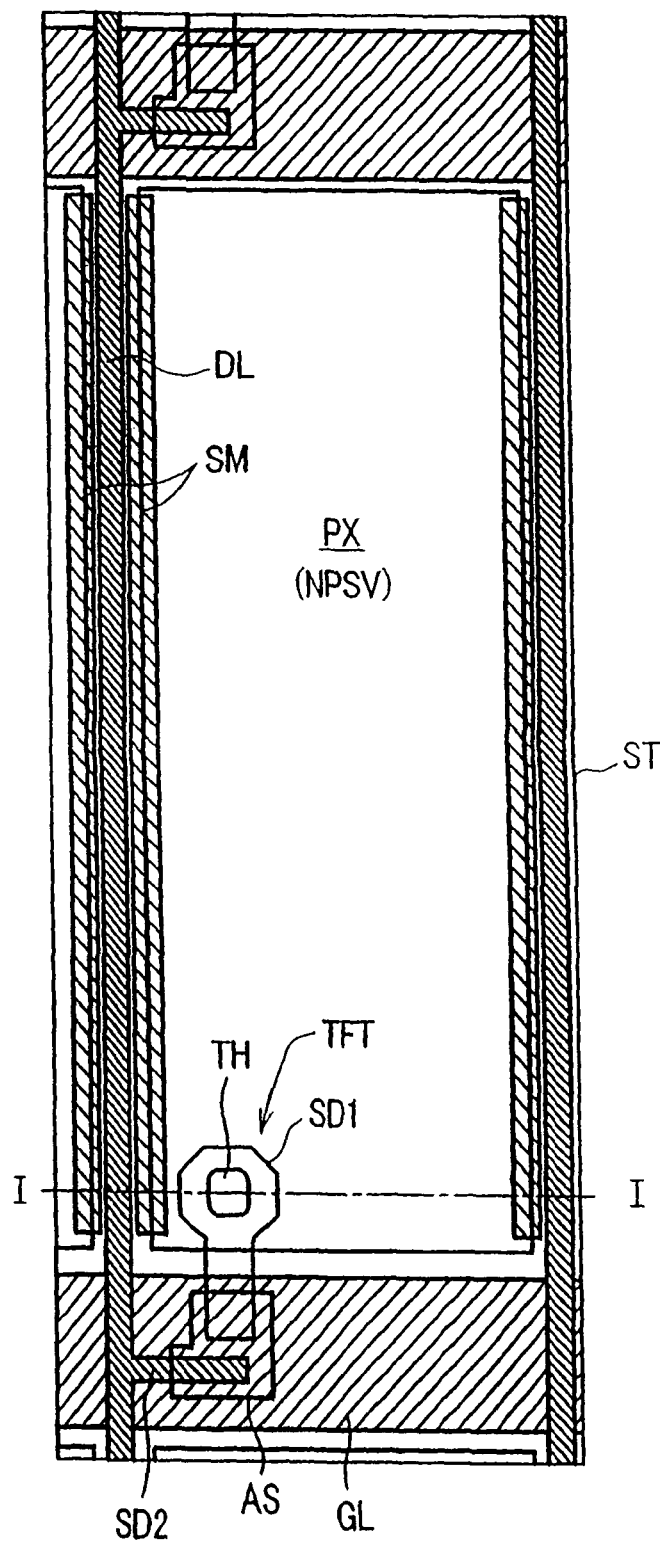
FIG. 7 is a plan view of the vicinity of one pixel of a liquid crystal display device for schematically explaining the pixel constitution of still another embodiment of the present invention.
Figure 8:
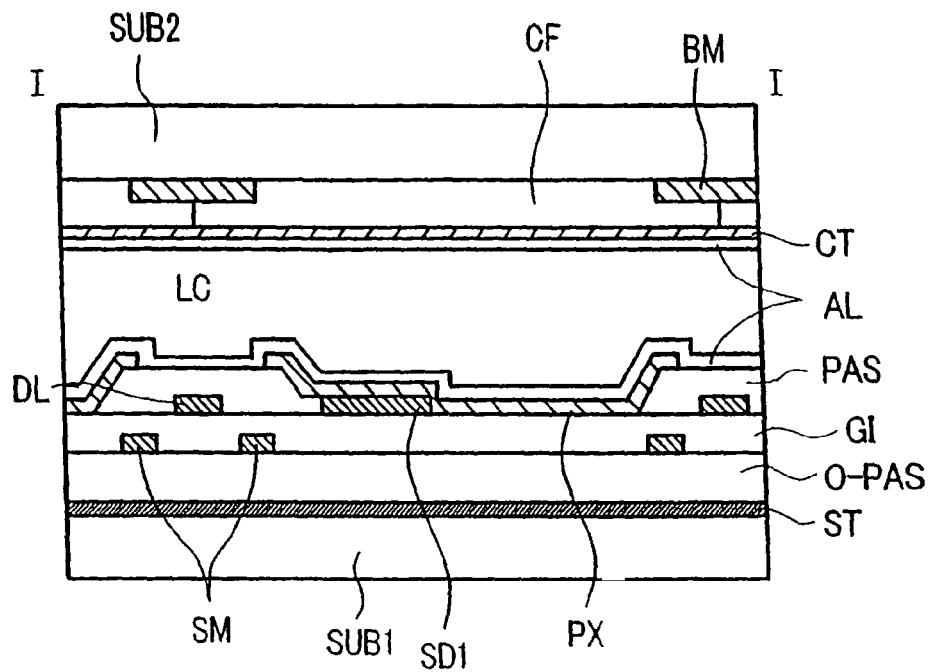
FIG. 8 is a cross-sectional view taken along a line I-I in FIG. 7.

FIG. 7 is a plan view of the vicinity of one pixel of a vertical field type liquid crystal display device for schematically explaining the pixel constitution of the third embodiment of the present invention and FIG. 8 is a cross-sectional view taken along a line I-I in FIG. 7. Reference symbols in the drawings which are equal to those of the previous embodiments indicate identical functioning portions. With respect to the pixel forming layer, over the organic insulation layer O-PAS, the gate line layer GL, the gate insulation layer GI, the drain line layer DL, the thin film transistor TFT, the passivation layer PAS and the pixel electrode PX are formed in this order. The whole or a portion of the pixel electrode PX in the pixel region penetrates the passivation layer PAS and is brought into contact with the gate insulation layer GI.

Due to such a constitution of this embodiment, in addition to the advantageous effects obtained by respective embodiments, the storage capacity formed between the reference electrode layer ST and the pixel electrode PX can be adjusted by the area of the pixel electrode PX which penetrates the passivation layer PAS.

Figure 9:
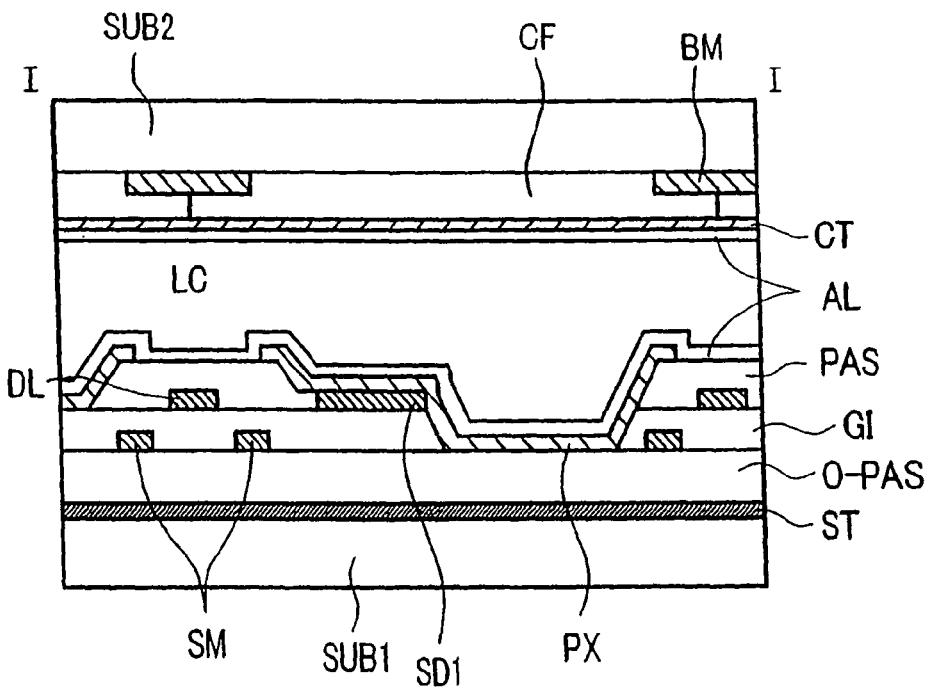
FIG. 9 is a cross-sectional view taken along a line I-I in FIG. 8 showing the vicinity of one pixel of a liquid crystal display device for schematically explaining the pixel constitution of still another embodiment of the present invention.

FIG. 9 is a cross-sectional view taken along a line I-I in FIG. 8 of the vicinity of a pixel in a vertical field type liquid crystal display device for schematically explaining the pixel constitution of the fourth embodiment of the present invention. Reference symbols in the drawings which are equal to those of the previous embodiments indicate identical functioning portions.

With respect to the pixel forming layer, over the organic insulation layer O-PAS, the gate line layer GL, the gate insulation layer GI, the drain line layer DL, the thin film transistor TFT, the passivation layer PAS and the pixel electrode PX are formed in this order. The whole or a portion of the pixel electrode PX in the pixel region penetrates the passivation layer PAS and the gate insulation layer GL and is brought into contact with the organic insulation layer O-PAS.

Due to such a constitution of this embodiment, the storage capacity formed between the reference electrode layer ST and the pixel electrode PX can be adjusted by the area of the pixel electrode PX which penetrates the passivation layer PAS and the gate insulation layer GI.

Figure 10:
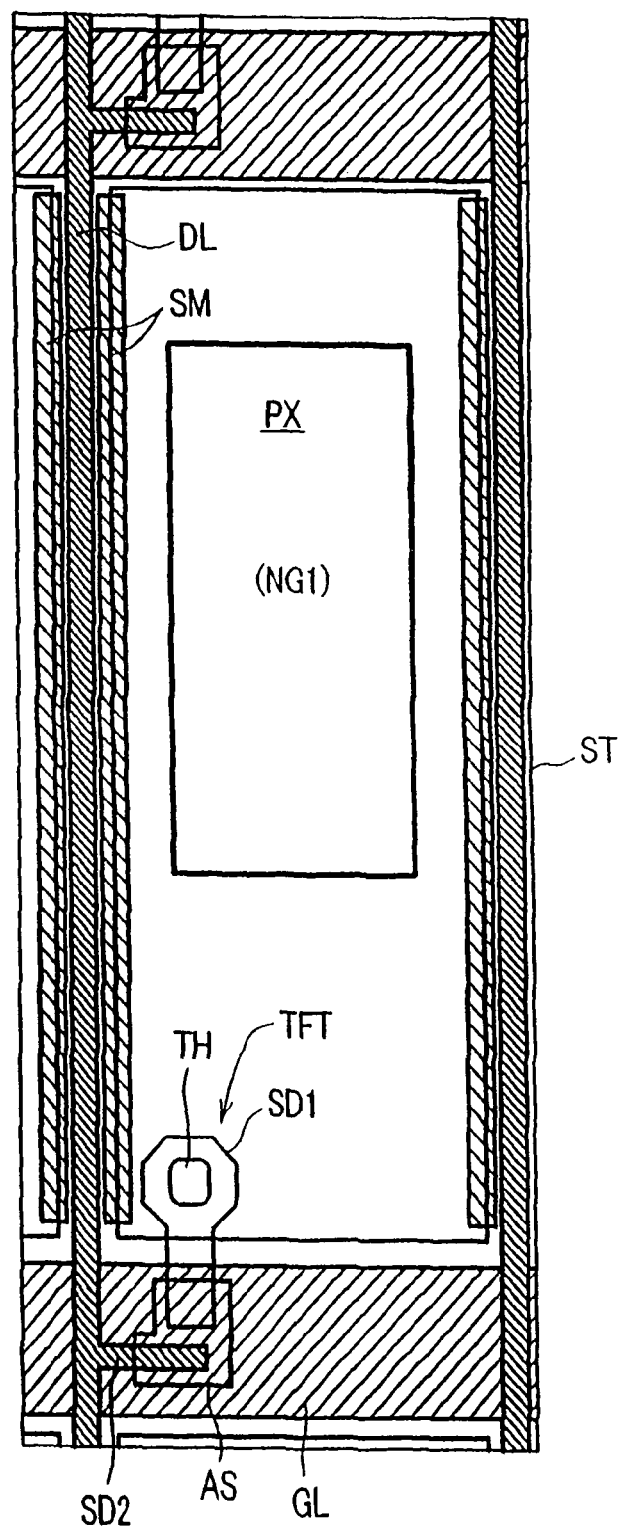
FIG. 10 is a plan view of the vicinity of one pixel of a liquid crystal display device for schematically explaining the pixel constitution of still another embodiment of the present invention.

FIG. 10 is a plan view of the vicinity of one pixel of a vertical field type liquid crystal display device for schematically explaining the pixel constitution of the fifth embodiment of the present invention. This embodiment is a modification of the above-mentioned fourth embodiment, wherein the gate insulation layer GI is eliminated at a portion within the region of the pixel electrode PX. Advantageous effects obtained by this embodiment is similar to those obtained by the fourth embodiment. Further, due to devoid of the gate insulation layer GI, the transmissivity is enhanced.

Figure 11:
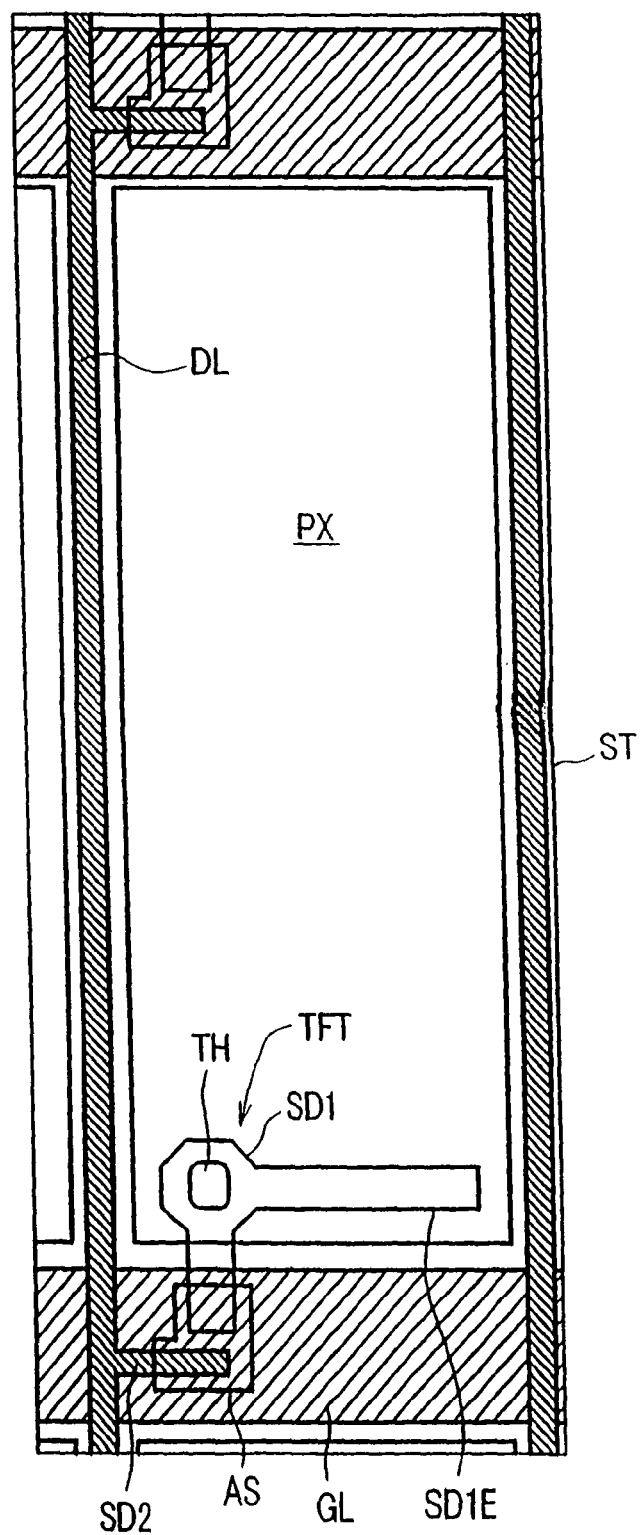
FIG. 11 is a plan view of the vicinity of one pixel of a liquid crystal display device for schematically explaining the pixel constitution of still another embodiment of the present invention.

FIG. 11 is a plan view of the vicinity of one pixel of a vertical field type liquid crystal display device for schematically explaining the pixel constitution of the sixth embodiment of the present invention. In this embodiment, the thin film transistor TFT includes the source electrode SD1 over the gate insulation layer GI, wherein the source electrode SD1 is connected to the pixel electrode PX via the through hole TH formed in the passivation layer PAS and a portion of the source electrode SD1 is expanded to the inside of the region of the pixel electrode PX. It is preferable to expand the source electrode SD1 as an extension portion SD1E which extends along the gate line GL or the drain line DL.

Due to the constitution of this embodiment, in addition to the advantageous effects obtained by respective embodiments, it is possible to adjust the storage capacity by changing the length or the width of the extension portion SD1E of the source electrode SD1, that is, by changing the area of the source electrode SD1 which overlaps the pixel electrode PX.

Figure 12:
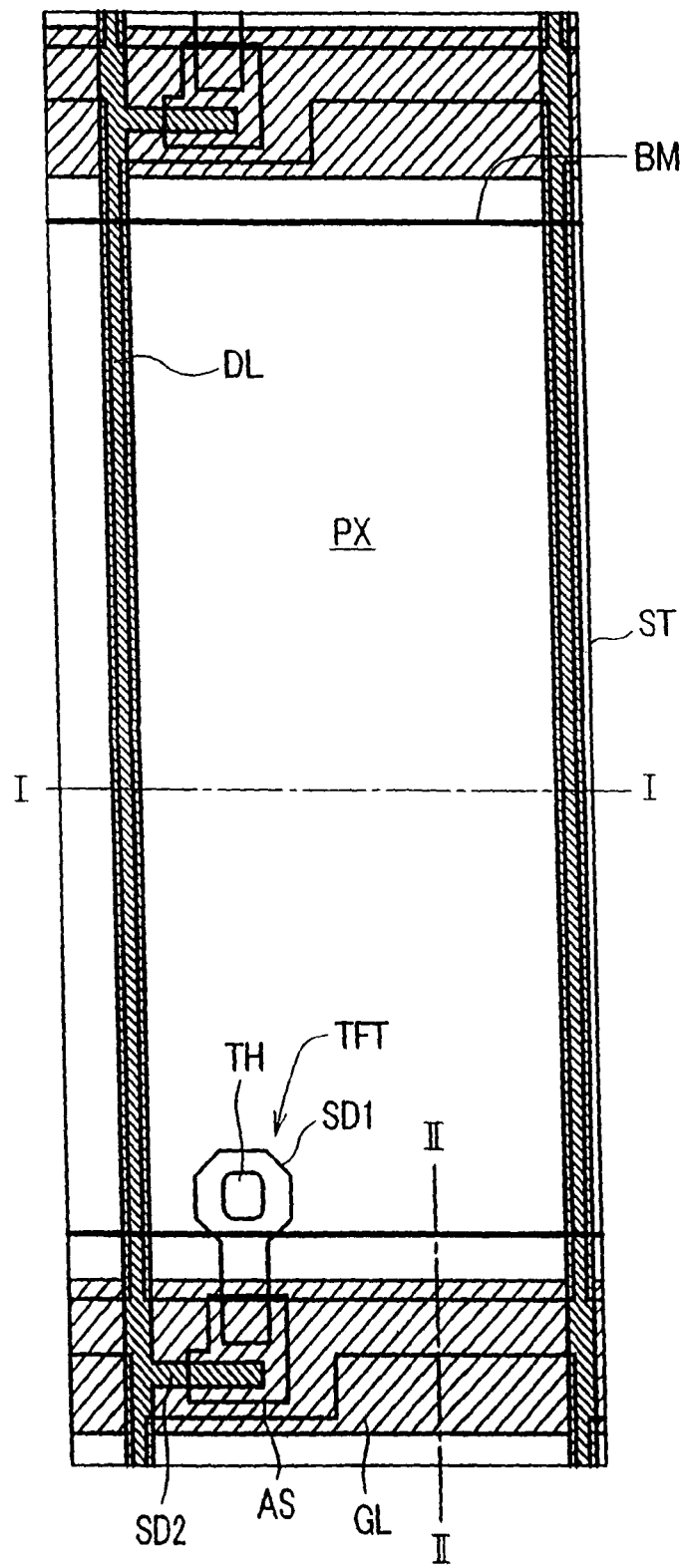
FIG. 12 is a plan view of the vicinity of one pixel of a liquid crystal display device for schematically explaining the pixel constitution of still another embodiment of the present invention.
Figure 13:
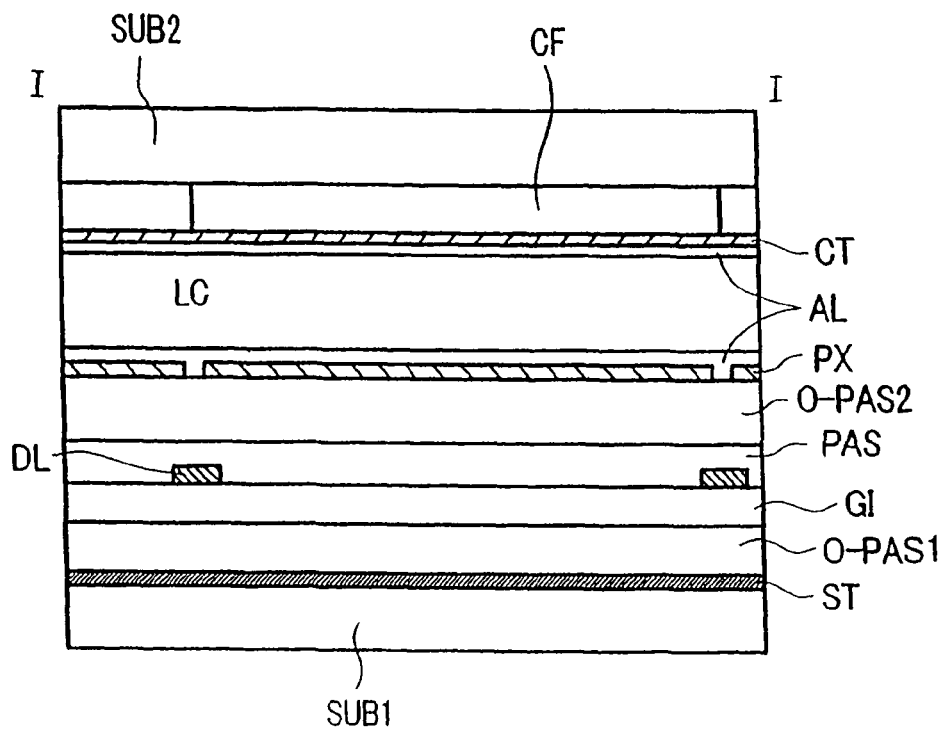
FIG. 13 is a cross-sectional view taken along a line I-I in FIG. 12.
Figure 14:
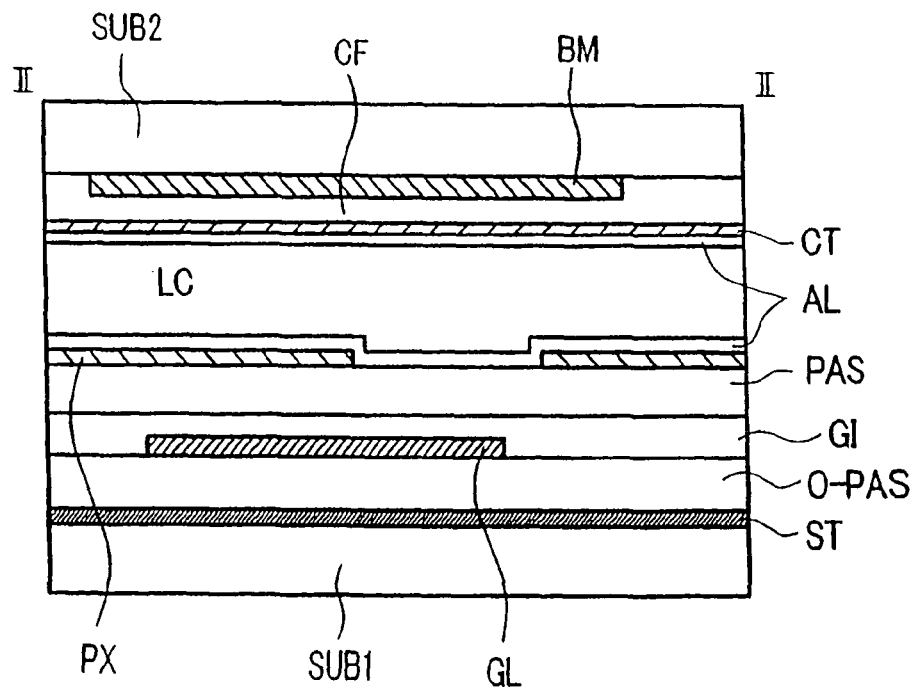
FIG. 14 is a cross-sectional view taken along a line II-II in FIG. 12.

FIG. 12 is a plan view of the vicinity of one pixel of a vertical field type liquid crystal display device for schematically explaining the pixel constitution of the seventh embodiment of the present invention, FIG. 13 is a cross-sectional view taken along a line I-I in FIG. 12, and FIG. 14 is a cross-sectional view taken along a line II-II in FIG. 12. Reference symbols in the drawings which are equal to those of the previous embodiments indicate identical functioning portions.

With respect to the liquid crystal display device of this embodiment, between the electrode forming layer which is constituted of the gate line layer GL, the drain line layer DL, the thin film transistor TFT and the pixel electrode PX including the pixel regions of the first substrate SUB1 and the first substrate SUB1 side, the reference electrode layer ST which is insulated by the first organic insulation layer O-PAS1 with respect to the electrode forming layer is provided. The pixel forming layer is configured such that the gate line layer GL, the gate insulation layer GI, the drain line layer DL, the thin film transistor TFT, the passivation layer PAS, the second organic insulation layer O-PAS2 and the pixel electrode PX are formed over the organic insulation layer O-PAS1 in this order. The holding capacity of the pixel is formed between the pixel electrode PX and the reference electrode layer ST.

Due to such a constitution of this embodiment, the numerical aperture of the pixel is enhanced and the feeding resistance can be reduced because of the large area of the conductive layer. Further, when the organic insulation layer is also formed over the switching element, it is possible to overlap the pixel electrode and the drain line to each other so that the numerical aperture is further enhanced. When the pixel electrode and the drain line overlap each other, it is possible to eliminate a light shielding layer between the vicinity in the extension direction of the drain line and the pixel electrode so that the numerical aperture is still further enhanced.

Further, the above-mentioned reference electrode layer ST is formed in the extension direction of the gate line layer GL such that the reference electrode layer ST is arranged parallel to the gate line layer GL and overlaps the region where the pixel electrode layer PX is formed. Accordingly, the parasitic capacity between the gate line layer and the conductive layer is reduced and the potential can be made stable.

Still further, the reference electrode layer is provided to the region of the above-mentioned first substrate SUB1 which includes the region where the gate line layer GL, the drain line layer DL and the pixel electrode layer PX are formed. Due to such a constitution, since the reference electrode layer ST is formed of a so-called matted electrode, the feeding resistance can be further reduced and the limitation imposed on the feeding direction can be eliminated.

Figure 15:
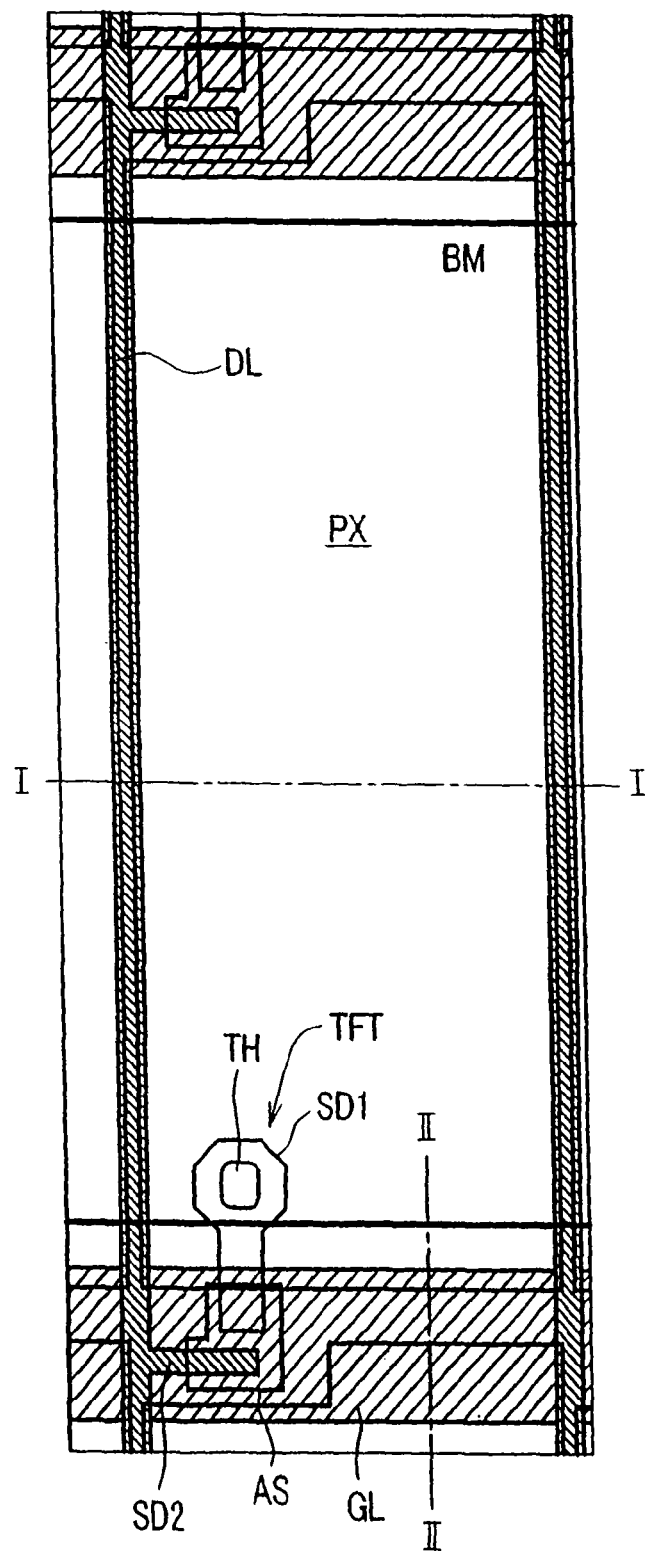
FIG. 15 is a plan view of the vicinity of one pixel of a liquid crystal display device for schematically explaining the pixel constitution of still another embodiment of the present invention.
Figure 16:
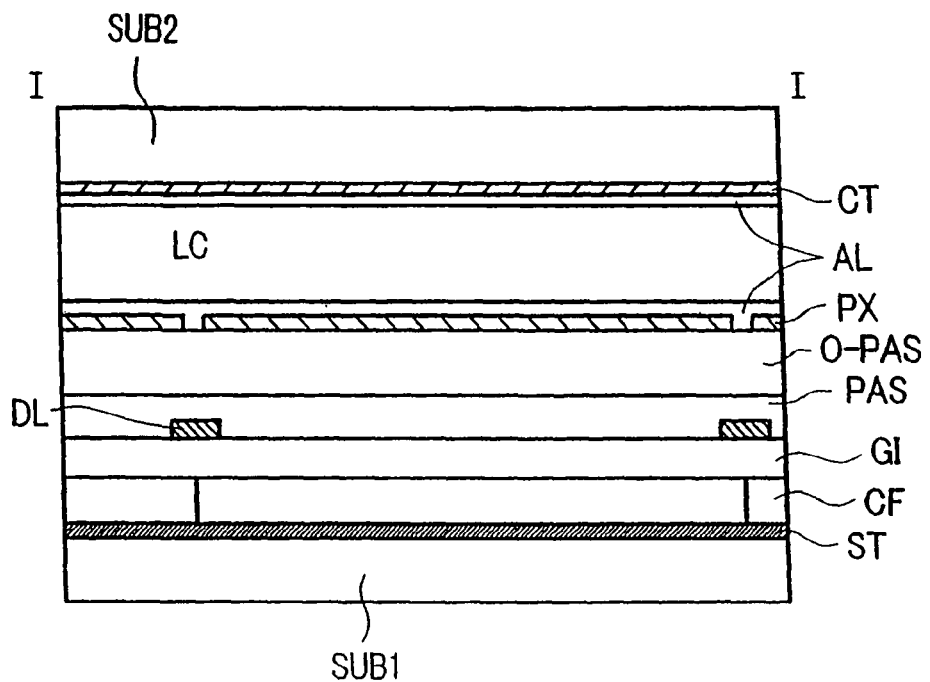
FIG. 16 is a cross-sectional view taken along a line I-I in FIG. 15.
Figure 17:
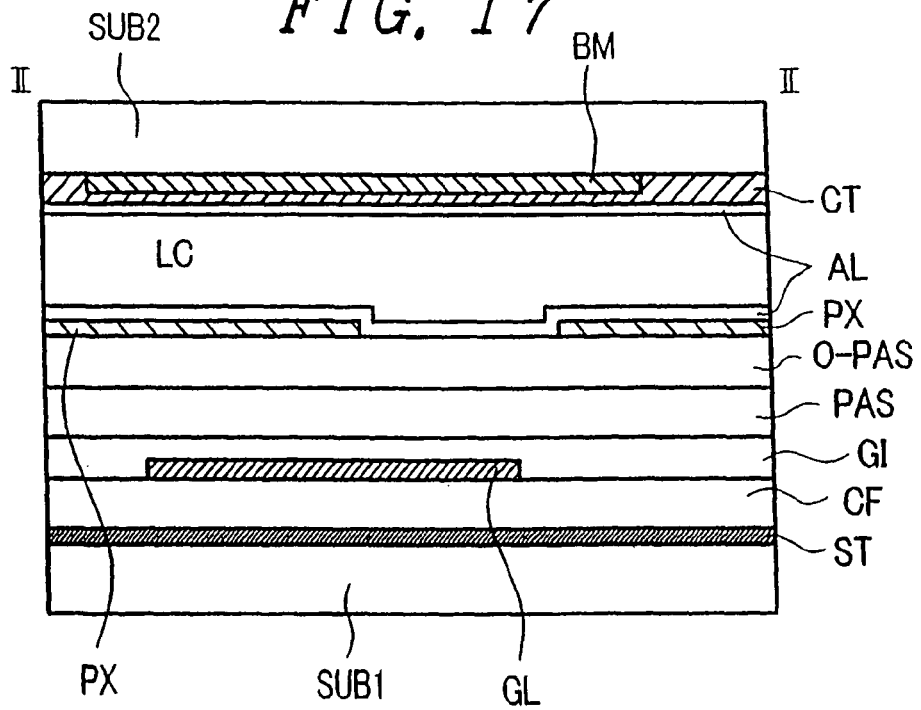
FIG. 17 is a cross-sectional view taken along a line II-II in FIG. 15.

FIG. 15 is a plan view of the vicinity of one pixel of a vertical field type liquid crystal display device for schematically explaining the pixel constitution of the eighth embodiment of the present invention, FIG. 16 is across-sectional view taken along a line I-I in FIG. 15, and FIG. 17 is a cross-sectional view taken along a line II-II in FIG. 15. Reference symbols in the drawings which are equal to those of the previous embodiments indicate identical functioning portions.

In this embodiment, the above-mentioned first organic insulation layer is constituted of the color filters CF. Accordingly, the holding capacity is formed by the organic insulation layer O-PAS, the passivation layer PAS, the gate insulation layer DI and the color filter layers CF which are formed between the pixel electrode layer PX and the reference electrode layer ST and hence, the increase of the parasitic capacity between the reference electrode layer and the gate line as well as the drain line can be suppressed. Further, since the color filter layers CF are formed on the first substrate SUB1, the tolerance of alignment of the first substrate SUB1 with the second substrate SUB2 is increased whereby the numerical aperture of the pixel is enhanced and the feeding resistance can be reduced due to large area of the conductive layer.

Figure 18:
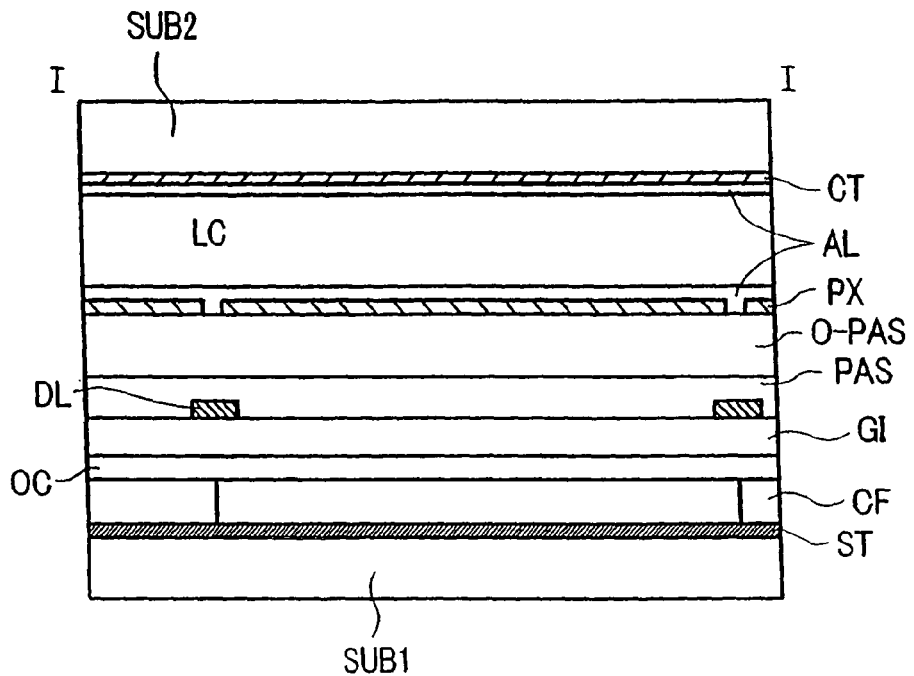
FIG. 18 is a cross-sectional view taken along a line I-I in FIG. 15 of a liquid crystal display device for schematically explaining the pixel constitution of another embodiment of the present invention.
Figure 19:
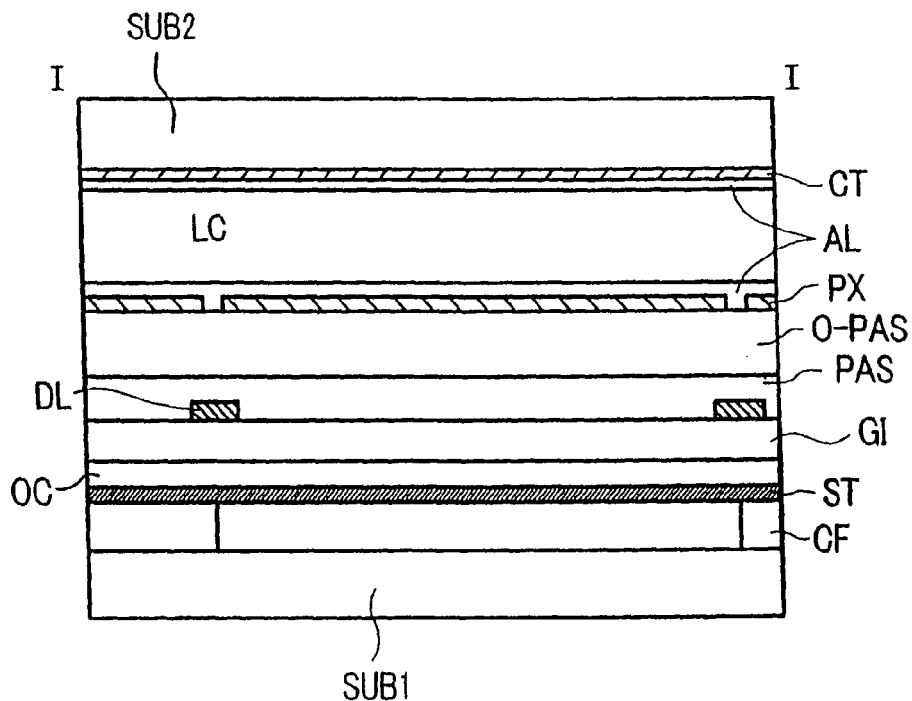
FIG. 19 is a cross-sectional view taken along a line II-II in FIG. 18.

FIG. 18 is a cross-sectional view taken along a line I-I in FIG. 15 of a vertical field type liquid crystal display device for schematically explaining the pixel constitution of the ninth embodiment of the present invention and FIG. 19 is a cross-sectional view taken along a line II-II in FIG. 18. Reference symbols in the drawings which are equal to those of the previous embodiments indicate identical functioning portions.

In the embodiment shown in FIG. 17, the black matrix BM which performs light-shielding of boundaries of the color filters CF is formed on the second substrate SUB2 side. In this embodiment, the black matrix BM is formed on the first substrate SUB1 side.

Further, in the eighth embodiment and the ninth embodiment, the above-mentioned reference electrode layer ST is formed in the extension direction of the gate line layer GL such that the reference electrode layer ST is arranged parallel to the gate line layer GL and overlaps the region where the pixel electrode layer PX is formed.

Due to such a constitution, the parasitic capacity formed between the gate line layer GL and the reference electrode layer ST can be reduced. Further, it is possible to stabilize the potential.

Further, by forming the reference electrode layer ST as a so-called matted electrode which is provided to a region of the first substrate SUB1 which includes a region where the gate line layer GL, the drain line layer DL and the pixel electrode layer PX are formed, the feeding resistance can be further reduced and the limitation imposed on the feeding direction can be eliminated.

Further, an overcoat layer which levels the color filter layers CF may be formed between the color filter layers CF and the gate insulation layer GI. Here, the reference electrode layer ST may be formed between the color filter layers CF and the gate insulation layer GI.

Figure 20:
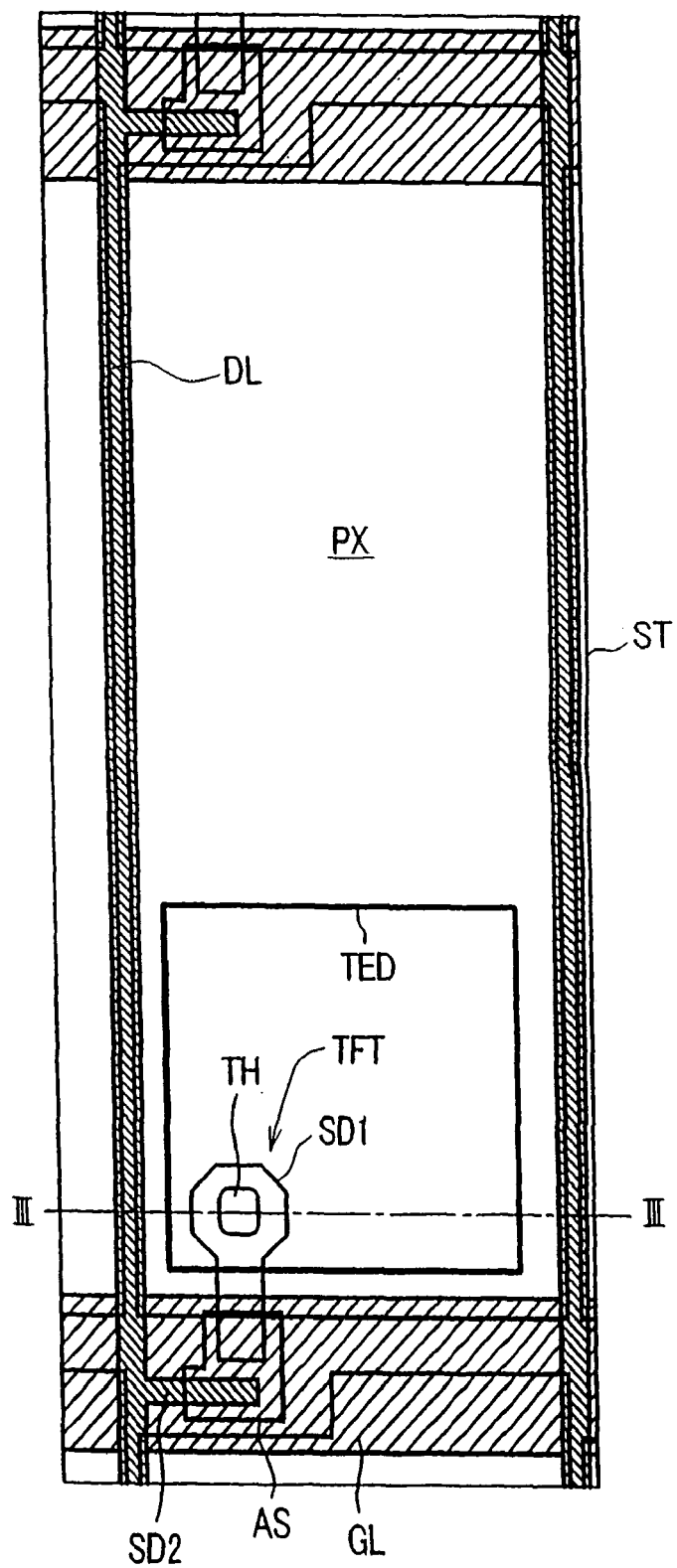
FIG. 20 is a plan view of the vicinity of one pixel of a liquid crystal display device for schematically explaining the pixel constitution of still another embodiment of the present invention.
Figure 21:
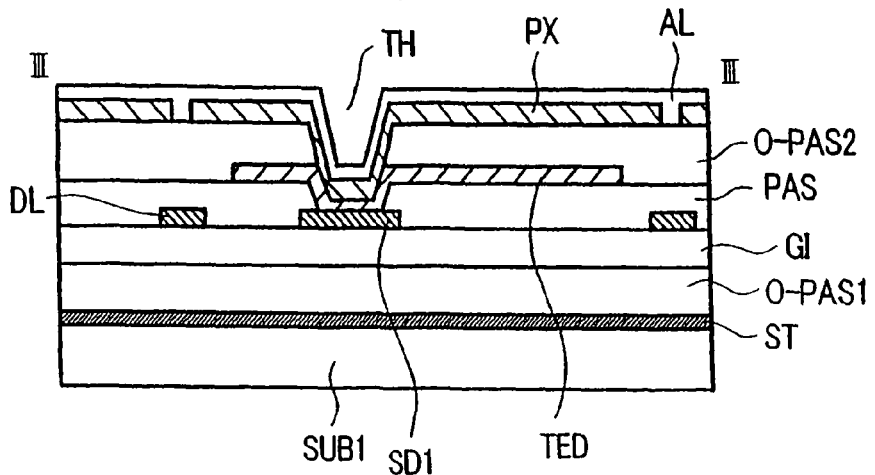
FIG. 21 is a cross-sectional view taken along a line III-III in FIG. 20.

FIG. 20 is a plan view of the vicinity of one pixel of a vertical field type liquid crystal display device for schematically explaining the pixel constitution of the tenth embodiment of the present invention and FIG. 21 is a cross-sectional view taken along a line III-III in FIG. 20. Reference symbols in the drawings which are equal to those of the previous embodiments indicate identical functioning portions.

In this embodiment, between the electrode forming layer which is constituted of the gate line layer GL, the drain line layer DL, the thin film transistor TFT, and the pixel electrode layer PX including the pixel regions of the first substrate SUB1 and the first substrate side SUB1, the first reference electrode layer ST which is insulated by the first organic insulation layer O-PAS1 with respect to the electrode forming layer is formed. Further, over the first organic insulation layer O-PAS1, the gate line layer GL, the gate insulation layer GI, the drain line layer DL, the thin film transistor TFT, the passivation layer PAS, the second organic insulation layer O-PAS2, and the pixel electrode layer PX are formed in this order. A capacitive electrode layer TED which is connected to the pixel electrode PX is formed between the second organic insulation layer O-PAS2 and the passivation layer PAS.

Figure 22:
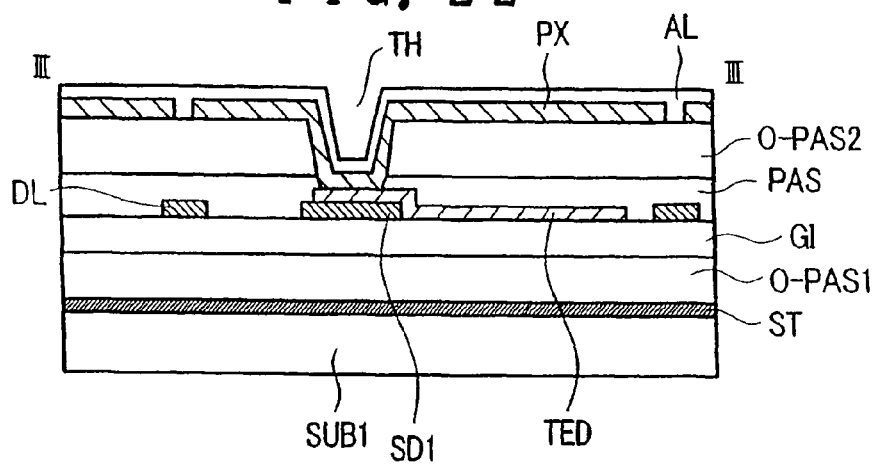
FIG. 22 is a cross-sectional view taken along the line III-III in FIG. 20 for schematically explaining the pixel constitution of another embodiment of the present invention.

FIG. 22 is a cross-sectional view taken along a line III-III in FIG. 20 for schematically explaining the pixel constitution of the eleventh embodiment of the present invention Reference symbols in the drawings which are equal to those of the previous embodiments indicate identical functioning portions. In this embodiment, the capacitive electrode layer TED shown in FIG. 21 is formed above the gate insulation layer GI and below the second organic insulation layer O-PAS2.

Figure 23:
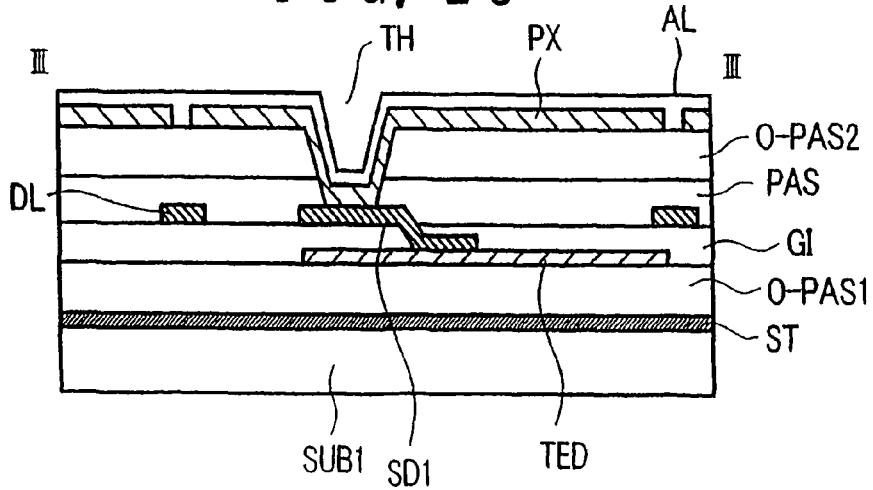
FIG. 23 is a cross-sectional view taken along the line III-III in FIG. 20 for schematically explaining the pixel constitution of another embodiment of the present invention.

FIG. 23 is a cross-sectional view taken along a line III-III in FIG. 20 for schematically explaining the pixel constitution of the twelfth embodiment of the present invention. Reference symbols in the drawings which are equal to those of the previous embodiments indicate identical functioning portions. In this embodiment, the capacitive electrode layer TED shown in FIG. 21 or FIG. 22 is formed above the first organic insulation layer O-PAS1 and below the gate insulation layer GI.

Due to the constitutions of the above-mentioned tenth, eleventh and twelfth embodiments, the numerical aperture of the pixel can be enhanced and the feeding resistance can be reduced because of the large area of conductive layer. Further, the storage capacity can be adjusted by the area and shape of the capacitive electrode layer TED. Further, when the organic insulation layer is also formed above the thin film transistor, it is possible to make the pixel electrode and the drain line overlap each other so that the numerical aperture can be further enhanced. When the pixel electrode and the drain line overlap each other, a light shielding layer formed between the vicinity in the extension direction of the drain line and the pixel electrode can be eliminated so that the numerical aperture can be further enhanced.

Here, the first reference electrode layer ST can be formed in the extension direction of the gate line layer GL such that the first reference electrode layer ST is arranged parallel to the gate line layer GL and overlaps the region where the pixel electrode layer PX is formed. Due to such a constitution, the parasitic capacity formed between the gate line layer GL and the first reference electrode layer ST can be reduced whereby the increase of storage capacity can be suppressed or the potential can be stabilized.

Further, the first reference electrode layer ST may be formed on a region of the first substrate SUB1 which includes the region where the gate line layer GL, the drain line layer DL and the pixel electrode layer PX are formed. Due to such a constitution, since the first reference electrode layer ST is constituted of a so-called matted electrode, the feeding resistance is further reduced and the limitation imposed on the feeding direction can be eliminated.

Figure 24:
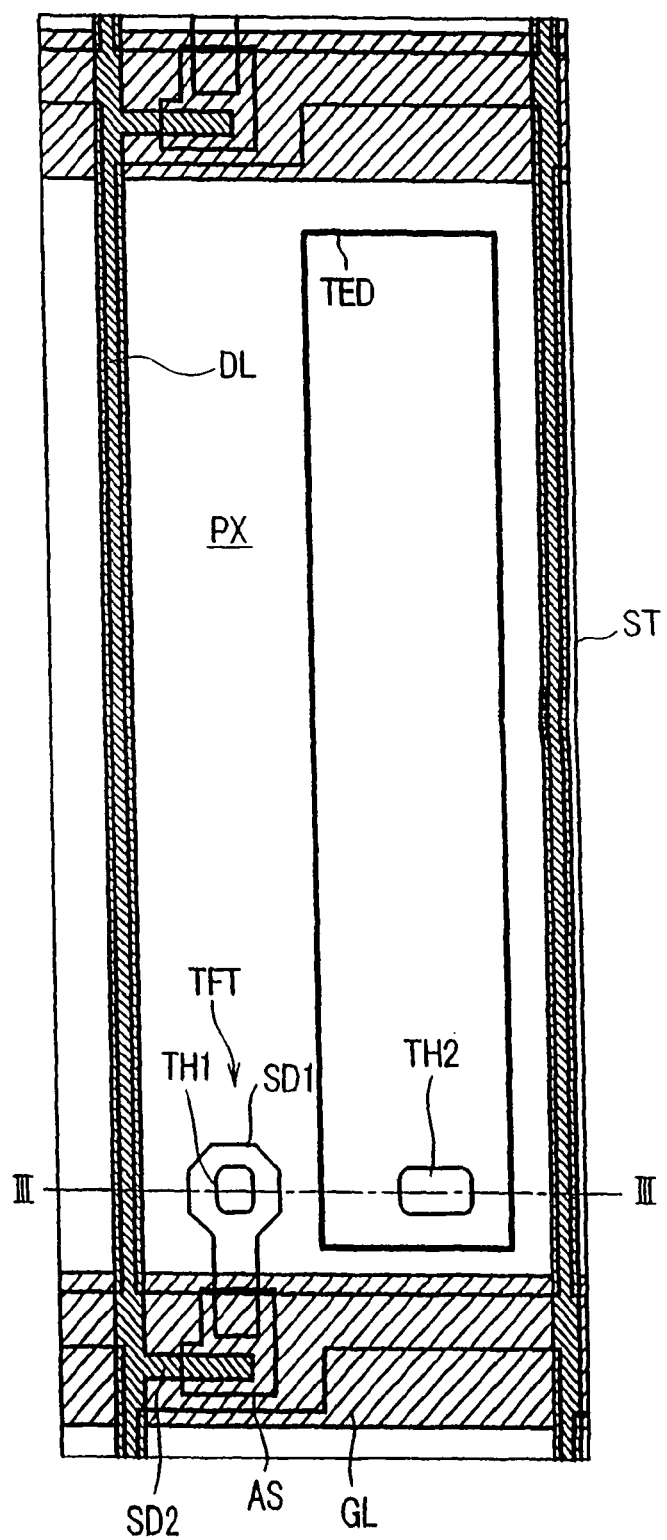
FIG. 24 is a plan view of the vicinity of one pixel of a liquid crystal display device for schematically explaining the pixel constitution of still another embodiment of the present invention.
Figure 25:
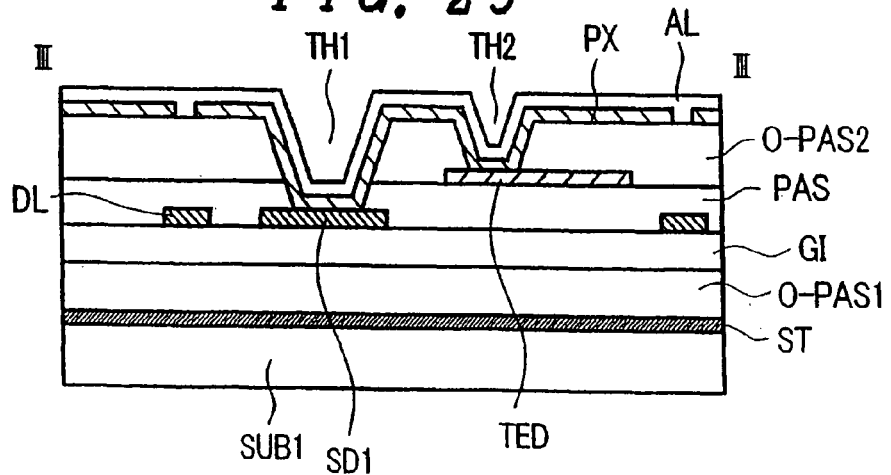
FIG. 25 is a cross-sectional view taken along a line III-III in FIG. 24.

FIG. 24 is a plan view of the vicinity of one pixel of a vertical field type liquid crystal display device for schematically explaining the pixel constitution of the thirteenth embodiment of the present invention and FIG. 25 is a cross-sectional view taken along a line III-III in FIG. 24. Reference symbols in the drawings which are equal to those of the previous embodiments indicate identical functioning portions. In this embodiment, for example, the capacitive electrode layer TED explained in conjunction with FIG. 20 to FIG. 23 is formed between the passivation layer PAS and the second organic insulation layer O-PAS in the pixel region and is connected to the pixel electrode layer PX via the through hole TH2.

That is, the thin film transistor TFT includes the source electrode which is connected to the pixel electrode PX via the through hole TH1 formed in the passivation layer PAS on the gate insulation layer GI, and the capacitive electrode layer TED is connected to the source electrode SD1 and is provided to the region where the pixel electrode PX is formed.

Due to such a constitution, the holding capacity can be adjusted by changing the size of the above-mentioned capacitive electrode layer TED. Here, the first organic insulation layer O-PAS may be formed of color filters.

Due to such a constitution, the numerical aperture of the pixel can be enhanced and the feeding resistance can be reduced because of the large area of the conductive layer. Further, when the holding capacity is formed by the organic insulation layer O-PAS having small dielectric constant, the passivation layer PAS, the gate insulation layer GI and the color filter layer CF formed between the pixel electrode PX and the reference electrode layer ST, the increase of parasitic capacity can be suppressed. Further, since the color filter layers CF are formed on the first substrate SUB1, the tolerance of alignment of the first substrate SUB1 with the second substrate SUB2 can be increased.

Figure 26:
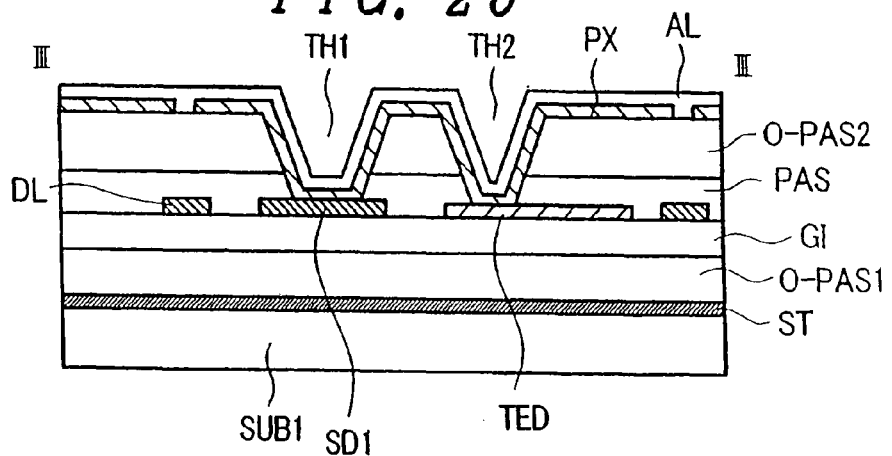
FIG. 26 is a cross-sectional view taken along a line III-III in FIG. 24 of the vicinity of one pixel of the liquid crystal display device for schematically explaining the pixel constitution of still another embodiment of the present invention.

FIG. 26 is a cross-sectional view taken along a line III-III in FIG. 24 of the vicinity of one pixel of a vertical field type liquid crystal display device for schematically explaining the pixel constitution of the fourteenth embodiment of the present invention. Reference symbols in the drawings which are equal to those of the previous embodiments indicate identical functioning portions. In this embodiment, the capacitive electrode layer TED is provided over the gate insulation layer GI. The pixel electrode PX is connected to the capacitive electrode layer TED via the through hole TH2 formed in the second organic insulation layer O-PAS2 and the passivation layer PAS.

Figure 27:
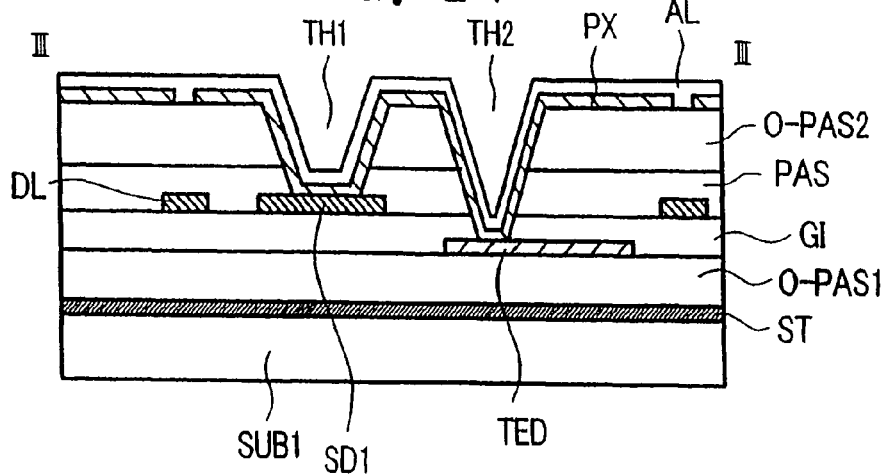
FIG. 27 is a cross-sectional view taken along a line III-III in FIG. 24 of the vicinity of one pixel of the liquid crystal display device for schematically explaining the pixel constitution of still another embodiment of the present invention.

FIG. 27 is a cross-sectional view taken along a line III-III in FIG. 24 of the vicinity of one pixel of a vertical field type liquid crystal display device for schematically explaining the pixel constitution of the fifteenth embodiment of the present invention. Reference symbols in the drawings which are equal to those of the previous embodiments indicate identical functioning portions. In this embodiment, the capacitive electrode layer TED is provided over the first organic insulation layer O-PAS. The pixel electrode PX is connected to the capacitive electrode layer TED via the through hole TH2 which is formed such that the through hole TH2 penetrates the second organic insulation layer O-PAS2, the passivation layer PAS and the gate insulation layer GI.

Due to the constitutions of the above-mentioned thirteenth to fifteenth embodiments, the holding capacity formed between the conductive layer and the pixel electrode PX can be adjusted by changing the area of the capacitive electrode layer TED.

Further, the first organic insulation layer O-PAS1 in the thirteenth to fifteenth embodiments may be formed of color filters.

Due to such a constitution, the numerical aperture of the pixel can be enhanced and the feeding resistance can be reduced because of the large area of the conductive layer. Further, when the color filter layers CF are formed on the first substrate SUB1, the tolerance of alignment of the first substrate SUB1 with the second substrate SUB2 can be increased.

Figure 28:
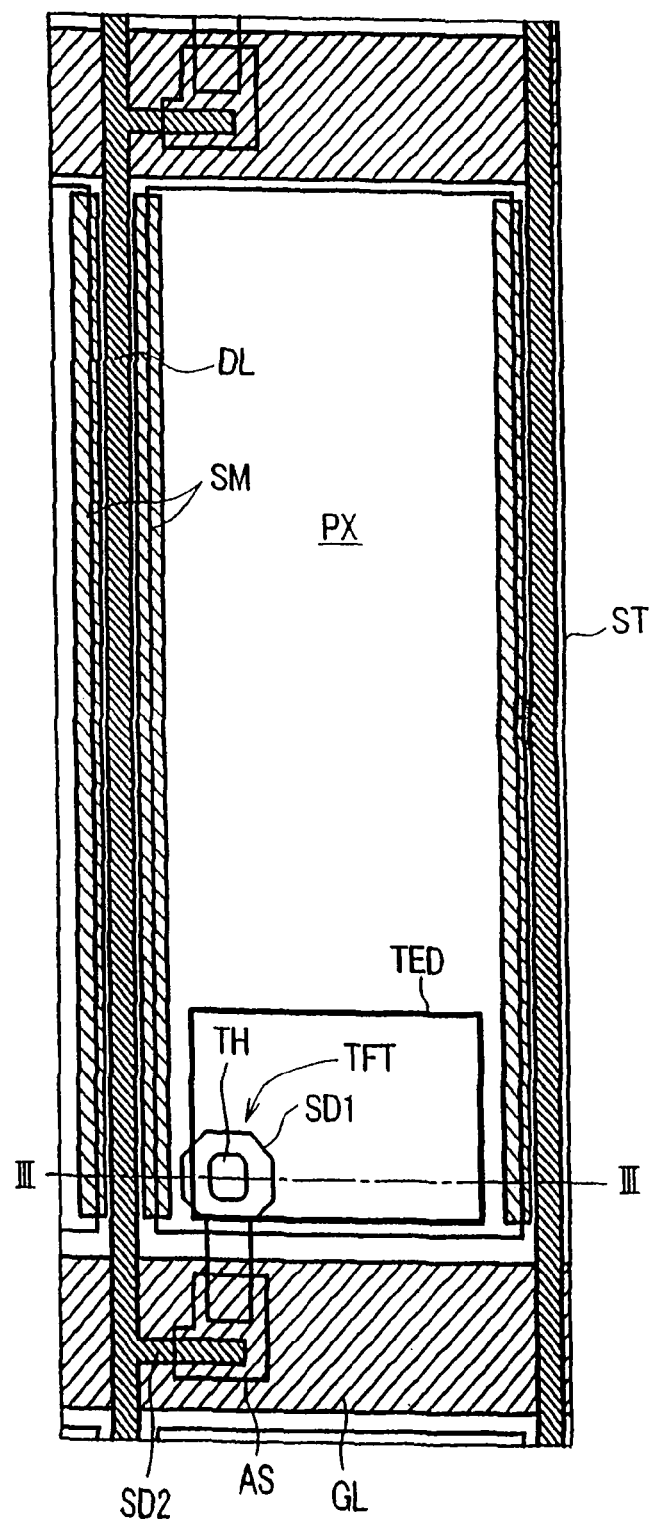
FIG. 28 is a plan view of the vicinity of one pixel of a liquid crystal display device for schematically explaining the pixel constitution of still another embodiment of the present invention.
Figure 29:
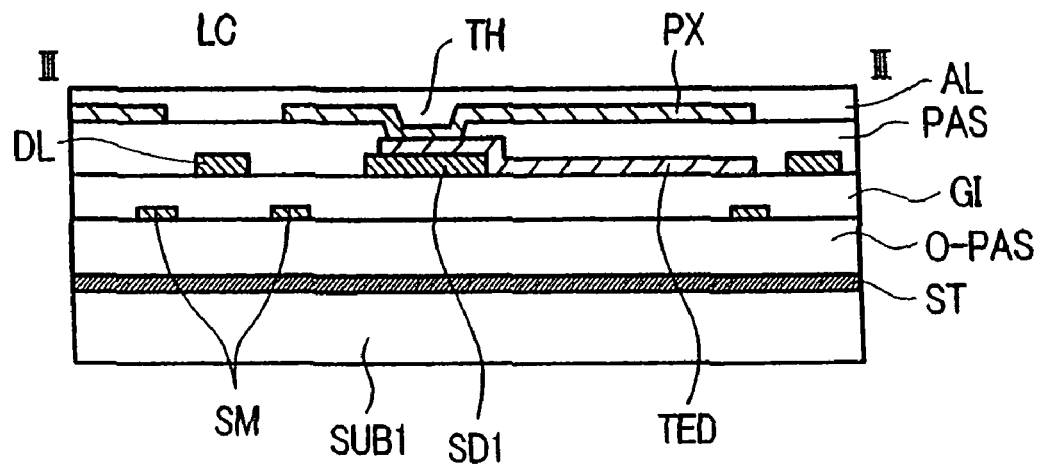
FIG. 29 is a cross-sectional view taken along a line III-III in FIG. 28.

FIG. 28 is a plan view of the vicinity of one pixel of a vertical field type liquid crystal display device for schematically explaining the pixel constitution of the sixteenth embodiment of the present invention and FIG. 29 is a cross-sectional view taken along a line III-III in FIG. 28. Reference symbols in the drawings which are equal to those of the previous embodiments indicate identical functioning portions. In this embodiment, between the electrode forming layer which is constituted of the gate line GL, the drain line DL, the switching element or thin film transistor TFT, and the pixel electrode PX including the pixel regions of the first substrate SUB1 and the first substrate SUB1 side, the first reference electrode layer ST which is insulated by the organic insulation layer O-PAS with respect to the electrode forming layer is formed.

Further, with respect to the above-mentioned electrode forming layer, over the above-mentioned organic insulation layer O-PAS, the gate line layer GL, the gate insulation layer GI, the drain line layer DL, the thin film transistor TFT, the passivation layer PAS, and the pixel electrode layer PX are formed in this order. A capacitive electrode layer TED which is connected to the pixel electrode layer PX is formed between the organic insulation layer O-PAS and the passivation layer PAS. Still further, the holding capacity of the pixel is formed between the pixel electrode layer PX and the first reference electrode layer ST as well as the capacitive electrode layer TED.

As shown in FIG. 29, the capacitive electrode layer TED is provided above the gate insulation layer GI and the source electrode SD1 is connected to the capacitive electrode layer TED. The switching element TFT includes the source electrode SD1 which is connected to the pixel electrode PX via the through hole TH formed in the passivation layer PAS over the gate insulation layer GI, and the capacitive electrode layer TED is formed in the pixel region in such a manner that the capacitive electrode layer TED is connected to the source electrode SD1.

Due to such a constitution, the storage capacity can be adjusted by changing the size of the above-mentioned capacitive electrode layer TED. Further, the organic insulation layer O-PAS may be formed of color filter layers.

Due to such a constitution of this embodiment, the numerical aperture of the pixel can be enhanced and the feeding resistance can be reduced because of the large area of the conductive layer. The holding capacity can be adjusted by changing the size of the capacitive electrode layer TED. Further, when the color filter layers CF are formed on the first substrate SUB1, the tolerance of alignment of the first substrate SUB1 with the second substrate SUB2 can be increased.

Figure 30:
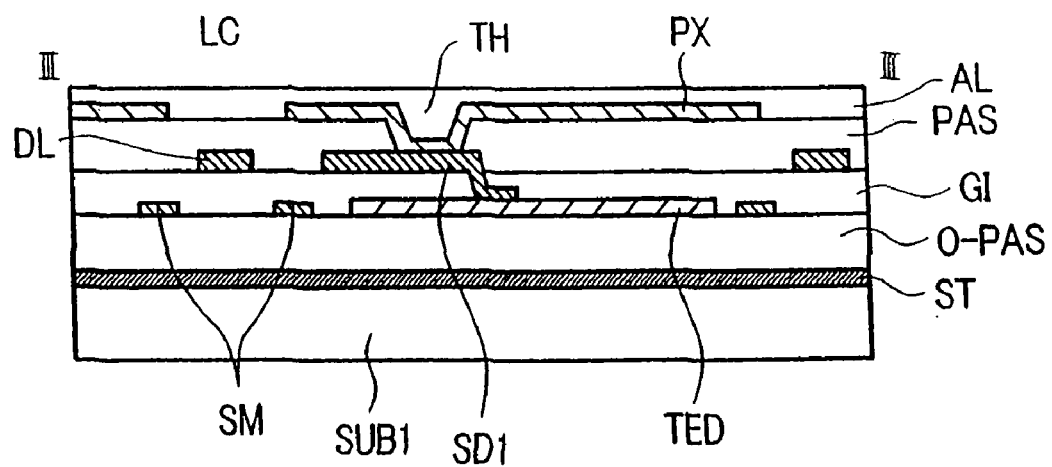
FIG. 30 is a cross-sectional view taken along a line III-III in FIG. 28 of the vicinity of one pixel of the liquid crystal display device for schematically explaining the pixel constitution of still another embodiment of the present invention.

FIG. 30 is a cross-sectional view taken along a line III-III in FIG. 28 of the vicinity of one pixel of a vertical field type liquid crystal display device for schematically explaining the pixel constitution of the seventeenth embodiment of the present invention. Reference symbols in the drawings which are equal to those of the previous embodiments indicate identical functioning portions. In this embodiment, the capacitive electrode layer TED is provided over the organic insulation layer O-PAS and the source electrode SD1 is connected to the capacitive electrode layer TED via the through hole TH which penetrates the gate insulation layer GI.

Due to such a constitution, the holding capacity formed between the capacitive electrode layer TED and the pixel electrode PX can be adjusted based on the area of pixel electrode PX which penetrates the passivation layer PAS and the gate insulation layer GI. Further, the organic insulation layer O-PAS may be formed of color filter layers.

Due to such a constitution of this embodiment, the numerical aperture of the pixel can be enhanced and the feeding resistance can be reduced because of the large area of the first reference electrode layer. Further, when the organic insulation layer is formed of color filter layers, the tolerance of alignment of the first substrate SUB1 with the second substrate SUB2 can be increased.

Figure 31:
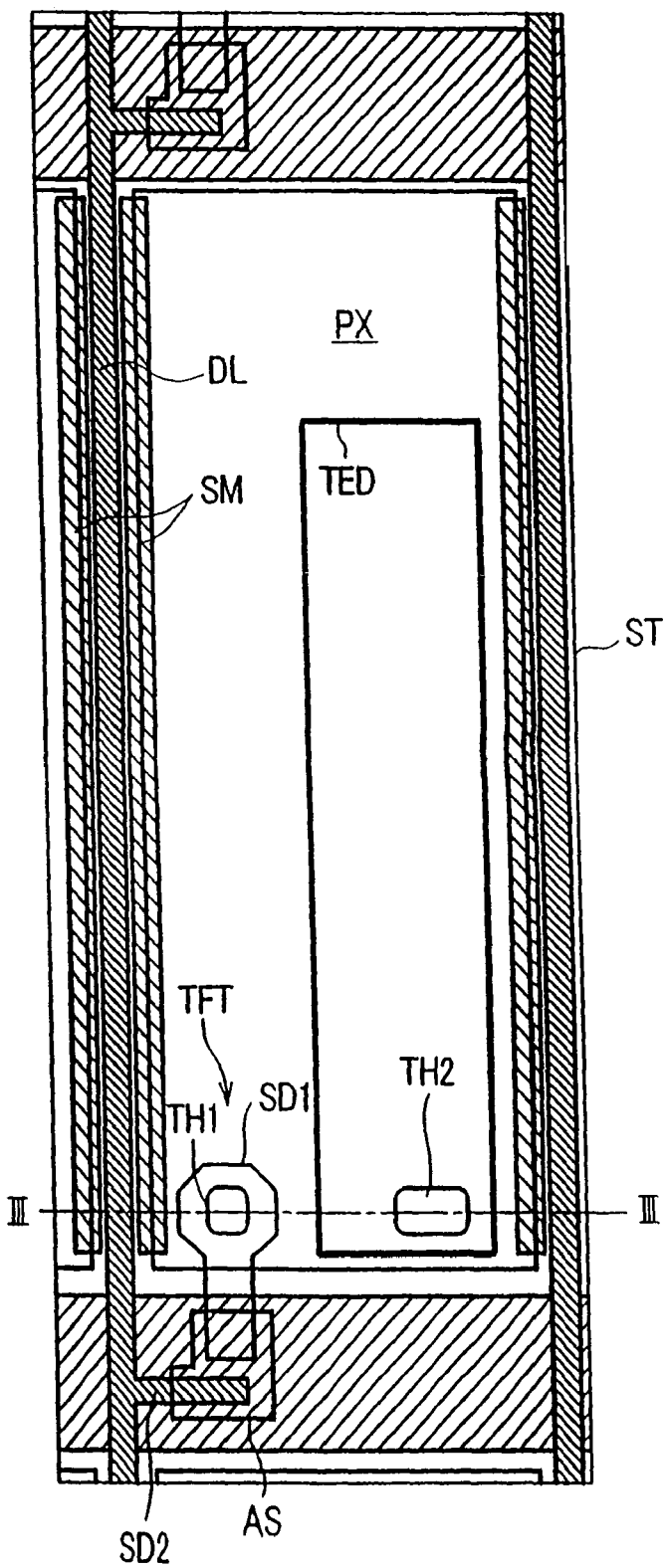
FIG. 31 is a plan view of the vicinity of one pixel of a liquid crystal display device for schematically explaining the pixel constitution of still another embodiment of the present invention.
Figure 32:
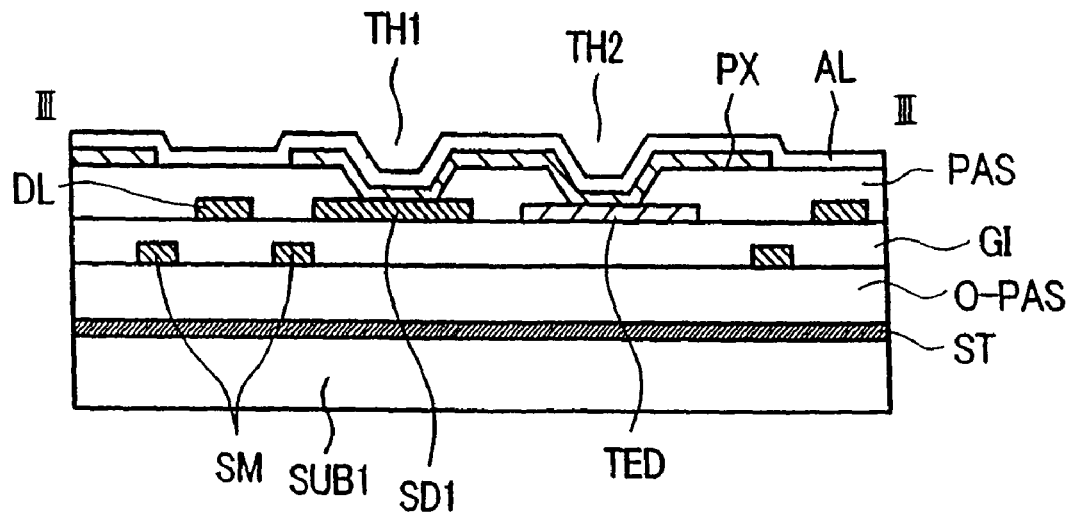
FIG. 32 is a cross-sectional view taken along a line III-III in FIG. 31.

FIG. 31 is a plan view of the vicinity of one pixel of a vertical field type liquid crystal display device for schematically explaining the pixel constitution of the eighteenth embodiment of the present invention and FIG. 32 is a cross-sectional view taken along a line III-III in FIG. 31. Reference symbols in the drawings which are equal to those of the previous embodiments indicate identical functioning portions. In this embodiment, the capacitive electrode layer TED is provided over the gate insulation layer GI and the pixel electrode layer PX is connected to the capacitive electrode layer TED via the through hole TH2 which penetrates the passivation layer PAS. Further, the organic insulation layer O-PAS may also be formed of color filter layers.

Due to such a constitution of this embodiment, the holding capacity formed between the first reference electrode layer ST and the pixel electrode layer PX can be adjusted by changing the area of the capacitive electrode layer TED. Further, the organic insulation layer O-PAS may be also formed of color filter layers.

Figure 33:
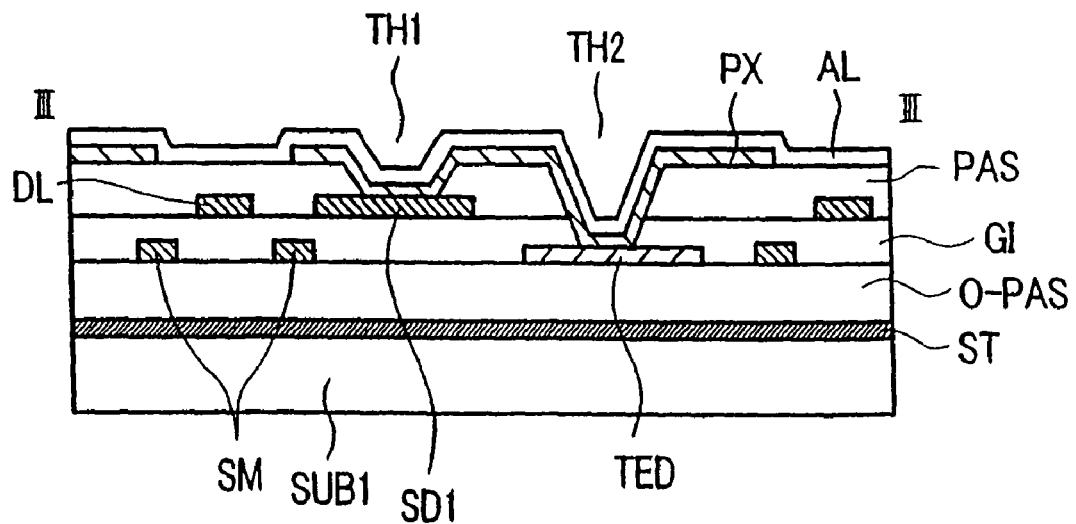
FIG. 33 is a cross-sectional view taken along a line III-III in FIG. 31 of the vicinity of one pixel of the liquid crystal display device for schematically explaining the pixel constitution of still another embodiment of the present invention.

FIG. 33 is a cross-sectional view taken along a line III-III in FIG. 31 of the vicinity of one pixel of a vertical field type liquid crystal display device for schematically explaining the pixel constitution of the nineteenth embodiment of the present invention. Reference symbols in the drawings which are equal to those of the previous embodiments indicate identical functioning portions. In this embodiment, the capacitive electrode layer TED is provided over the organic insulation layer O-PAS and the pixel electrode layer PX is connected to the capacitive electrode layer TED via the through hole TH2 which penetrates the passivation layer PAS and the gate insulation layer GI.

Due to such a constitution of this embodiment, the holding capacity formed between the first reference electrode layer ST and the pixel electrode layer PX can be adjusted by changing the area of the capacitive electrode layer TED. Further, the organic insulation layer O-PAS may be also formed of color filter layers.

Figure 34:
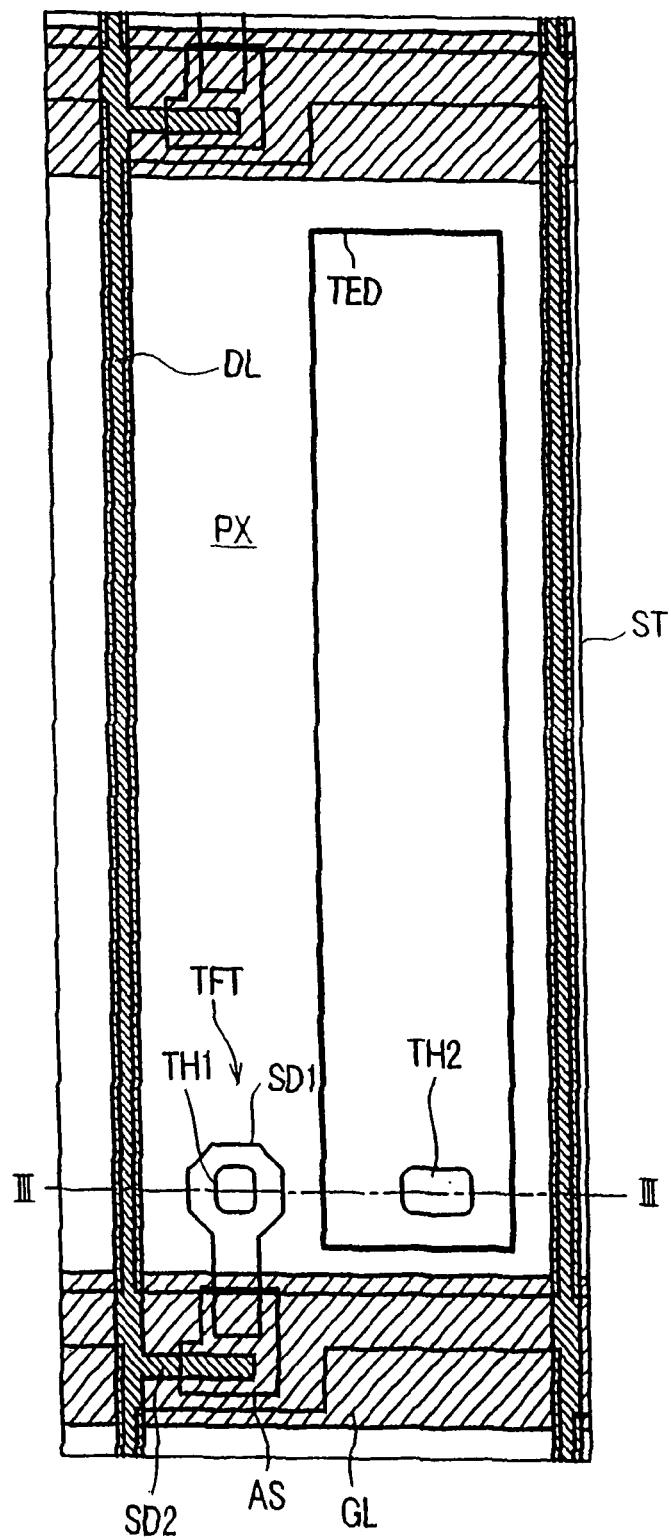
FIG. 34 is a plan view of the vicinity of one pixel of a liquid crystal display device for schematically explaining the pixel constitution of still another embodiment of the present invention.
Figure 35:
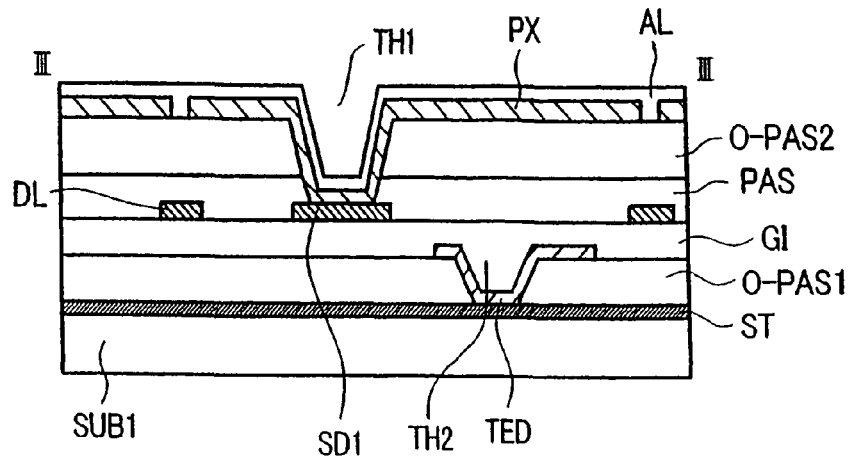
FIG. 35 is a cross-sectional view taken along a line III-III in FIG. 34.

FIG. 34 is a plan view of the vicinity of one pixel of a vertical field type liquid crystal display device for schematically explaining the pixel constitution of the twentieth embodiment of the present invention and FIG. 35 is a cross-sectional view taken along a line III-III in FIG. 34. Reference symbols in the drawings which are equal to those of the previous embodiments indicate identical functioning portions. In this embodiment, the capacitive electrode layer TED is provided over the first organic insulation layer O-PAS and the capacitive electrode layer TED is connected to the first reference electrode layer ST via the through hole TH2 which penetrates the first organic insulation layer O-PAS1.

Due to such a constitution, the storage capacity is adjusted by changing the area of capacitive electrode layer TED which is connected to the first reference electrode layer ST. Further, when color filter layers CF are formed on the first substrate SUB1, the tolerance of alignment of the first substrate SUB1 with the second substrate SUB2 can be increased.

Figure 36:
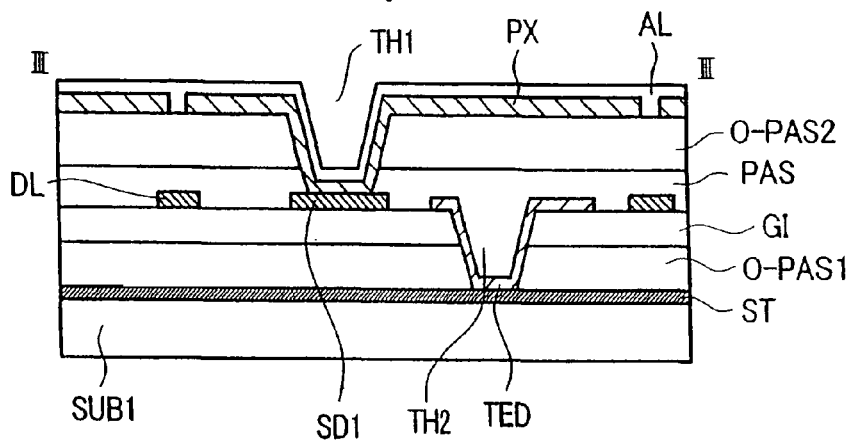
FIG. 36 is a cross-sectional view taken along a line III-III in FIG. 34 of the vicinity of one pixel of the liquid crystal display device for schematically explaining the pixel constitution of still another embodiment of the present invention.

FIG. 36 is a cross-sectional view taken along a line III-III in FIG. 34 of the vicinity of one pixel of a vertical field type liquid crystal display device for schematically explaining the pixel constitution of the twenty-first embodiment of the present invention. Reference symbols in the drawings which are equal to those of the previous embodiments indicate identical functioning portions. In this embodiment, the capacitive electrode layer TED is provided over the gate insulation layer GI and the capacitive electrode layer TED is connected to the first reference electrode layer ST via the through hole TH2 which penetrates the gate insulation layer GI.

Due to such a constitution of this embodiment, the storage capacity can be adjusted by changing the area of the capacitive electrode layer which is connected to the first reference electrode layer ST. Further, when the color filter layers CF are formed on the first substrate SUB1, the tolerance of alignment of the first substrate SUB1 with the second substrate SUB2 can be increased.

Figure 37:
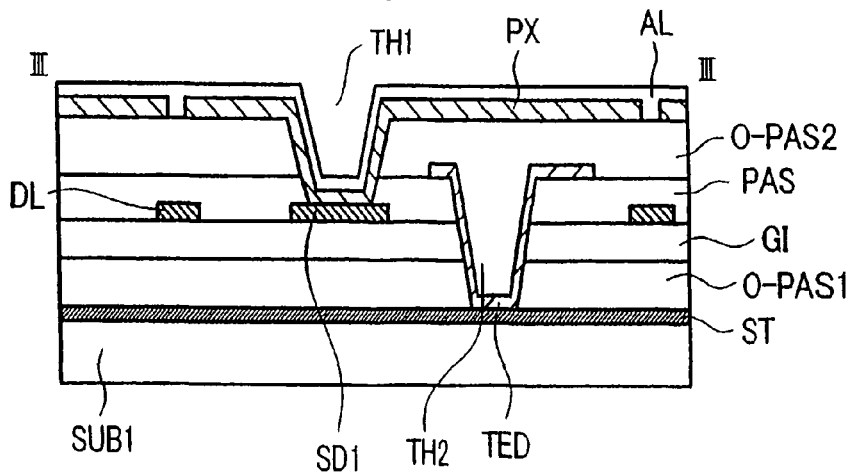
FIG. 37 is a cross-sectional view taken along a line III-III in FIG. 34 of the vicinity of one pixel of the liquid crystal display device for schematically explaining the pixel constitution of still another embodiment of the present invention.

FIG. 37 is a cross-sectional view taken along a line III-III in FIG. 34 of the vicinity of one pixel of a vertical field type liquid crystal display device for schematically explaining the pixel constitution of the twenty-second embodiment of the present invention. Reference symbols in the drawings which are equal to those of the previous embodiments indicate identical functioning portions. In this embodiment, the capacitive electrode layer TED is provided over the passivation layer PAS and the capacitive electrode layer TED is connected to the first reference electrode layer ST via the through hole TH2 which penetrates the passivation layer PAS, the gate insulation layer GI and the first organic insulation layer O-PAS1.

Due to such a constitution of this embodiment, the storage capacity which is formed between the conductive layer and the pixel electrode PX can be adjusted by changing the area of the capacitive electrode layer TED which is connected to the first reference electrode layer ST. Further, when the color filter layers CF are formed on the first substrate SUB1, the tolerance of alignment of the first substrate SUB1 with the second substrate SUB2 can be increased.

Further, due to such a constitution of this embodiment, the numerical aperture can be enhanced and the feeding resistance can be reduced because of the large area of the conductive layer. Further, when the first organic insulation layer O-PAS1 is formed of color filters, the tolerance of alignment of the first substrate SUB1 with the second substrate SUB2 can be increased.

Figure 38:
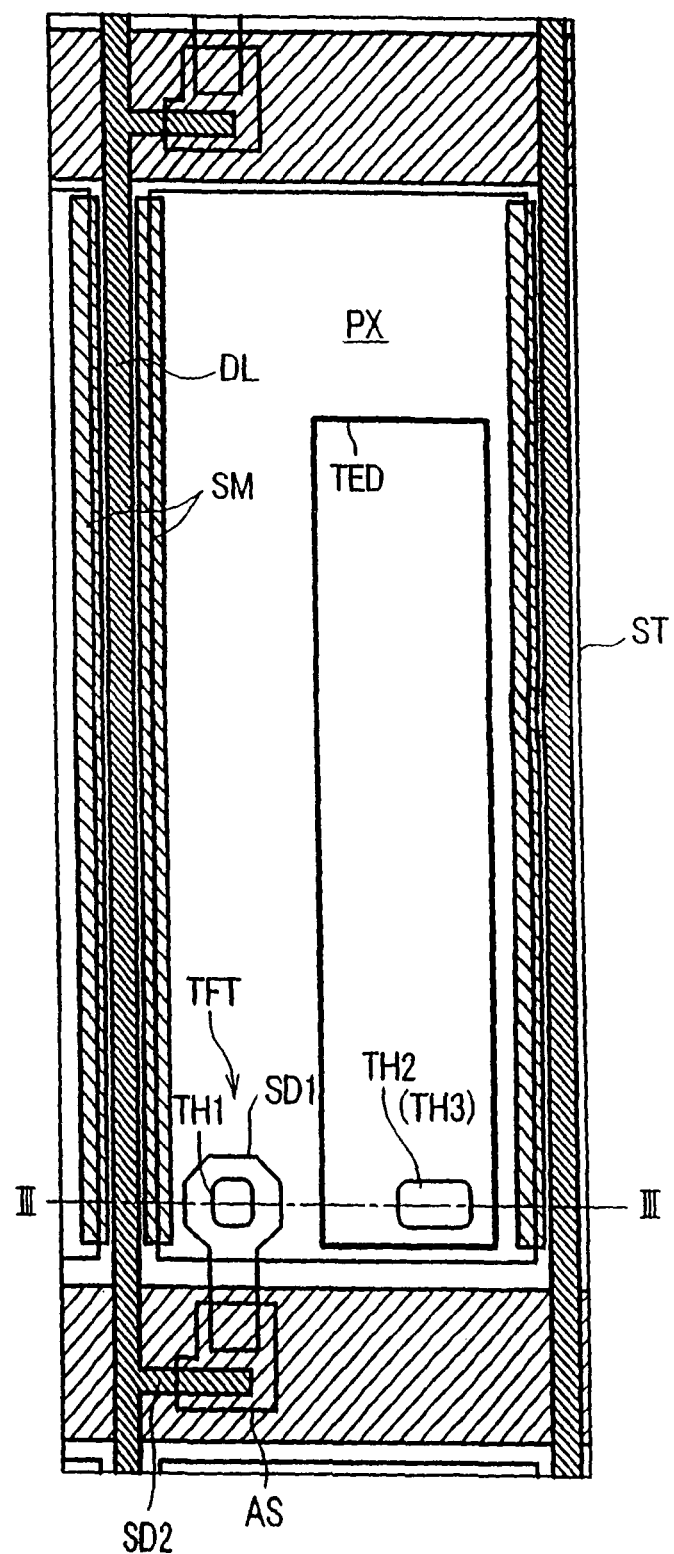
FIG. 38 is a plan view of the vicinity of one pixel of a liquid crystal display device for schematically explaining the pixel constitution of still another embodiment of the present invention.
Figure 39:
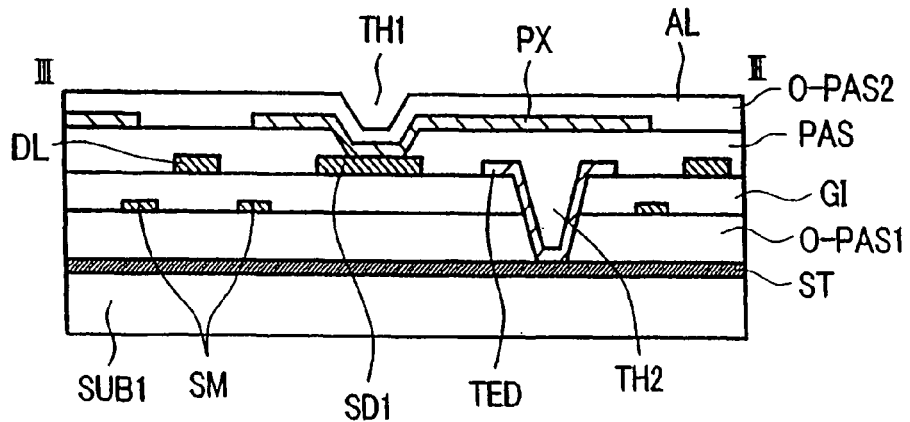
FIG. 39 is a cross-sectional view taken along a line III-III in FIG. 38.

FIG. 38 is a plan view of the vicinity of one pixel of a vertical field type liquid crystal display device for schematically explaining the pixel constitution of the twenty-third embodiment of the present invention and FIG. 39 is a cross-sectional view taken along a line III-III in FIG. 38. Reference symbols in the drawings which are equal to those of the previous embodiments indicate identical functioning portions. In this embodiment, the capacitive electrode layer TED is provided over the gate insulation layer GI and the capacitive electrode layer TED is connected to the first reference electrode layer ST via the through hole TH2 which penetrates the gate insulation layer GI and the organic insulation layer O-PAS.

Due to such a constitution of this embodiment, the holding capacity which is formed between the first reference electrode layer ST and the pixel electrode layer PX can be adjusted by changing the area of the capacitive electrode layer TED which is connected to the first reference electrode layer ST. Further, when the color filter layers CF are formed on the first substrate SUB1, the tolerance of alignment of the first substrate SUB1 with the second substrate SUB2 can be increased.

Figure 40:
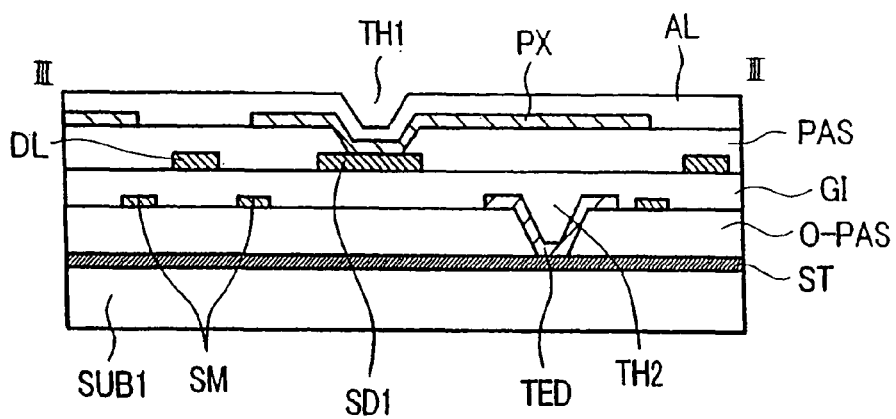
FIG. 40 is a cross-sectional view taken along a line III-III in FIG. 38 of the vicinity of one pixel of the liquid crystal display device for schematically explaining the pixel constitution of still another embodiment of the present invention.

FIG. 40 is a cross-sectional view taken along a line III-III in FIG. 38 of the vicinity of one pixel of a vertical field type liquid crystal display device for schematically explaining the pixel constitution of the twenty-fourth embodiment of the present invention. Reference symbols in the drawings which are equal to those of the previous embodiments indicate identical functioning portions. In this embodiment, the capacitive electrode layer TED is provided over the organic insulation layer O-PAS and the capacitive electrode layer TED is connected to the first reference electrode layer ST via the through hole TH2 which penetrates the organic insulation layer O-PAS.

Due to such a constitution of this embodiment, the holding capacity which is formed between the first reference electrode layer ST and the pixel electrode layer PX can be adjusted by changing the area of the capacitive electrode layer TED which is connected to the first reference electrode layer ST. Further, when the color filter layers CF are formed on the first substrate SUB1, the tolerance of alignment of the first substrate SUB1 with the second substrate SUB2 can be increased.

Figure 41:
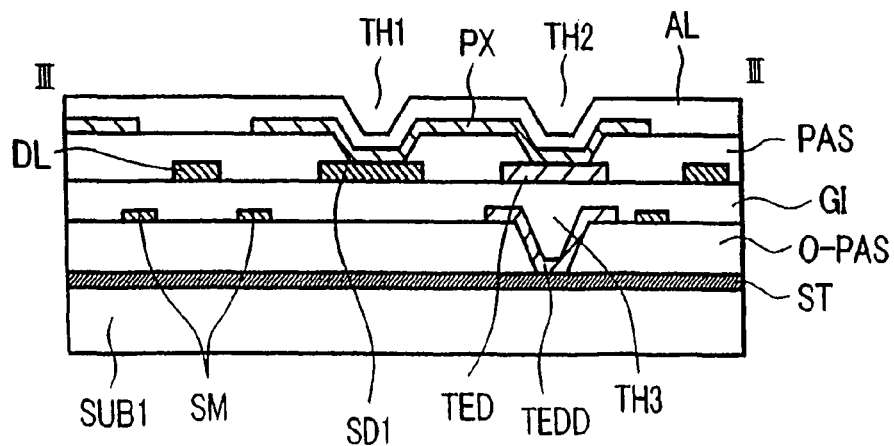
FIG. 41 is a cross-sectional view taken along a line III-III in FIG. 38 of the vicinity of one pixel of the liquid crystal display device for schematically explaining the pixel constitution of still another embodiment of the present invention.

FIG. 41 is a cross-sectional view taken along a line III-III in FIG. 38 of the vicinity of one pixel of a vertical field type liquid crystal display device for schematically explaining the pixel constitution of the twenty-fifth embodiment of the present invention. Reference symbols in the drawings which are equal to those of the previous embodiments indicate identical functioning portions. In this embodiment, the capacitive electrode layer TED is provided over the gate insulation layer GI and, at the same time, the second capacitive electrode layer TEDD is formed on the organic insulation layer O-PAS. The pixel electrode PX is connected to the capacitive electrode layer TED by way of the through hole TH2 formed in the passivation layer PAS and, at the same time, the second capacitive electrode layer TEDD is connected to the first reference electrode layer ST via through hole TH3 formed in the organic insulation layer O-PAS.

Due to such a constitution of this embodiment, the holding capacity which is formed between the first reference electrode layer ST and the pixel electrode layer PX can be adjusted by changing the area of the capacitive electrode layer TED and the area of the second capacitive electrode layer TEDD. Further, when the color filter layers CF are formed on the first substrate SUB1, the tolerance of alignment of the first substrate SUB1 with the second substrate SUB2 can be increased.

Figure 42:
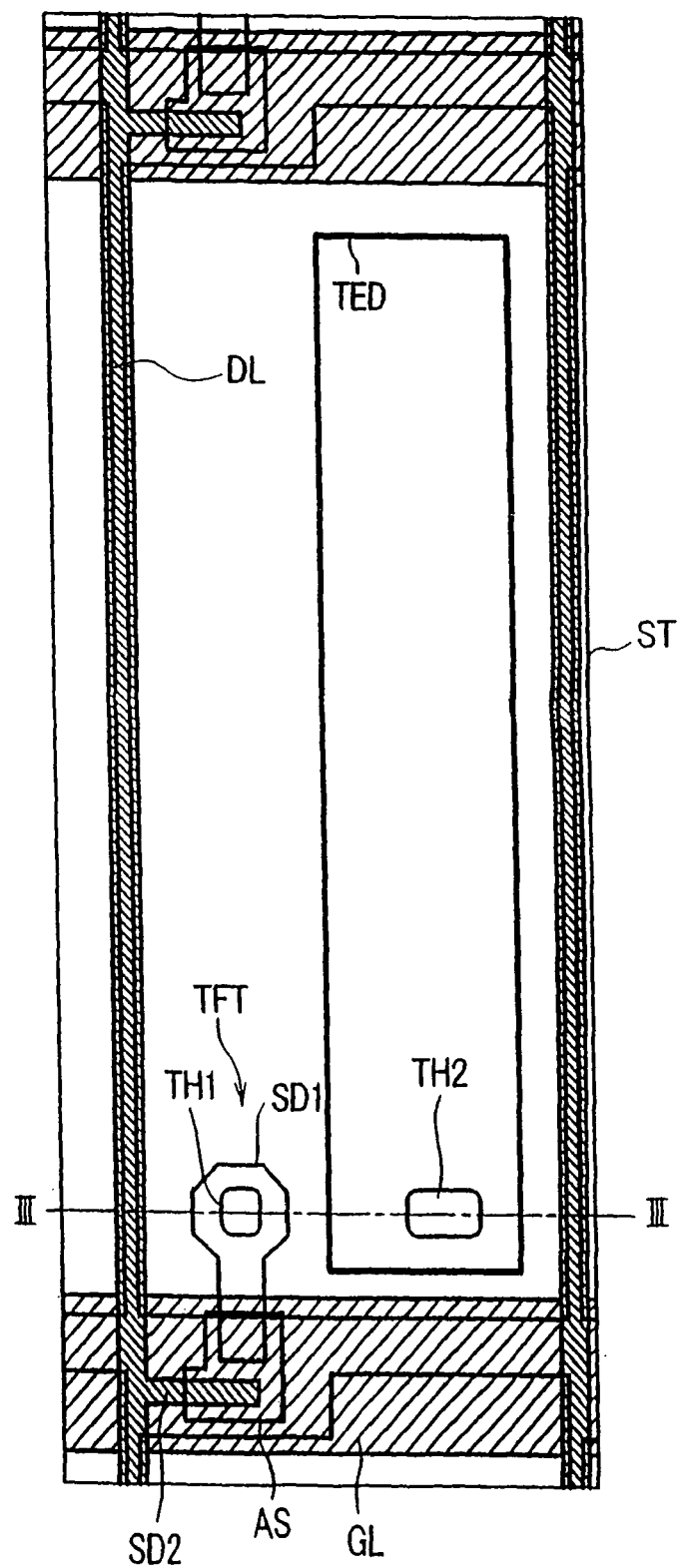
FIG. 42 is a plan view of the vicinity of one pixel of a liquid crystal display device for schematically explaining the pixel constitution of still another embodiment of the present invention.
Figure 43:
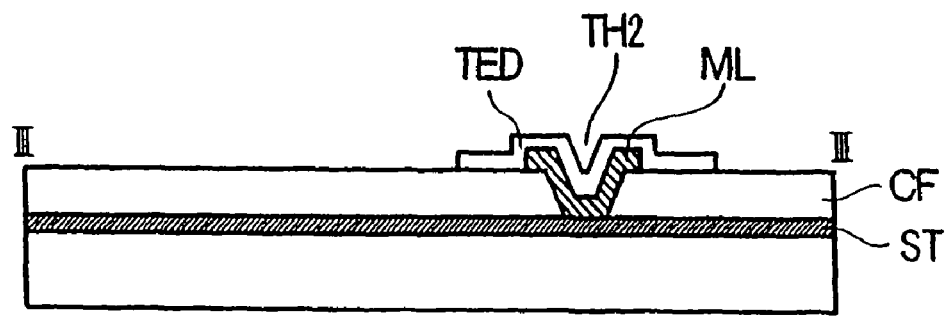
FIG. 43 is a cross-sectional view taken along a line III-III in FIG. 38.

FIG. 42 is a plan view of the vicinity of one pixel of a vertical field type liquid crystal display device for schematically explaining the pixel constitution of the twenty-sixth embodiment of the present invention and FIG. 43 is a cross-sectional view taken along a line III-III in FIG. 42. Reference symbols in the drawings which are equal to those of the previous embodiments indicate identical functioning portions. This embodiment describes a case in which the capacitive electrode layer TED in the above-mentioned respective embodiments is provided to the first substrate SUB1 and the organic insulation layer is formed of the color filter layers CF.

When the color filter layers CF are formed on the first substrate SUB1, since the color filters CF are not present at portions of the first substrate SUB1 corresponding to the through hole TH2, leaking of light is generated at this portions. To prevent such leaking of light, a metal-shielding film ML is formed over the through hole TH2 which connects the capacitive electrode TED with the first reference electrode layer ST and the capacitive electrode layer TED is connected to the first reference electrode layer ST through the metal light-shielding film ML.

Figure 44:
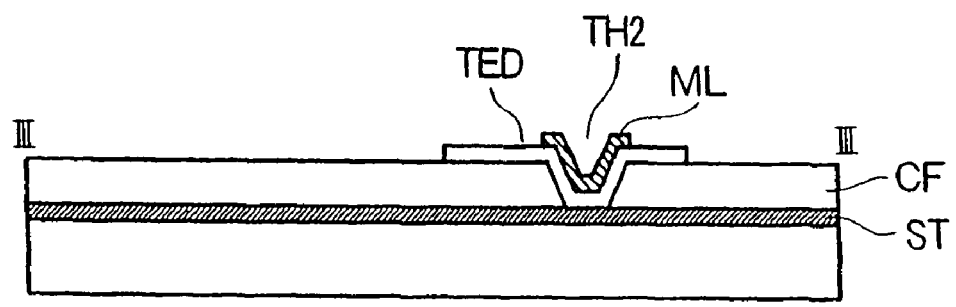
FIG. 44 is a cross-sectional view taken along a line III-III in FIG. 42 of the vicinity of one pixel of the liquid crystal display device for schematically explaining the pixel constitution of still another embodiment of the present invention.

FIG. 44 is a cross-sectional view taken along a line III-III in FIG. 42 of the vicinity of one pixel of a vertical field type liquid crystal display device for schematically explaining the pixel constitution of the twenty-seventh embodiment of the present invention. In this embodiment, the metal light-shielding film ML according to the above-mentioned twenty-sixth embodiment is provided over the capacitive electrode layer TED.

Figure 45:
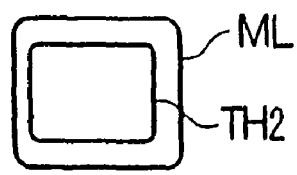
FIG. 45 is a plan view of a through hole and a metal light shielding film in still another embodiment of the present invention.

FIG. 45 is a plan view of the through hole TH2 and the metal light-shielding film ML according to the twenty-sixth embodiment or the twenty-seventh embodiment of the present invention. Respective sides of the metal light-shielding film ML are larger than corresponding sides of an opening portion of the through hole TH2 and are set to the size of at least equal to or more than 1 .mu.m. Here, the same goes for a case in which an overcoat layer is formed on the color filter layers CF.

FIG. 46 is a cross-sectional view of an essential part served for explaining the twenty-eighth embodiment of the present invention and for showing the cross-sectional structure of the through hole TH1 and the metal light-shielding film ML. In this embodiment, color filters CF are used as the organic insulation layer, the capacitive electrode layer TED is formed on the gate insulation layer which is, in turn, formed on the same layer as the source electrode SD1, and the source electrode SD1 is formed of the metal light-shielding film ML. This provision is made to cope with leaking of light at the through hole portion using the metal light-shielding film formed on the through hole portion. One example of such a constitution is explained taking a TH2 portion in FIG. 42 as an example. It is needless to say that other through holes may be used for performing light-shielding of through hole portions.

Figure 46A:
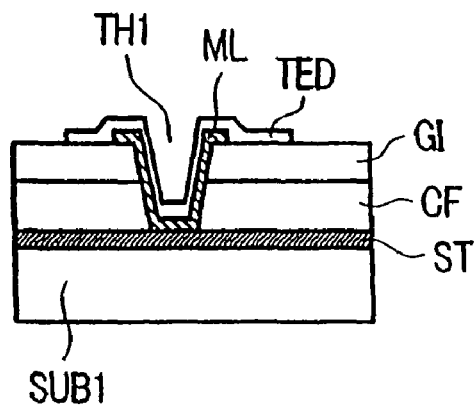
FIG. 46 is a cross-sectional view of an essential part for explaining still another embodiment of the present invention.
Figure 46B:
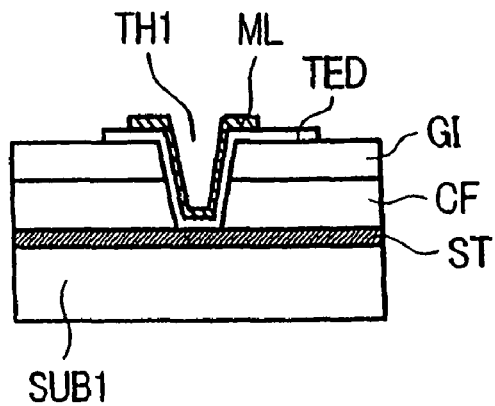
Figure 46C:
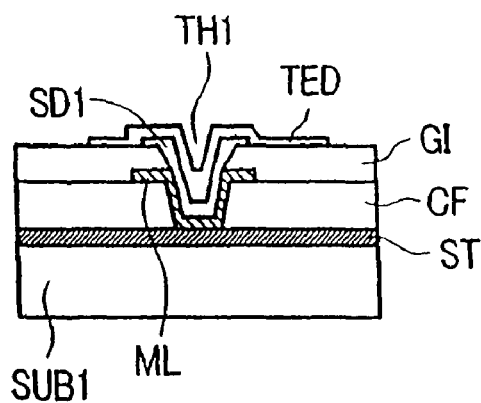

In FIG. 46(a), the metal light-shielding film ML is formed such that the metal light-shielding film ML penetrates the through hole TH1 from the source electrode SD1 and is connected to the first reference electrode layer ST such that the capacitive electrode TED is formed over the source electrode SD1. In FIG. 46(b), after forming the capacitive electrode layer TED in the through hole TH2, the metal light-shielding film ML is formed in the through hole TH1 from the source electrode SD1. In FIG. 46(c), after forming the metal light-shielding film ML in the through hole TH1, the first reference electrode layer ST is connected to the reference electrode layer TED via the SD layer.

Figure 46D:
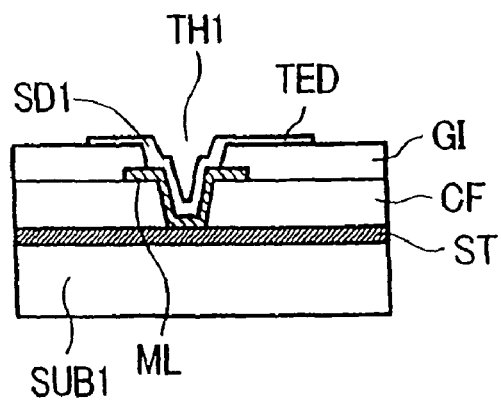

Further, in FIG. 46(d), the metal light-shielding film ML is formed in the through hole TH and, after connecting the light-shielding metal film ML with the reference electrode layer ST, metal light-shielding film ML and the reference electrode layer TED are connected to each other.

In the above-mentioned respective embodiments, by forming the reference electrode layer (or the first reference electrode layer) ST in the extending direction of the gate line GL such that the layer is arranged parallel to the gate line GL and overlaps the region where the pixel electrode PX is formed, the increase of the parasitic capacity between the gate line layer GL and the reference electrode layer (or the first reference electrode layer) can be suppressed and the potential can be stabilized.

Further, in the above-mentioned respective embodiments, by forming the reference electrode layer (or the first reference electrode layer) ST in the region of the first substrate SUB1 which includes the region where the gate line GL, the drain line DL and the pixel electrode PX are formed, the reference electrode layer ST is formed of a so-called matted electrode and hence, the feeding resistance can be further reduced and the limitation imposed on the feeding direction can be eliminated.

Further, in the above-mentioned respective embodiments, by providing the light-shielding layer ML which performs light-shielding between the vicinity in the extension direction of the drain line DL and the pixel electrode PX, it is possible to prevent leaking of light between the drain line DL and the pixel electrode PX.

Figure 47:
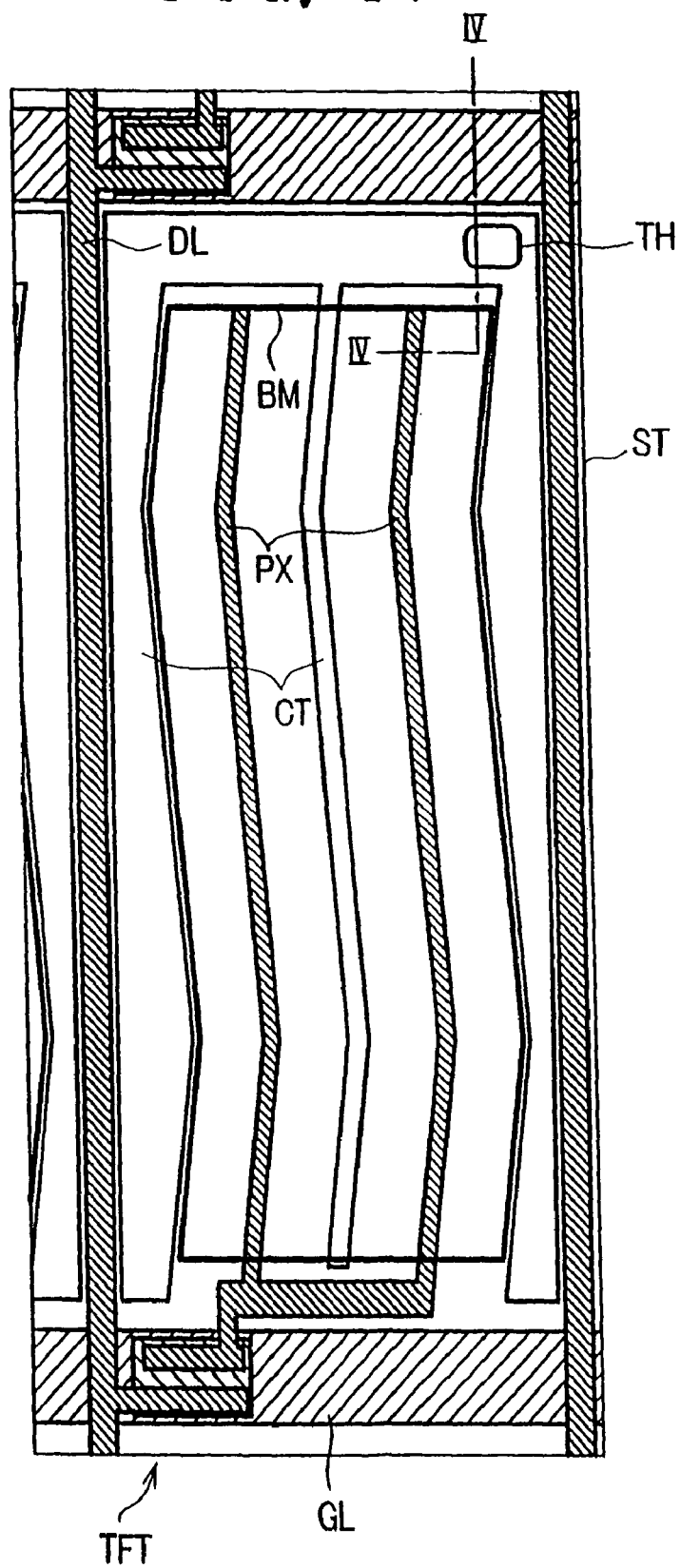
FIG. 47 is a plan view of the vicinity of one pixel of a liquid crystal display device for schematically explaining the pixel constitution of still another embodiment of the present invention.
Figure 48:
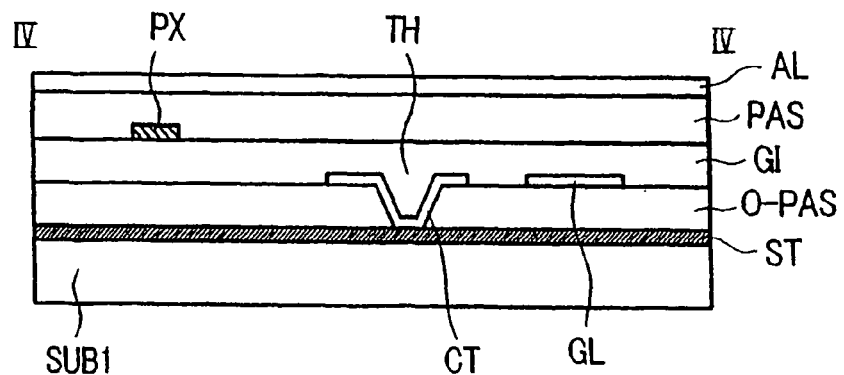
FIG. 48 is a cross-sectional view taken along a line III-III in FIG. 47.

FIG. 47 is a plan view of the vicinity of one pixel of an IPS type liquid crystal display device for schematically explaining the pixel constitution of the twenty-ninth embodiment of the present invention and FIG. 48 is a cross-sectional view taken along a line III-III in FIG. 47. Reference symbols in the drawings which are equal to those of the previous embodiments indicate identical functioning portions. In this embodiment, liquid crystal is inserted in a gap defined between a first substrate SUB1 and a second substrate SUB2 which face each other in an opposed manner. On an inner surface of the first substrate SUB1, a plurality of gate lines GL which extend in the first direction and are arranged parallel to each other and a plurality of drain lines GL which extend in the second direction which crosses the gate lines GL and are arranged parallel to each other, a plurality of thin film transistors which are arranged at crossing portions of the gate lines GL and the drain lines DL1 comb-shaped pixel electrodes PX which are driven by the thin film transistors TFT, and comb-shaped counter electrodes CT which generate electric fields for driving pixels between the counter electrodes CT and the pixel electrodes PX are formed.

The pixel electrodes PX and the counter electrodes CT may be formed on the same layer.

Further, between an electrode forming layer which is constituted of the gate line GL, the drain line DL, the thin film transistor TFT and the pixel electrode PS including a pixel region of the first substrate SUB1 and the first substrate SUB1 side, a reference electrode layer ST which is insulated by an organic insulation layer O-PAS with respect to the electrode forming layer is provided and holding capacity of the pixel is formed between the pixel electrode PX and the reference electrode layer ST.

Further, the counter electrode CT is formed over the organic insulation layer O-PAS and the counter electrode CT is connected to the reference electrode layer ST via a through hole TH formed in the organic insulation layer O-PAS.

Due to such a constitution of this embodiment, it is possible to form the sufficient holding capacity and hence, the image quality can be stabilized and enhanced. Further, since it is unnecessary to increase the area of the pixel electrode PX for forming the holding capacity, the numerical aperture can be enhanced. Still further, since the area of the reference electrode layer ST is large, the feeding resistance can be reduced.

Figure 49:
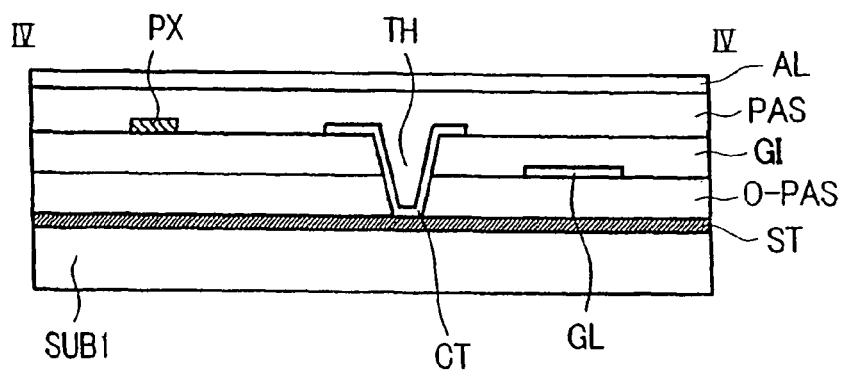
FIG. 49 is a cross-sectional view taken along a line IV-IV in FIG. 47 of the vicinity of one pixel of the liquid crystal display device for schematically explaining the pixel constitution of still another embodiment of the present invention.

FIG. 49 is a cross-sectional view taken along a line IV-IV in FIG. 47 of the vicinity of one pixel of the IPS type liquid crystal display device for schematically explaining the pixel constitution of the thirtieth embodiment of the present invention. The counter electrode CT is formed over a gate insulation layer GI and the counter electrode CT is connected to the reference electrode layer ST via the through hole TH formed in the gate insulation layer GI and the organic insulation layer O-PAS.

Due to such a constitution of this embodiment, holding capacity is formed between the pixel electrode PX and the reference electrode layer ST via the organic insulation layer O-PAS having small dielectric constant. Since it is unnecessary to increase the area of the pixel electrode PX for forming the holding capacity, the numerical aperture is enhanced. Further, since the area of the reference electrode layer ST is large, the feeding resistance can be reduced.

Figure 50:
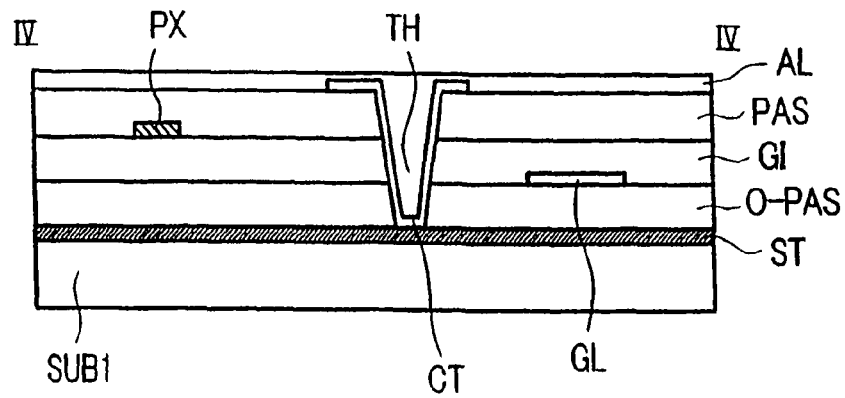
FIG. 50 is a cross-sectional view taken along a line IV-IV in FIG. 47 of the vicinity of one pixel of the liquid crystal display device for schematically explaining the pixel constitution of still another embodiment of the present invention.

FIG. 50 is a cross-sectional view taken along a line IV-IV in FIG. 47 of the vicinity of one pixel of the IPS type liquid crystal display device for schematically explaining the pixel constitution of the thirty-first embodiment of the present invention. In this embodiment, the counter electrode CT is formed over a passivation layer PAS and the counter electrode CT is connected to the reference electrode layer ST via a through hole TH formed in the passivation layer PAS, the gate insulation layer GI and the organic insulation layer O-PAS.

Due to such a constitution of this embodiment, holding capacity is formed between the pixel electrode PX and the reference electrode layer ST via the organic insulation layer O-PAS having small dielectric constant. Since it is unnecessary to increase the area of the pixel electrode PX for forming the holding capacity, the numerical aperture is enhanced. Further, since the area of the reference electrode layer ST is large, the feeding resistance can be reduced.

Further, in the above-mentioned twenty-ninth embodiment and the thirtieth embodiment, the reference electrode layer ST may be formed in the extension direction of the gate line GL such that the reference electrode layer ST is arranged parallel to the gate line GL and overlaps the region where the pixel electrode PX and the counter electrode CT are formed.

Due to such a constitution, the parasitic capacity formed between the gate line layer GL and the reference electrode layer ST can be reduced, the increase of the holding capacity is suppressed, and the potential can be stabilized.

Further, in the above-mentioned twenty-ninth embodiment and the thirtieth embodiment, the reference electrode layer ST may be formed in a region of the first substrate SUB1 which includes the region where the gate line layer GL, the drain line layer DL, the pixel electrode PX and the counter electrode CT are formed.

Due to such a constitution, since the reference electrode layer ST is formed of a so-called matted electrode, the feeding resistance can be further reduced and the limitation imposed on the feeding direction can be eliminated. Further, by increasing a layer thickness of the organic insulation layer O-PAS, the influence of the reference electrode layer ST to the liquid crystal driving electric field can be reduced. Color filters may be used in place of the organic insulation layer O-PAS. Further, when an overcoat layer is formed over the color filters, it is desirable to form the reference electrode layer ST below the color filter layer.

Figure 51:
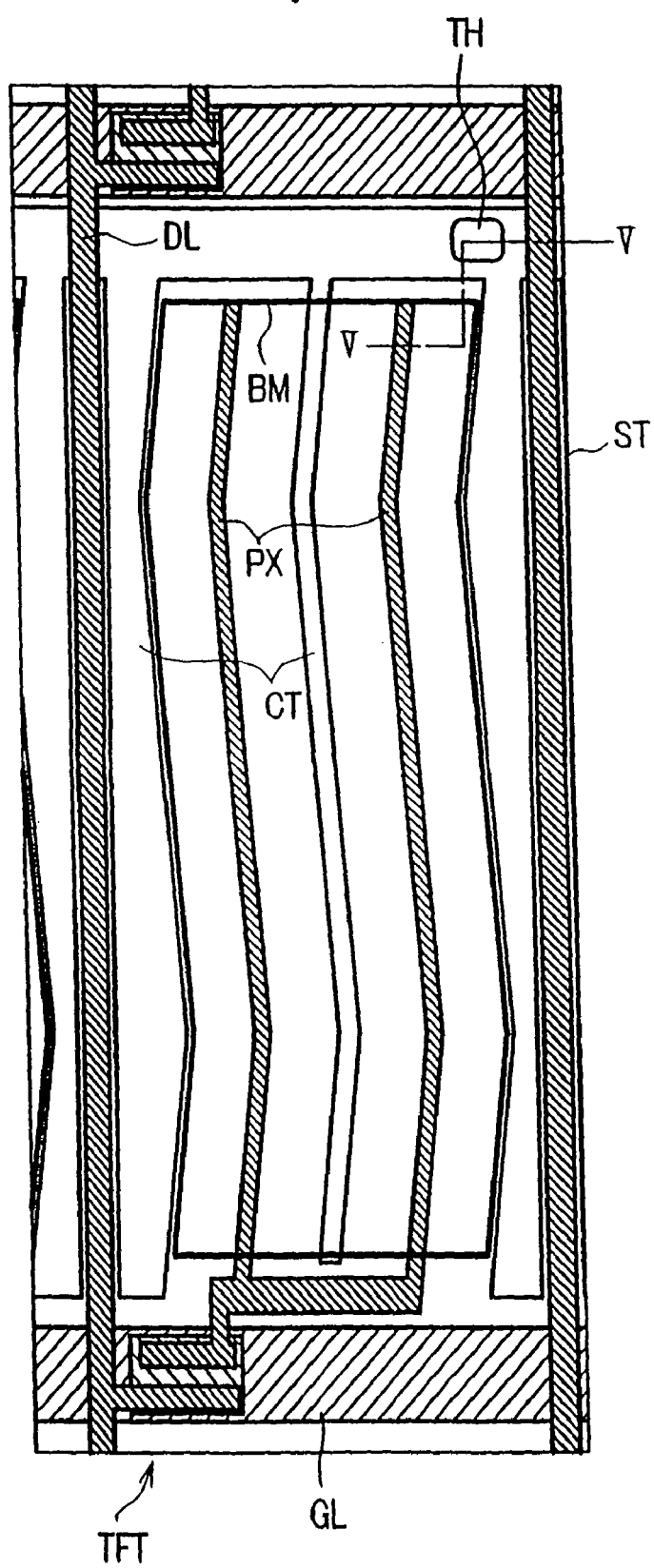
FIG. 51 is a plan view of the vicinity of one pixel of a liquid crystal display device for schematically explaining the pixel constitution of still another embodiment of the present invention.
Figure 52:
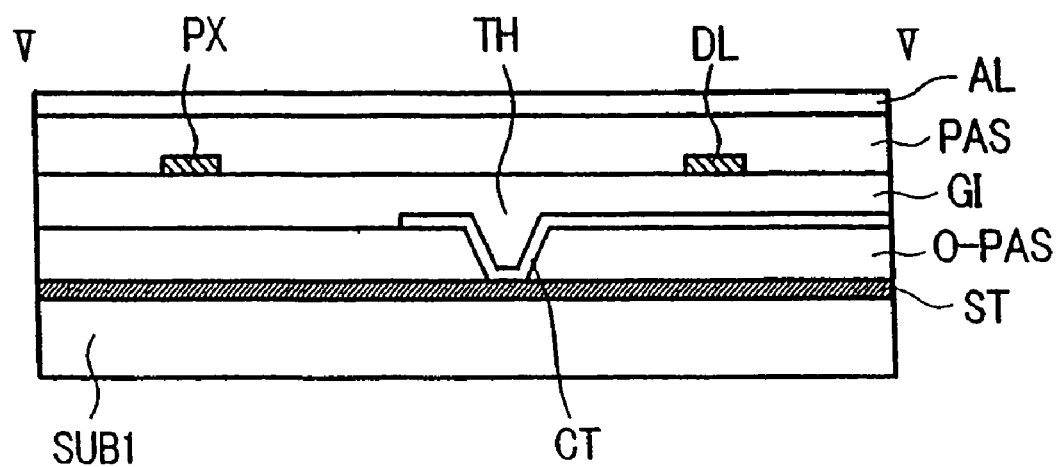
FIG. 52 is a cross-sectional view taken along a line V-V in FIG. 51.

FIG. 51 is a plan view of the vicinity of one pixel of an IPS type liquid crystal display device for schematically explaining the pixel constitution of the thirty-second embodiment of the present invention and FIG. 52 is a cross-sectional view taken along a line V-V in FIG. 51. In this embodiment, a counter electrode CT is formed over an organic insulation layer O-PAS and extends to a neighboring pixel region by crossing the drain line DL and is connected to a reference electrode layer of the neighboring pixel region via a through hole TH formed in the organic insulation layer O-PAS.

Due to such a constitution of this embodiment, even when the through hole TH is insufficiently formed, feeding electricity is performed through the reference electrode layer ST from the neighboring pixel side.

Figure 53:
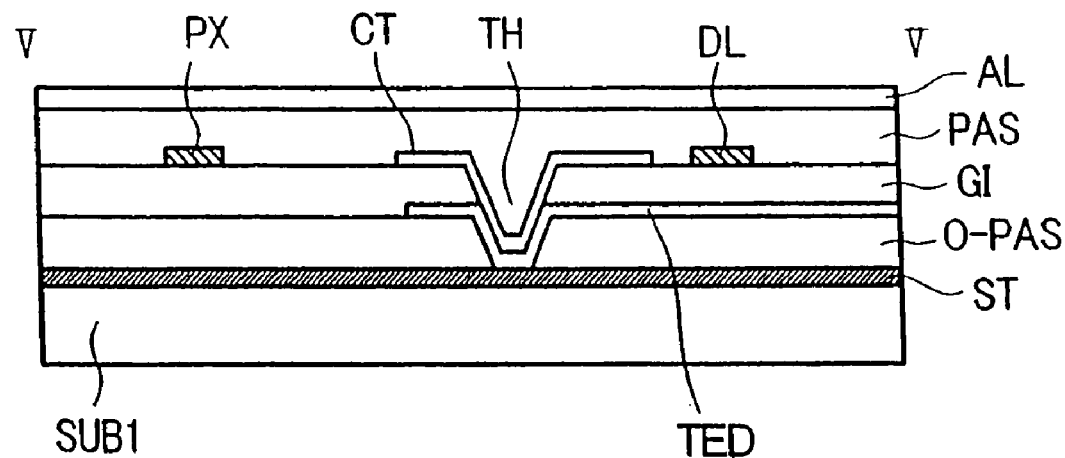
FIG. 53 is a cross-sectional view taken along a line V-V in FIG. 51 showing the vicinity of one pixel of a liquid crystal display device for schematically explaining the pixel constitution of still another embodiment of the present invention.

FIG. 53 is a cross-sectional view taken along a line V-V in FIG. 51 of the vicinity of one pixel of an IPS type liquid crystal display device for schematically explaining the pixel constitution of the thirty-third embodiment of the present invention. In this embodiment, a counter electrode CT is formed over a gate insulation layer GI and a capacitive electrode layer TED which crosses one drain line DL and extends to a neighboring pixel region is formed over the organic insulation layer O-PAS. The counter electrode layer CT is connected to a first reference electrode layer ST via a through hole TH formed in the gate insulation layer GI and the organic insulation layer O-PAS.

Due to such a constitution of this embodiment, even when the through hole TH is insufficiently formed, feeding of electricity is performed from the neighboring pixel side to the first reference electrode layer ST through the capacitive electrode layer TED. Further, by forming the through holes which connect each counter electrode and each reference electrode in a plural number for every pixel, the reliability of connection between electrode layers can be enhanced.

Figure 54:
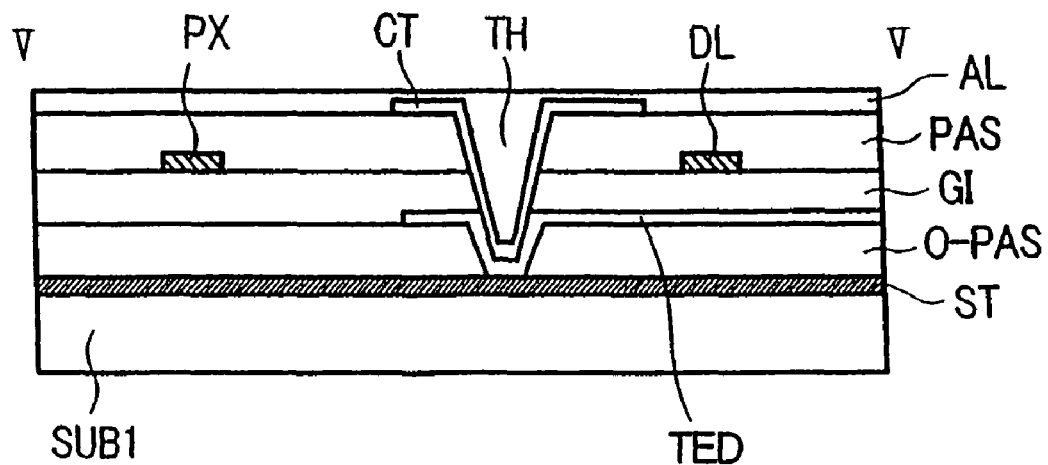
FIG. 54 is a cross-sectional view taken along a line V-V in FIG. 51 showing the vicinity of one pixel of a liquid crystal display device for schematically explaining the pixel constitution of still another embodiment of the present invention.

FIG. 54 is a cross-sectional view taken along a line V-V in FIG. 51 of the vicinity of one pixel of an IPS type liquid crystal display device for schematically explaining the pixel constitution of the thirty-fourth embodiment of the present invention. In this embodiment, a counter electrode CT is formed over a passivation layer PAS and a capacitive electrode layer TED which crosses one drain line DL and extends to a neighboring pixel region is formed over the organic insulation layer O-PAS. The counter electrode layer CT is connected to a first reference electrode layer ST via a through hole TH formed in the passivation layer PAS, the gate insulation layer GI and the organic insulation layer O-PAS.

Due to such a constitution of this embodiment, even when the through hole TH is insufficiently formed, feeding of electricity is performed from the neighboring pixel side through the capacitive electrode layer TED.

Figure 55:
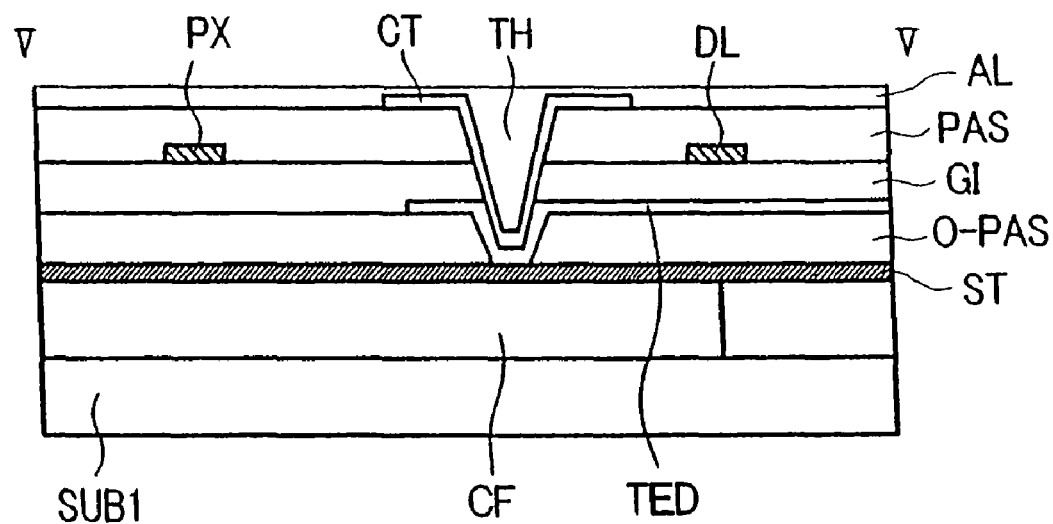
FIG. 55 is a cross-sectional view taken along a line V-V in FIG. 51 showing the vicinity of one pixel of a liquid crystal display device for schematically explaining the pixel constitution of still another embodiment of the present invention.

FIG. 55 is a cross-sectional view taken along a line V-V in FIG. 51 of the vicinity of one pixel of an IPS type liquid crystal display device for schematically explaining the pixel constitution of the thirty-fifth embodiment of the present invention. In this embodiment, a color filter layer CF is formed below the first reference electrode layer ST of the thirty-fourth embodiment shown in FIG. 54 and over the above-mentioned first substrate SUB1.

Due to such a constitution, in addition to the advantageous effects obtained by the previous embodiment, the color filter layer CF is isolated from the liquid crystal layer due to the first reference electrode layer ST and hence, the contamination of the liquid crystal due to constituent material of the color filter layer CF can be prevented.

Figure 56:
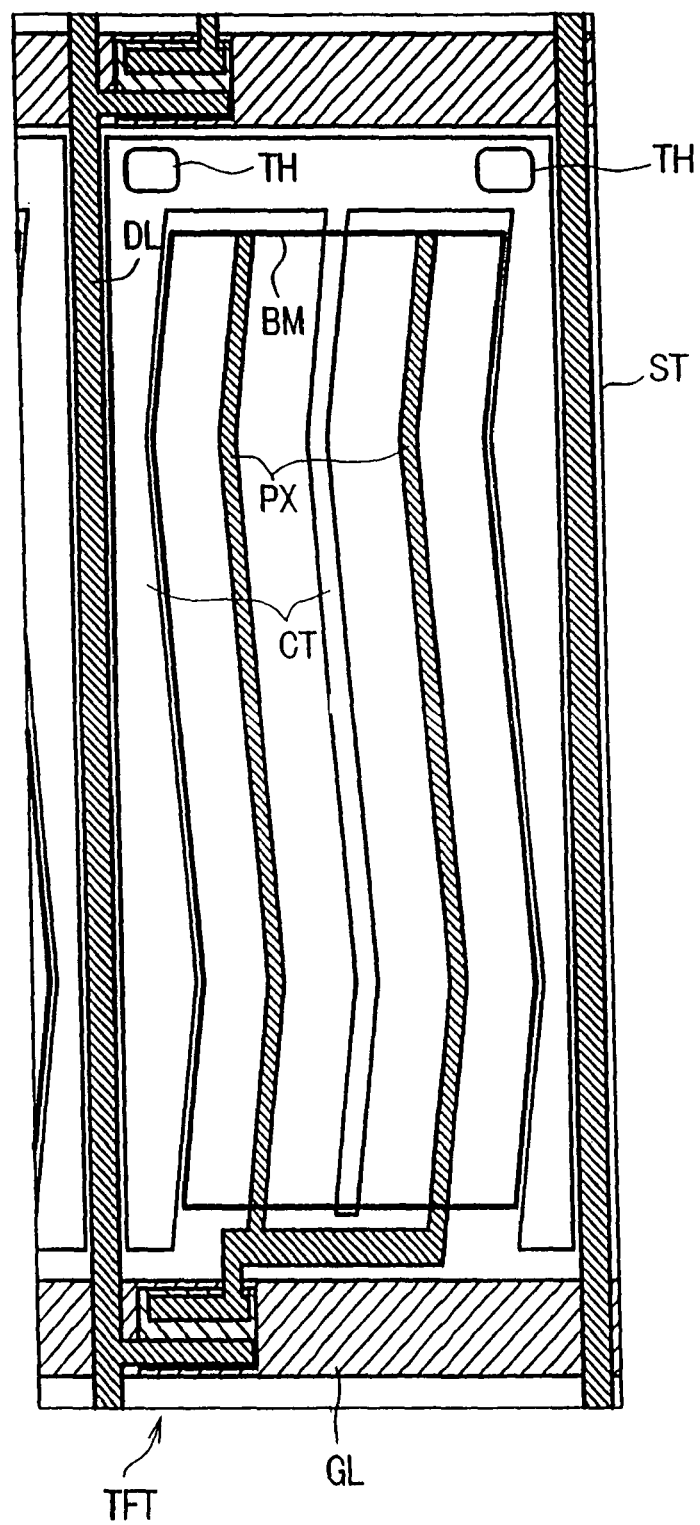
FIG. 56 is a plan view of the vicinity of one pixel of a liquid crystal display device for explaining a modification of the embodiments shown in FIG. 47 to FIG. 55.

FIG. 56 is a plan view of the vicinity of one pixel of an IPS type liquid crystal display device for explaining a modification of the embodiments shown in FIG. 47 to FIG. 55. That is, the through holes TH which connect the counter electrode CT and the reference electrode ST of each pixel are formed in a plural number for each pixel so that the reliability of connection between these electrode layers can be enhanced.

Figure 57:
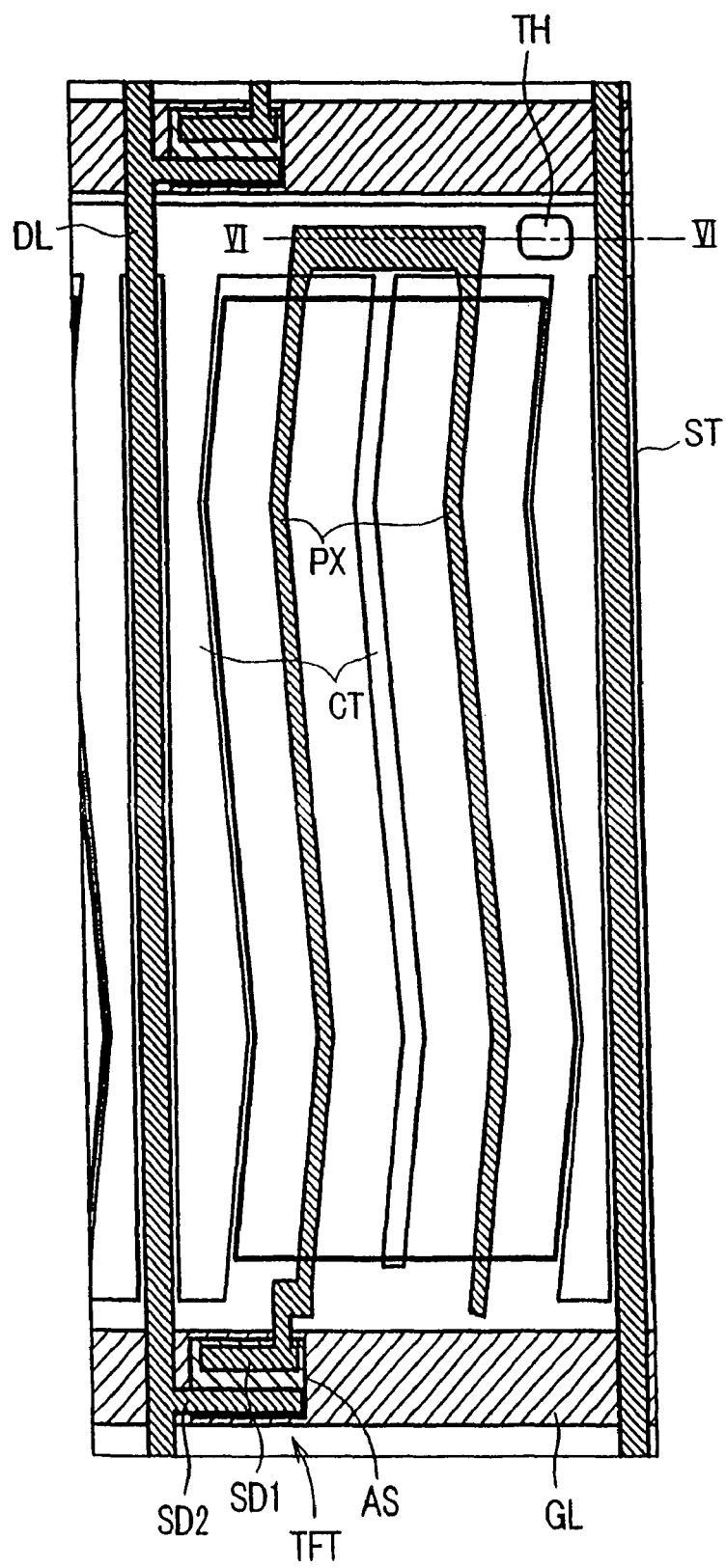
FIG. 57 is a plan view of the vicinity of one pixel of a liquid crystal display device for schematically explaining the pixel constitution of still another embodiment of the present invention.
Figure 58:
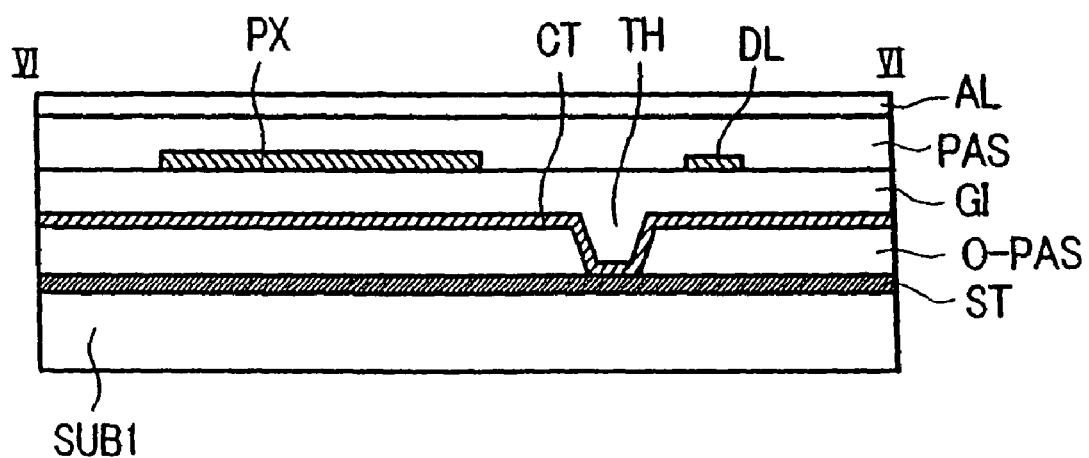
FIG. 58 is a cross-sectional view taken along a line VI-VI in FIG. 57.

FIG. 57 is a plan view of the vicinity of one pixel of an IPS type liquid crystal display device for schematically explaining the pixel constitution of the thirty-sixth embodiment of the present invention and FIG. 58 is a cross-sectional view taken along a line VI-VI in FIG. 57. In this embodiment, a counter electrode CT is formed over an organic insulation layer O-PAS such that the counter electrode CT is arranged parallel to the extension direction of a gate line GL and extends over a neighboring pixel region. Further, in each pixel region, the counter electrode CT is connected to a reference electrode ST in each pixel region via a through hole TH formed in the organic insulation layer O-PAS.

Due to such a constitution, holding capacity is formed at a portion where the counter electrode CT and the pixel electrode PX overlap each other and the gate insulation layer GI constitutes a dielectric of the holding capacity. This constitution is suitable for increasing the holding capacity.

Figure 59:
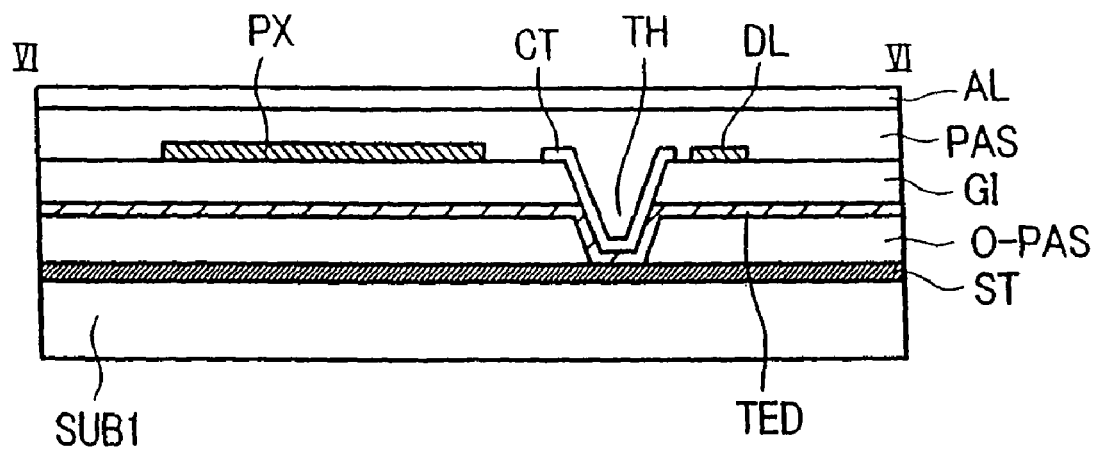
FIG. 59 is a cross-sectional view taken along a line VI-VI in FIG. 57 showing the vicinity of one pixel of a liquid crystal display device for schematically explaining the pixel constitution of still another embodiment of the present invention.

FIG. 59 is a cross-sectional view taken along a line VI-VI in FIG. 57 of the vicinity of one pixel of an IPS type liquid crystal display device for schematically explaining the pixel constitution of the thirty-seventh embodiment of the present invention. In this embodiment, a counter electrode CT is formed over a gate insulation layer, for example, and a capacitive electrode layer TED is formed over an organic insulation layer O-PAS such that the capacitive electrode layer TED is arranged parallel to the extension direction of a gate line GL and extends over a pixel region disposed close to the organic insulation layer O-PAS. In each pixel region, the counter electrode CT is connected to a reference electrode layer ST via a through hole TH formed in the organic insulation layer O-PAS and a gate insulation layer GI in a penetrating manner. Further, holding capacity is formed at a portion where the capacitive electrode layer TED and the pixel electrode layer PX overlap each other.

Due to such a constitution, the gate insulation layer GI constitutes a dielectric of the holding capacity and forms a comb-shaped pixel electrode.

Figure 60:
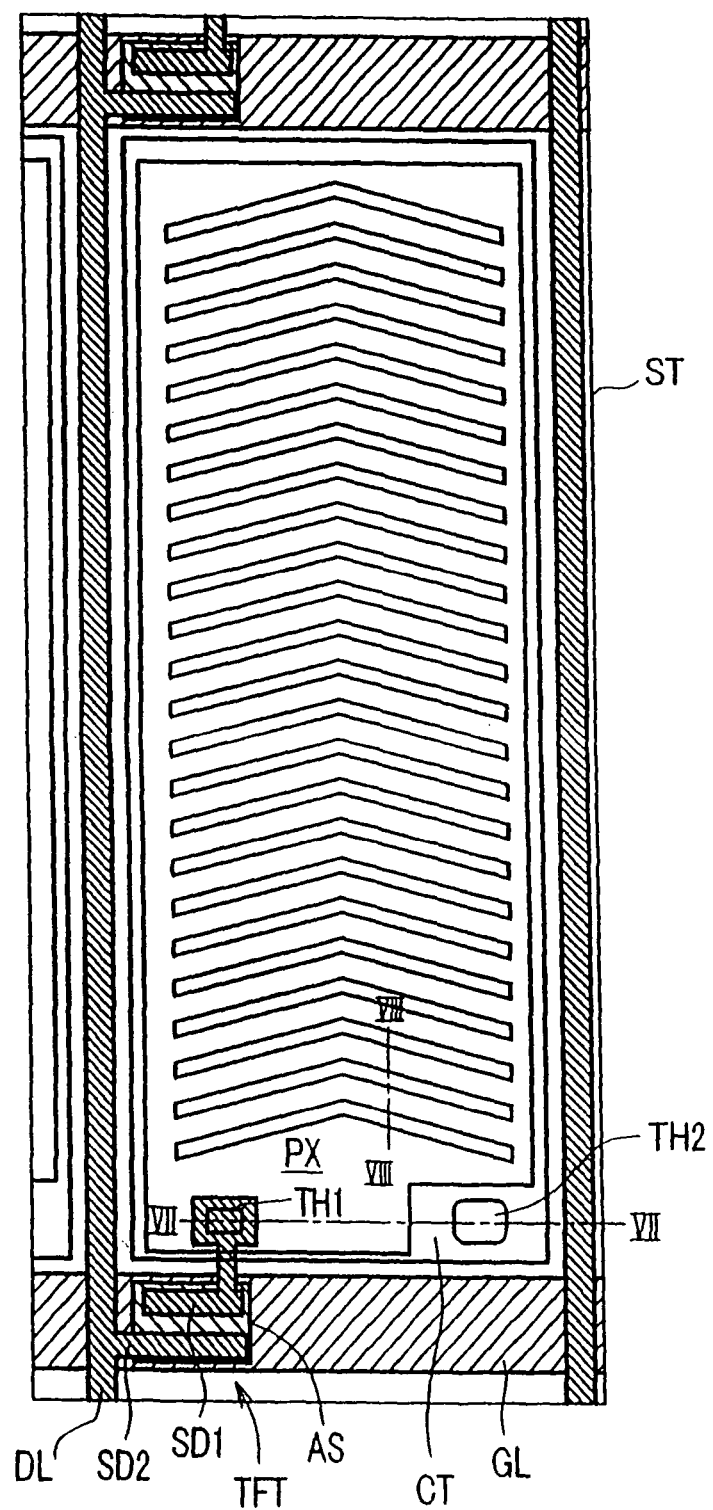
FIG. 60 is a plan view of the vicinity of one pixel of a liquid crystal display device for schematically explaining the pixel constitution of still another embodiment of the present invention.
Figure 61:
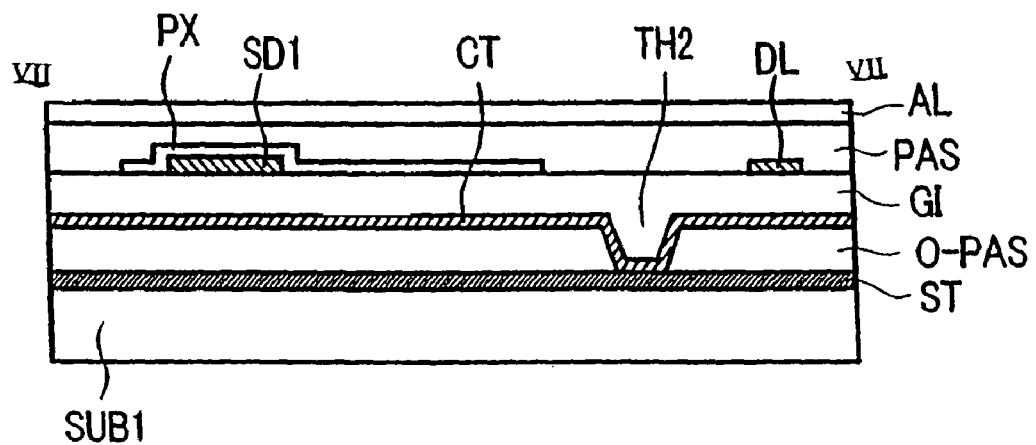
FIG. 61 is a cross-sectional view taken along a line VII-VII in FIG. 60.
Figure 62:
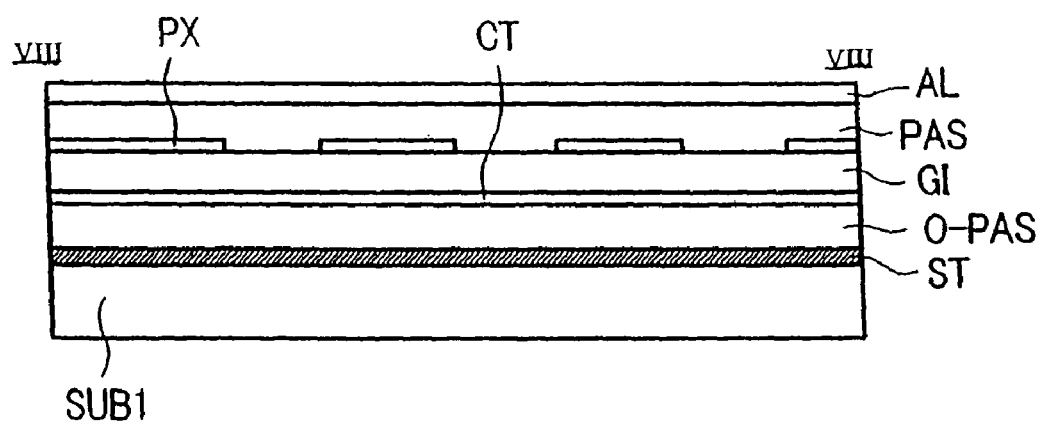
FIG. 62 is a cross-sectional view taken along a line VIII-VIII in FIG. 60.

FIG. 60 is a plan view of the vicinity of one pixel of a modified IPS type liquid crystal display device for schematically explaining the pixel constitution of the thirty-eighth embodiment of the present invention, FIG. 61 is a cross-sectional view taken along a line VII-VII in FIG. 60, and FIG. 62 is a cross-sectional view taken along a line VIII-VIII in FIG. 60. In this embodiment, a pixel electrode PX is formed over a gate insulation layer GI in a so-called herringbone shape. A source electrode SD1 is formed over the gate insulation layer GI and a pixel electrode overlaps the source electrode SD1. A counter electrode CT is formed over an organic insulation layer O-PAS and is connected to a reference electrode layer ST via a through hole TH2 thus forming holding capacity between the counter electrode CT and the above-mentioned pixel electrode PX.

Due to such a constitution of this embodiment, the gate insulation layer GI constitutes a dielectric of the holding capacity and hence, the reduction of holding capacity brought about by forming the pixel electrode in a herringbone shape can be increased.

Figure 63:
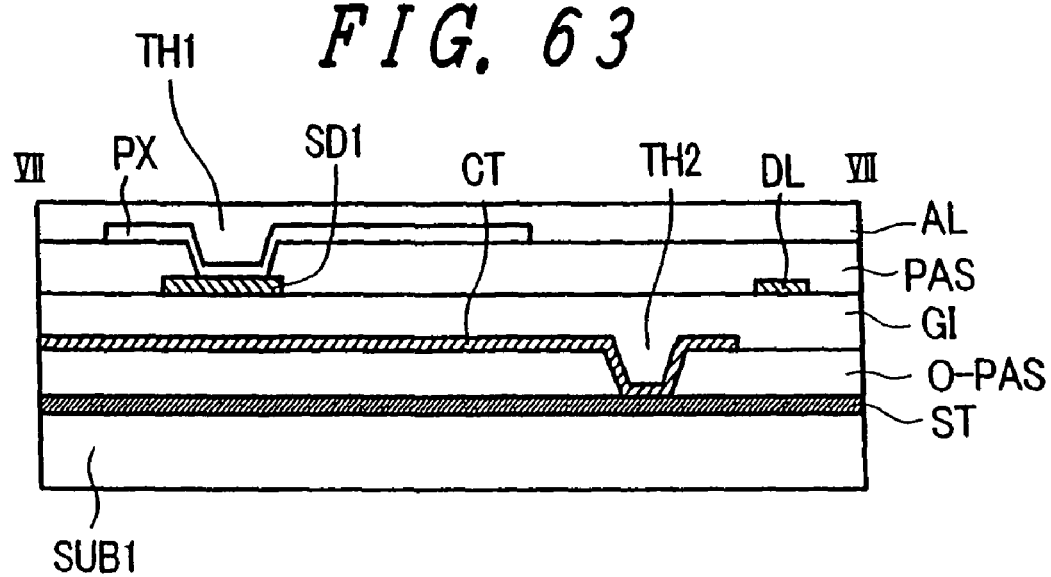
FIG. 63 is a cross-sectional view taken along a line VII-VII in FIG. 60 showing the vicinity of one pixel of a liquid crystal display device for schematically explaining the pixel constitution of still another embodiment of the present invention.

FIG. 63 is a cross-sectional view taken along a line VII-VII in FIG. 60 of the vicinity of one pixel of a modified IPS type liquid crystal display device for schematically explaining the pixel constitution of the thirty-ninth embodiment of the present invention. In this embodiment, a source electrode SD1 is formed over a gate insulation layer GI and is connected to a pixel electrode PX formed over a passivation layer PAS via a through hole TH1. This embodiment is similar to the embodiment shown in FIG. 61 with respect to other constitutions.

Due to such a constitution, the gate insulation layer GI constitutes a dielectric of holding capacity.

Figure 64:
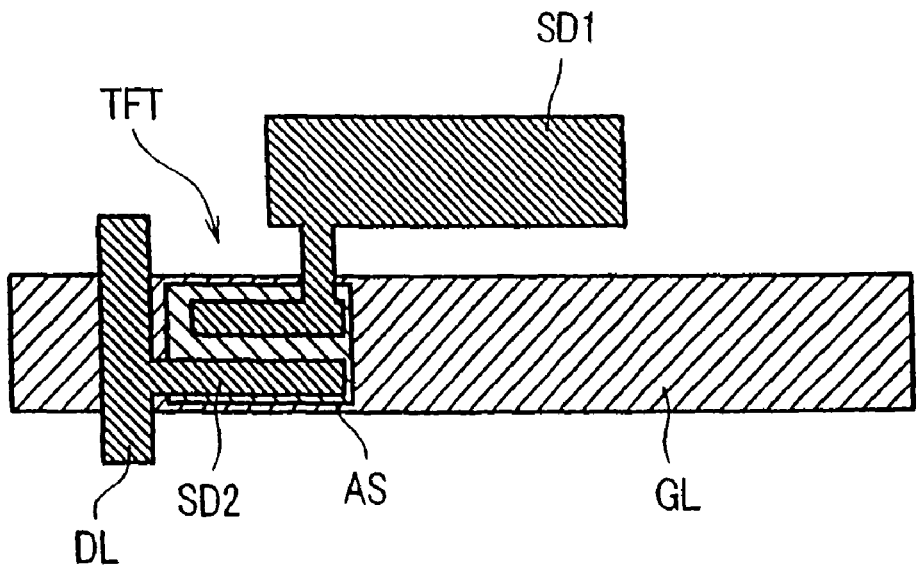
FIG. 64 is a plan view of a portion of a thin film transistor TFT of a liquid crystal display device for schematically explaining an essential part of the pixel constitution of still another embodiment of the present invention.

FIG. 64 is a plan view of a thin film transistor TFT portion of a modified IPS type liquid crystal display device for schematically explaining an essential part of the pixel constitution of the fortieth embodiment of the present invention. In this embodiment, holding capacity can be adjusted by changing an area of a source electrode SD1 of the thin film transistor TFT formed over a gate insulation layer GI.

The holding capacity can be adjusted in other embodiments of the present invention using such a concept.

Figure 65:
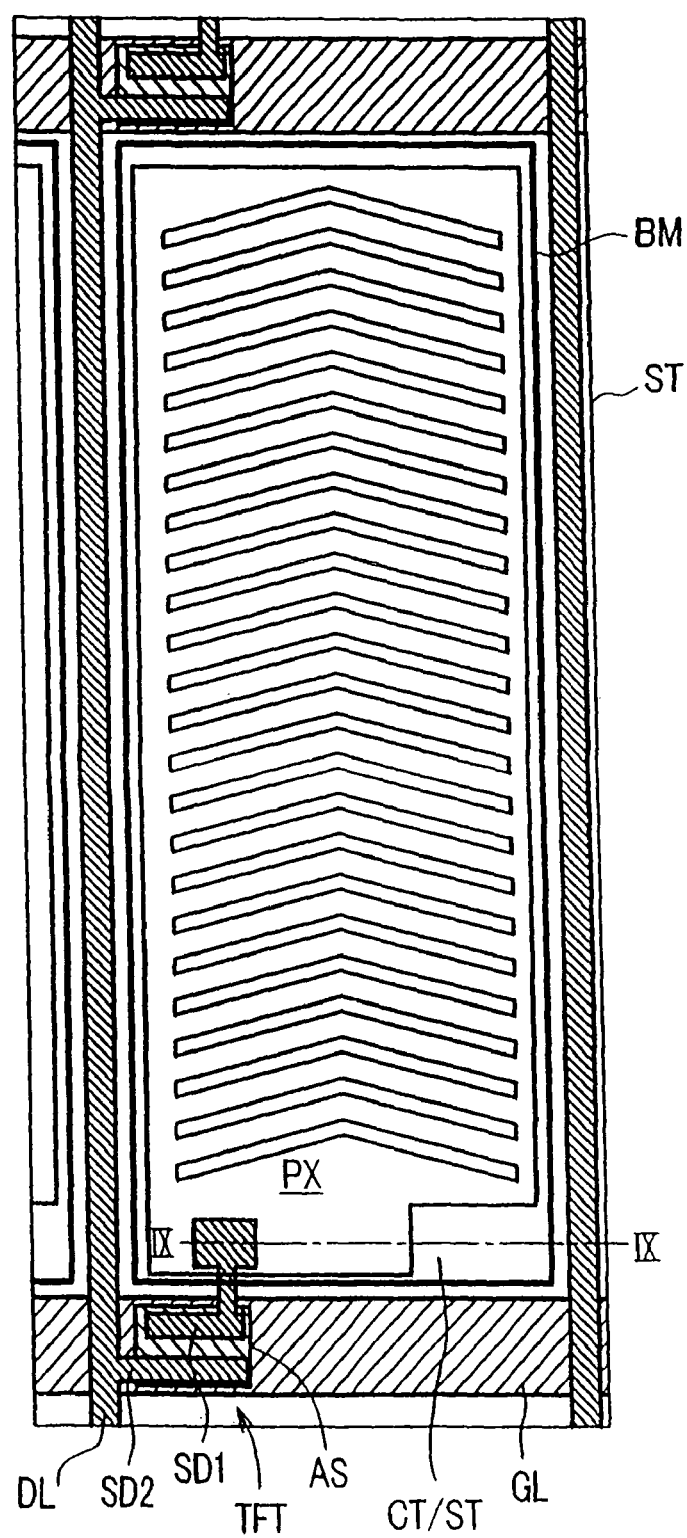
FIG. 65 is a plan view of the vicinity of one pixel of a liquid crystal display device for schematically explaining an essential part of the pixel constitution of still another embodiment of the present invention.
Figure 66:
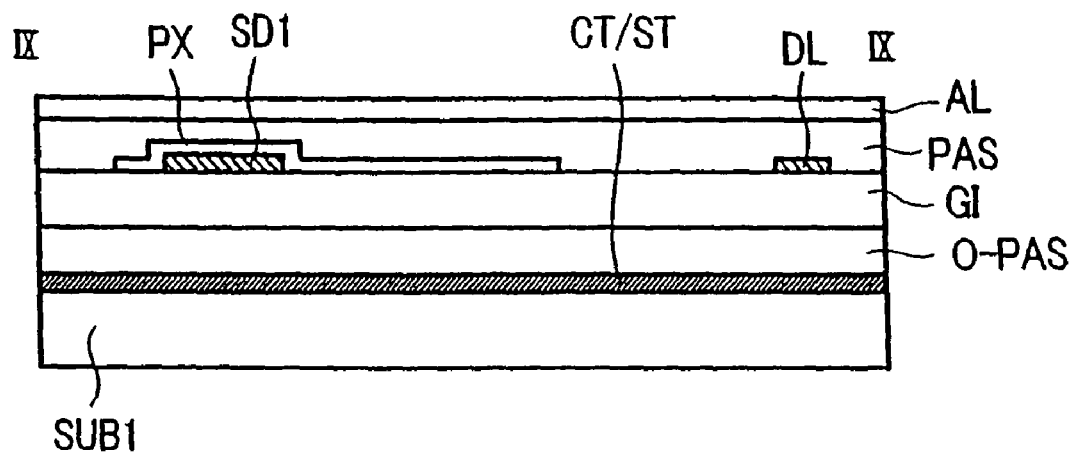
FIG. 66 is a cross sectional view taken along a line IX-IX in FIG. 65.

FIG. 65 is a plan view of the vicinity of one pixel of a modified IPS type liquid crystal display device for schematically explaining an essential part of the pixel constitution of the forty-first embodiment of the present invention and FIG. 66 is a cross-sectional view taken along a line IX-IX in FIG. 65. In this embodiment, a pixel electrode PX Is formed over a gate insulation layer GI in a so-called herringbone shape. A source electrode SD1 is formed over the gate insulation layer GI and a pixel electrode overlaps the source electrode SD1. A reference electrode is formed below an organic insulation layer O-PAS and this reference electrode constitutes a reference/counter electrode layer ST/CT which also functions as a counter electrode. Holding capacity is formed between the reference/counter electrode layer ST/CT and the pixel electrode PX.

Due to such a constitution of this embodiment, it is possible to obtain a liquid crystal display device which can render the formation of the counter electrode layer CT unnecessary, can largely reduce the feeding resistance with respect to the holding capacity and prevents the reduction of numerical aperture of the pixel.

Further, the reference/counter electrode layer ST/CT is formed in the extension direction of the gate line GL such that the reference/counter electrode layer ST/CT is arranged parallel to the gate line GL, for example, and overlaps a region where the pixel electrode PX is formed.

Due to such a constitution, it is unnecessary to provide an independent reference/counter electrode layer for every pixel so that capacity between the gate line layer GL and the reference/counter electrode layer ST/CT can be reduced, the increase of parasitic capacity can be suppressed, and the potential can be stabilized.

Further, the reference/counter electrode layer ST/CT is formed over the whole region of the first substrate SUB1 including a region where the gate line GL, the drain line DL and the pixel electrode PX are formed.

Due to such a constitution, the reference/counter electrode layer ST/CT constitutes a so-called matted electrode and hence, feeding resistance is further reduced and the limitation imposed on the feeding direction can be eliminated.

Figure 67:
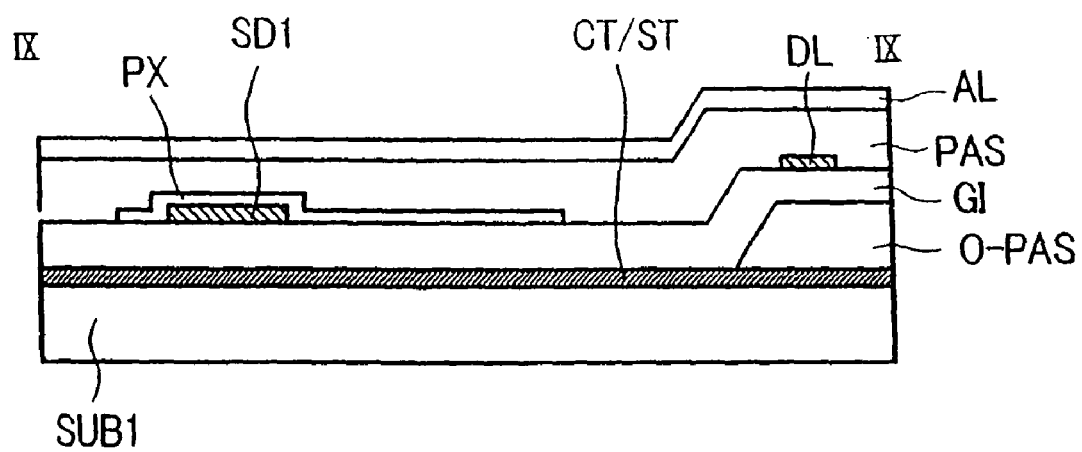
FIG. 67 is a cross-sectional view taken along a line IX-IX in FIG. 65 showing the vicinity of one pixel of a liquid crystal display device for schematically explaining an essential part of the pixel constitution of still another embodiment of the present invention.

FIG. 67 is a cross-sectional view taken along a line IX-IX in FIG. 65 of the vicinity of one pixel of a modified IPS type liquid crystal display device for schematically explaining an essential part of the pixel constitution of the forty-second embodiment of the present invention. In this embodiment, a pixel electrode PX is formed over a gate insulation layer GI in a so-called herringbone shape. A source electrode SD1 is formed over the gate insulation layer GI and a pixel electrode overlaps the source electrode SD1. This embodiment corresponds to a constitution which is formed by wholly or partially removing an organic insulation layer O-PAS below the pixel electrode PX from the constitution shown in FIG. 66.

Due to such a constitution, the strength of an electric field generated between the pixel electrode PX and the reference/counter electrode layer ST/CT can be increased so that the driving voltage can be reduced.

Figure 68:
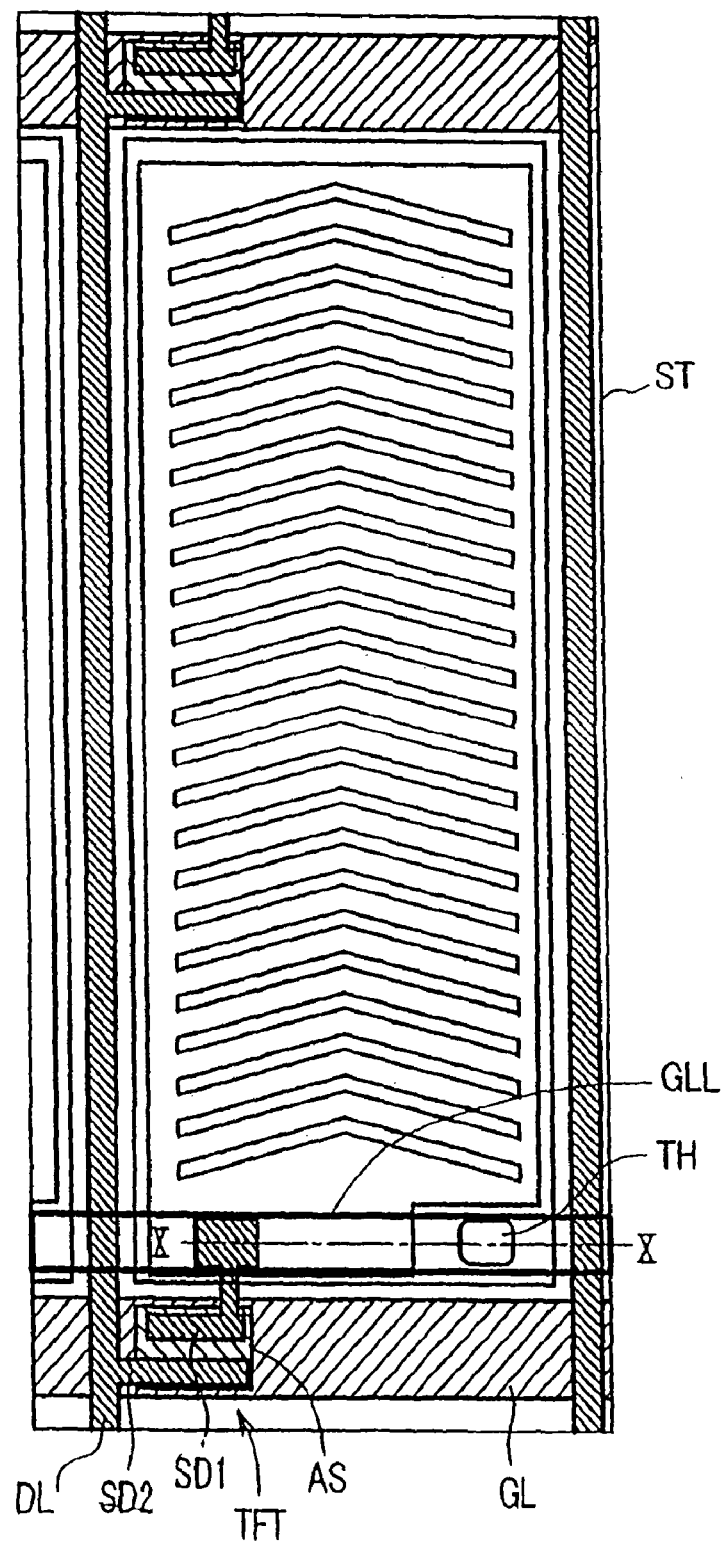
FIG. 68 is a plan view of the vicinity of one pixel of a liquid crystal display device for schematically explaining an essential part of the pixel constitution of still another embodiment of the present invention.
Figure 69:
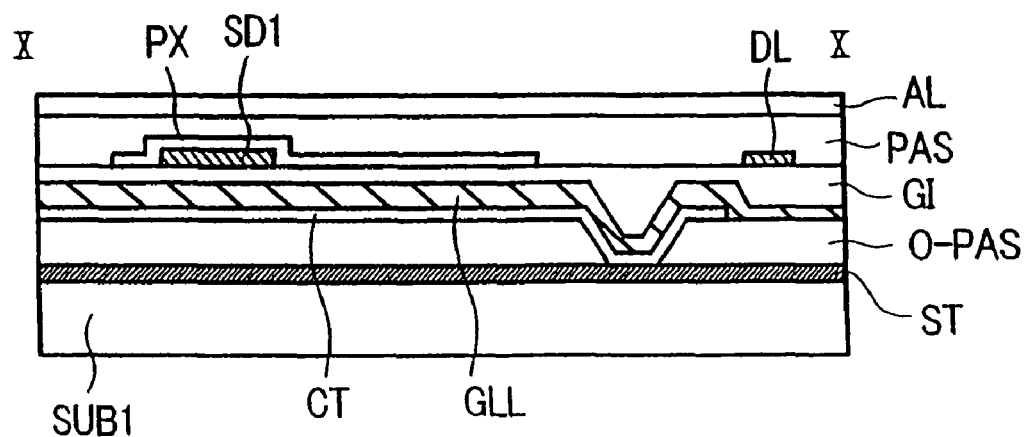
FIG. 69 is a cross sectional view taken along a line X-X in FIG. 68.

FIG. 68 is a plan view of the vicinity of one pixel of a modified IPS type liquid crystal display device for schematically explaining an essential part of the pixel constitution of the forty-third embodiment of the present invention and FIG. 69 is a cross-sectional view taken along a line X-X in FIG. 68. In this embodiment, a counter electrode layer CT is formed over an organic insulation layer O-PAS and a connection line GLL which is arranged parallel to the extension direction of a gate line GL and is connected to a pixel electrode PX disposed close to the counter electrode CT is formed over the counter electrode layer CT.

Figure 70:
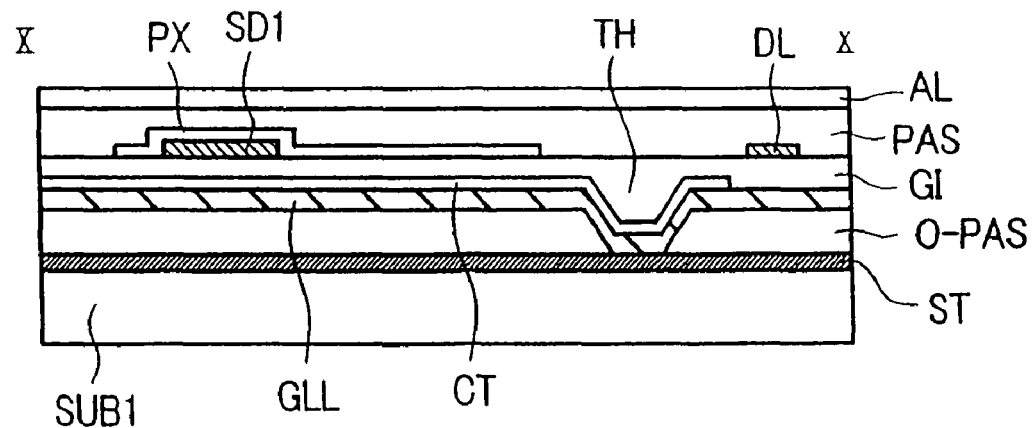
FIG. 70 is a cross-sectional view taken along a line X-X in FIG. 68 showing the vicinity of one pixel of a liquid crystal display device for schematically explaining an essential part of the pixel constitution of still another embodiment of the present invention.

FIG. 70 is a cross-sectional view taken along a line X-X in FIG. 68 of the vicinity of one pixel of a modified IPS type liquid crystal display device for schematically explaining an essential part of the pixel constitution of the forty-fourth embodiment of the present invention. In this embodiment, a connection line GLL which is arranged parallel to the extension direction of a gate line GL and is connected to a pixel electrode layer PX disposed close to a counter electrode layer CT is formed between the counter electrode layer CT and an organic insulation layer O-PAS.

Due to such constitutions of the forty-third embodiment and the forty-fourth embodiment, even when a through hole TH is formed insufficiently, feeding of electricity is performed from a neighboring pixel side through a conductive layer. Further, by forming the through holes TH which connect each counter electrode layer CT and the each reference electrode ST in a plural number for every pixel, the reliability of connection between these electrode layers can be enhanced.

Figure 71:
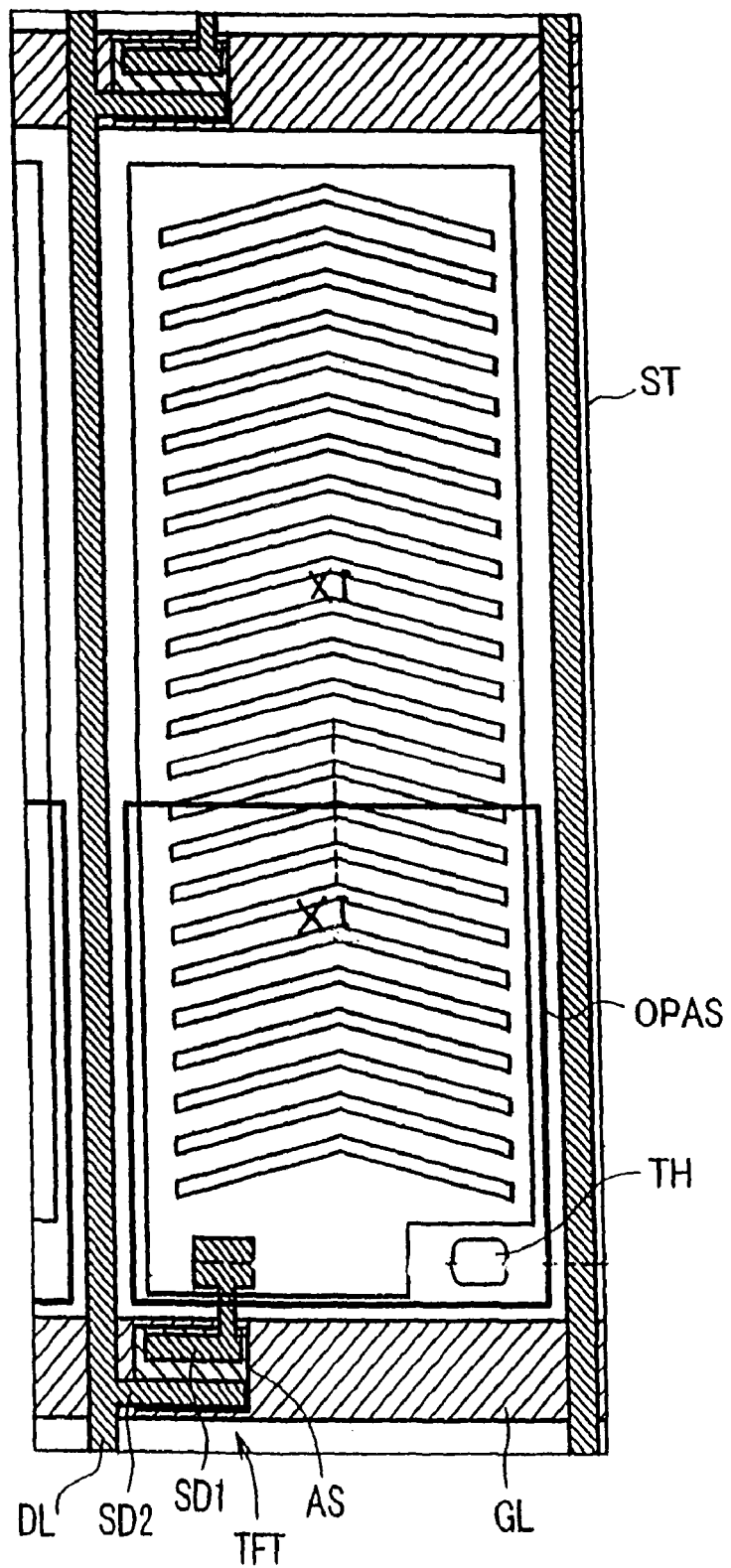
FIG. 71 is a plan view of the vicinity of one pixel of a liquid crystal display device for schematically explaining an essential part of the pixel constitution of still another embodiment of the present invention.
Figure 72:
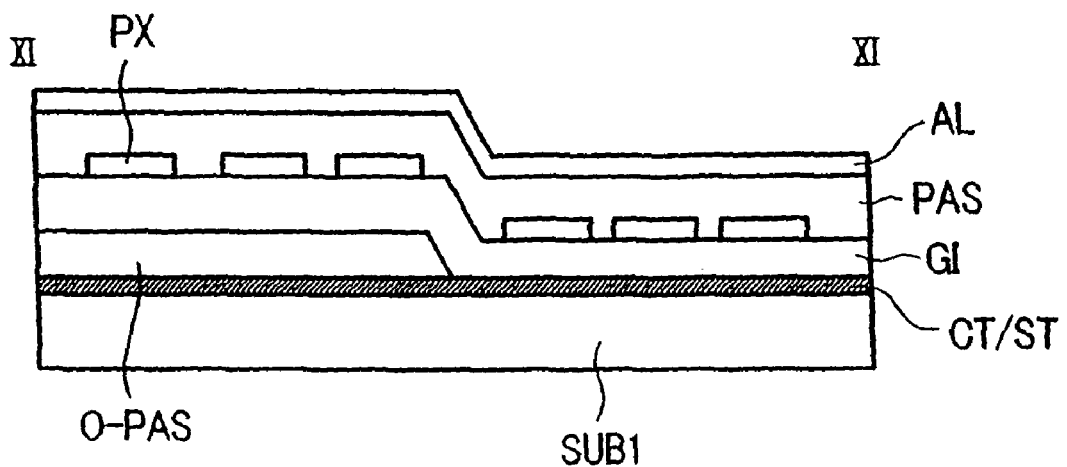
FIG. 72 is a cross sectional view taken along a line XI-XI in FIG. 71.

FIG. 71 is a plan view of the vicinity of one pixel of a modified IPS type liquid crystal display device for schematically explaining an essential part of the pixel constitution of the forty-fifth embodiment of the present invention and FIG. 72 is a cross-sectional view taken along a line XI-XI in FIG. 71. In this embodiment, the liquid crystal display device is provided with a reference/counter electrode layer ST/CT which functions as a reference electrode layer and also as a counter electrode and a portion of an organic insulation layer O-PAS in a pixel region is removed.

Figure 73:
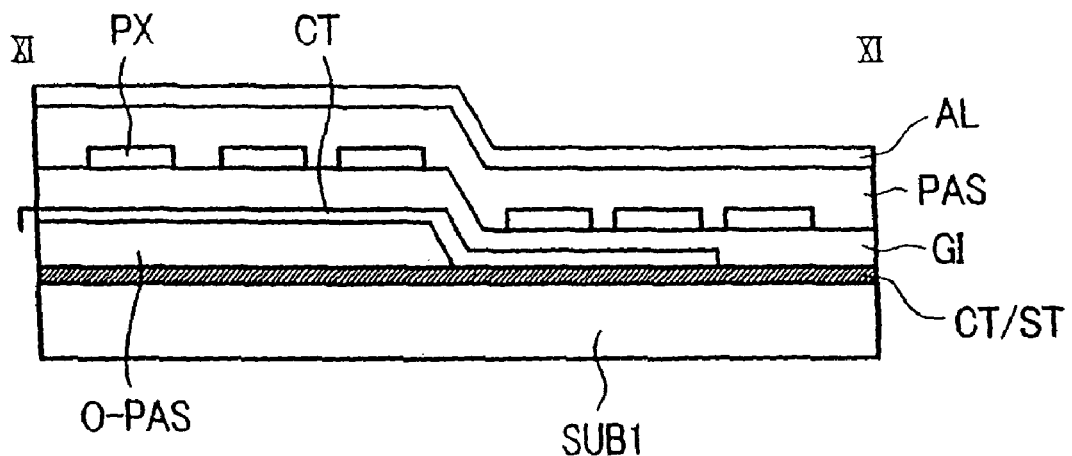
FIG. 73 is a cross-sectional view taken along a line XI-XI in FIG. 68 showing the vicinity of one pixel of a liquid crystal display device for schematically explaining an essential part of the pixel constitution of still another embodiment of the present invention.

FIG. 73 is a cross-sectional view taken along a line XI-XI in FIG. 71 of the vicinity of one pixel of a modified IPS type liquid crystal display device for schematically explaining an essential part of the pixel constitution of the forty-sixth embodiment of the present invention. In this embodiment, a counter electrode CT is formed over an organic insulation layer O-PAS and a portion of the organic insulation layer O-PAS within a pixel region is removed.

Due to the constitutions of the forty-fifth embodiment and the forty-sixth embodiment, it is possible to form a plurality of regions which differ in driving voltage within the pixel region so that the liquid crystal display device can obtain a multi-domain effect.

Figure 74:
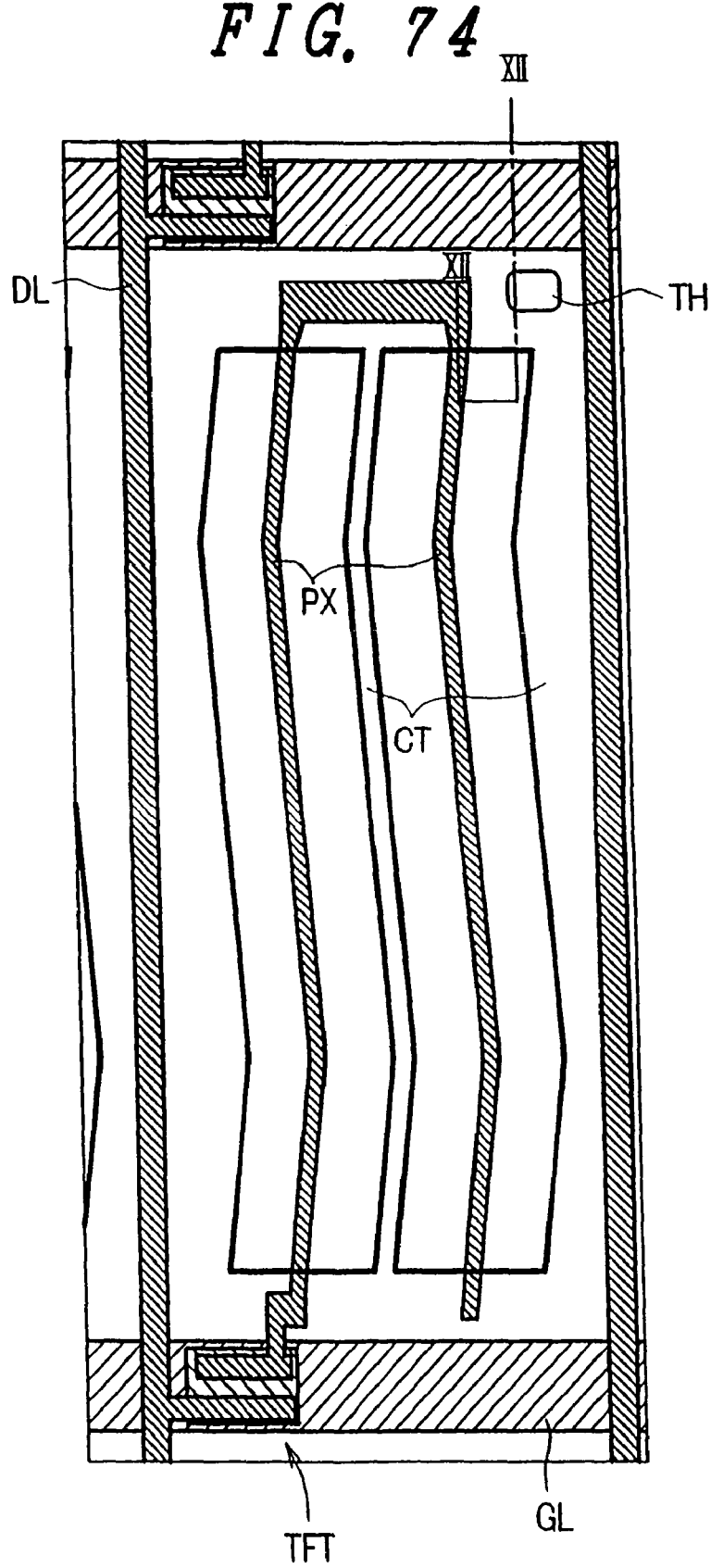
FIG. 74 is a plan view of the vicinity of one pixel of a liquid crystal display device for schematically explaining an essential part of the pixel constitution of still another embodiment of the present invention.
Figure 75:
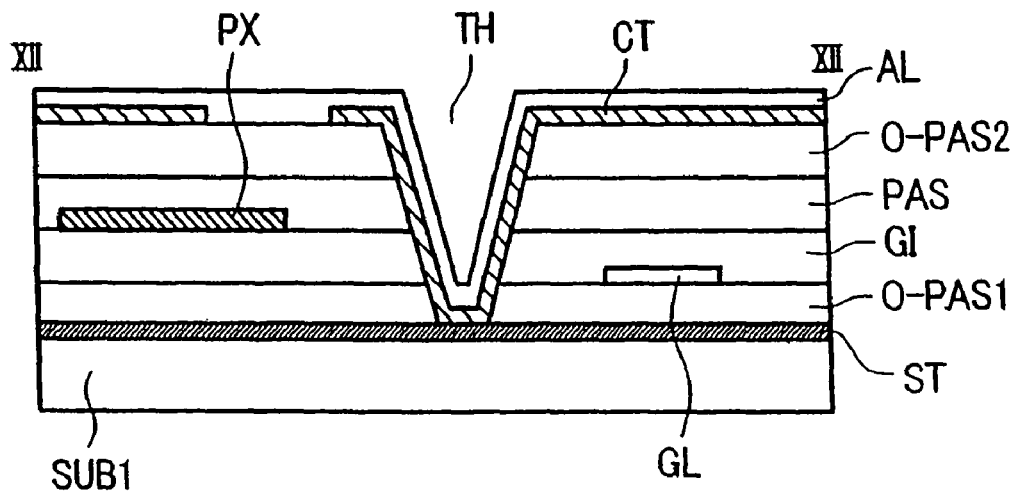
FIG. 75 is a cross sectional view taken along a line XII-XII in FIG. 74.

FIG. 74 is a plan view of the vicinity of one pixel of another modified IPS type liquid crystal display device for schematically explaining an essential part of the pixel constitution of the forty-seventh embodiment of the present invention and FIG. 75 is a cross-sectional view taken along a line XII-XII in FIG. 74.

In this embodiment, the liquid crystal display device is constituted as follows. That is, liquid crystal is filled in a gap which is defined by a first substrate SUB1 and a second substrate SUB2 which face each other in an opposed manner. On an inner surface of the first substrate, at least a plurality of gate lines which extend in the first direction and are arranged in parallel to each other, a plurality of drain lines which extend in the second direction crossing the gate lines and are arranged parallel to each other, a plurality of switching element which are provided to crossing portions of the gate lines and drain lines, pixel electrode which are driven by the switching elements, and counter electrodes which generate electric fields for driving pixels between the pixel electrodes and the counter electrodes are formed. Pixel regions are constituted of a plurality of pixel electrodes.

Further, with respect to the shapes of these electrodes, the pixel electrode PX may be formed in a planar shape and the counter electrode CT may be formed in a herringbone shape. That is, in this embodiment, the electrodes may be configured to have shapes opposite to the shapes of electrodes shown in FIG. 60, FIG. 65, FIG. 68 or FIG. 71. In this case, it is possible to shield a leaked electric field from the gate line GL and the drain line DL by the counter electrode CT so that the further enhancement of image qualities can be realized.

Further, in this embodiment, between the electrode forming layer which is constituted of the gate line GL, the drain line DL, thin film transistor TFT, and the pixel electrode PX including the pixel regions of the first substrate SUB1 and the first substrate SUB1 side, the reference electrode layer ST which is insulated by the first insulation layer O-PAS1 with respect to the electrode forming layer is formed.

With respect to the electrode forming layer, over the organic insulation layer O-PAS1, the gate line GL, the gate insulation layer GI, the passivation layer PAS, the second organic insulation layer O-PAS2 and the counter electrode CT are laminated in this order. The counter electrode layer CT is shared by a pixel region disposed close to the pixel region in the extension direction of the gate line GL and a pixel region disposed close to the pixel region in the extension direction of drain line DL. Then, the counter electrode layer CT is connected to the reference electrode layer ST via a through hole TH which penetrates the second organic insulation layer O-PAS2, the passivation layer PAS, the gate insulation layer GI and the first organic insulation layer O-PAS1, thus forming holding capacity of the pixel between the pixel electrode PX and the reference electrode layer ST.

Due to the constitution of this embodiment, it is possible to shield leaking of electric field from the gate line GL and the drain line DL using the counter electrode CT and hence, the further enhancement of image qualities can be realized.

Figure 76:
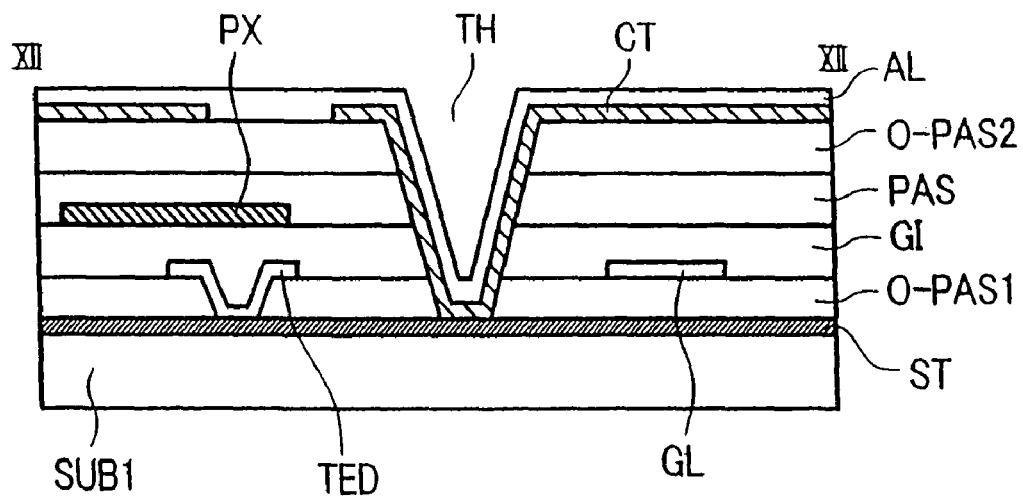
FIG. 76 is a cross-sectional view taken along a line XII-XII in FIG. 74 showing the vicinity of one pixel of a liquid crystal display device for schematically explaining an essential part of the pixel constitution of still another embodiment of the present invention.

FIG. 76 is a cross-sectional view taken along a line XII-XII in FIG. 74 of the vicinity of one pixel of another modified IPS type liquid crystal display device for schematically explaining an essential part of the pixel constitution of the forty-eighth embodiment of the present invention. This embodiment includes a capacitive electrode layer TED which is connected to a reference electrode layer ST via through hole TH below a pixel electrode PX and is arranged between a first organic insulation layer O-PAS1 and a gate insulation layer GI.

Due to such a constitution, holding capacity can be increased and adjusted by changing an area of the capacitive electrode layer TED.

Figure 77:
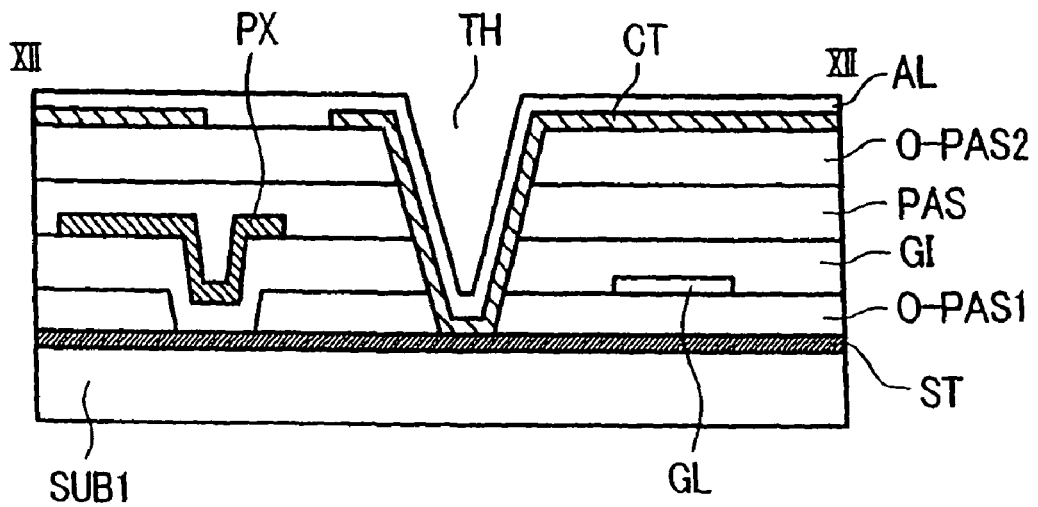
FIG. 77 is a cross-sectional view taken along a line XII-XII in FIG. 74 showing the vicinity of one pixel of a liquid crystal display device for schematically explaining an essential part of the pixel constitution of still another embodiment of the present invention.

FIG. 77 is a cross-sectional view taken along a line XII-XII in FIG. 74 of the vicinity of one pixel of another modified IPS type liquid crystal display device for schematically explaining an essential part of the pixel constitution of the forty-ninth embodiment of the present invention. In this embodiment, a portion of a first organic insulation layer O-PAS1 which forms holding capacity below a pixel electrode PX is removed.

In such a constitution, due to devoid of the organic insulation layer having small dielectric constant, the holding capacity formed between the pixel electrode PX and the reference electrode layer ST can be increased.

Figure 78:
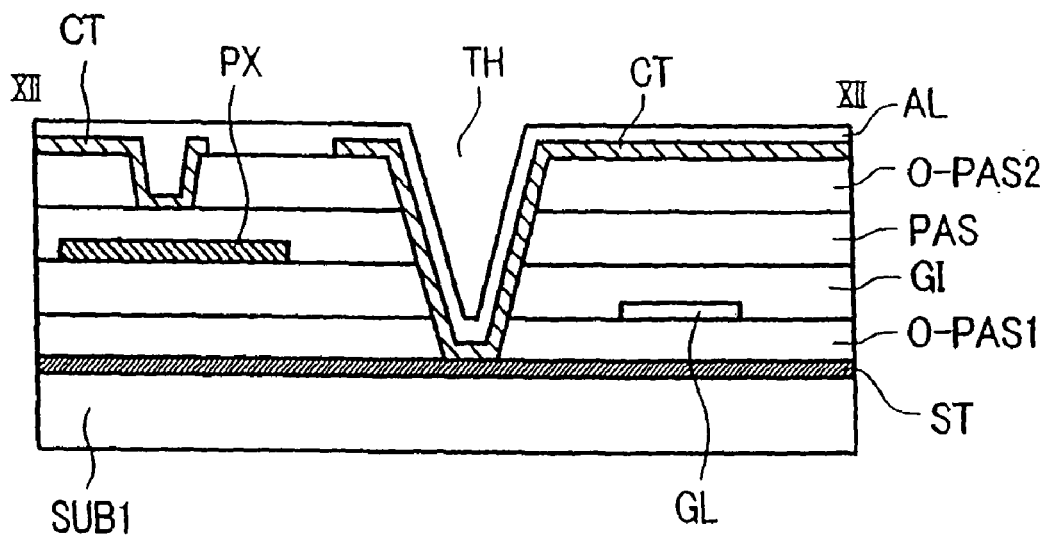
FIG. 78 is a cross-sectional view taken along a line XII-XII in FIG. 74 showing the vicinity of one pixel of a liquid crystal display device for schematically explaining an essential part of the pixel constitution of still another embodiment of the present invention.

FIG. 78 is a cross-sectional view taken along a line XII-XII in FIG. 74 of the vicinity of one pixel of another modified IPS type liquid crystal display device for schematically explaining an essential part of the pixel constitution of the fiftieth embodiment of the present invention. In this embodiment, a portion of a second organic insulation layer O-PAS2 which is disposed above a pixel electrode PX and below a counter electrode CT is removed.

Also in this embodiment, due to devoid of the organic insulation layer having small dielectric constant, the holding capacity formed between the pixel electrode PX and the reference electrode layer ST can be increased.

Figure 79:
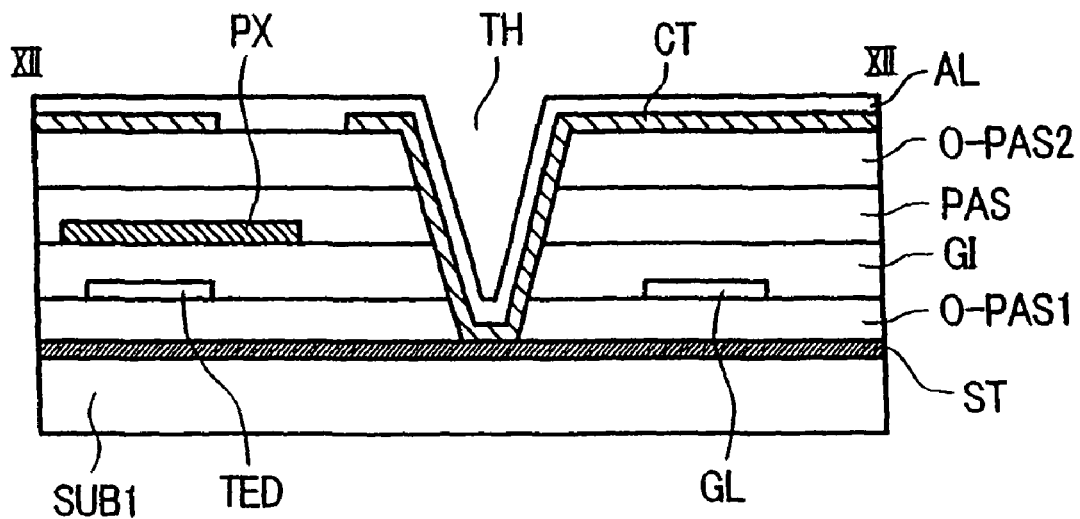
FIG. 79 is a cross-sectional view taken along a line XII-XII in FIG. 74 showing the vicinity of one pixel of a liquid crystal display device for schematically explaining an essential part of the pixel constitution of still another embodiment of the present invention.

FIG. 79 is a cross-sectional view taken along a line XII-XII in FIG. 74 of the vicinity of one pixel of another modified IPS type liquid crystal display device for schematically explaining an essential part of the pixel constitution of the fifty-first embodiment of the present invention. In this embodiment, a capacitive electrode layer TED is formed between a gate insulation layer GI and a first organic insulation layer O-PAS1 which are disposed below a pixel electrode PX. This capacitive electrode layer TED is connected to a counter electrode layer CT at a position not shown in the drawing. Further, the capacitive electrode TED may be formed parallel to the extension direction of the gate line GL and is shared in common by the pixels.

Due to such a constitution, the holding capacity can be increased or adjusted by changing an area of the capacitive electrode TED.

Embodiments of other constitutional portions of the liquid crystal display device of the present invention are explained hereinafter.

Figure 80:
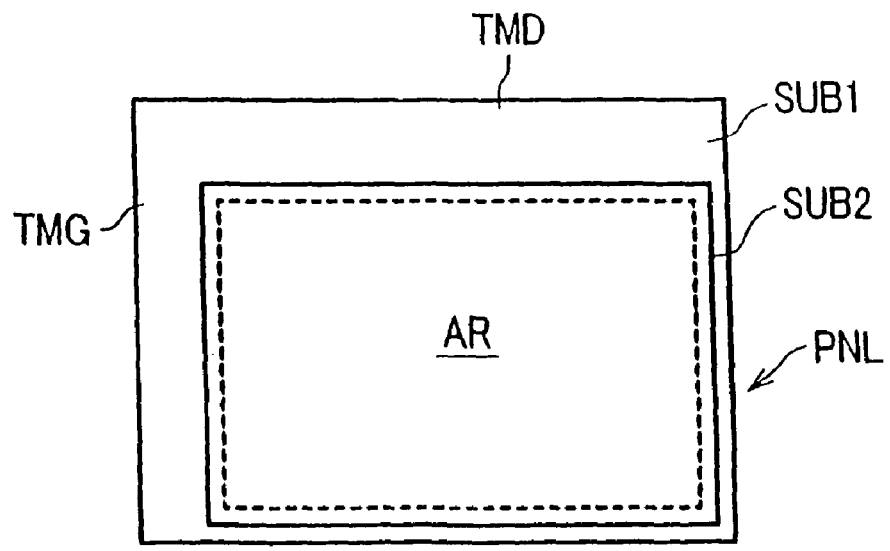
FIG. 80 is an explanatory view for explaining the constitution of a substrate of the liquid crystal display device of the present invention.

FIG. 80 is an explanatory view of the substrate constitution of the liquid crystal display device of the present invention. The liquid crystal display device PNL is constituted by laminating the first substrate SUB1 and the second substrate SUB2 having a size smaller than that of the first substrate SUB1 to each other by way of the liquid crystal. On one side of the first substrate SUB1 and another side of the first substrate SUB1 which is disposed close to one side, terminal regions (drain-line-side terminal region TMD, gate-line-side terminal region TMG) are formed. An effective display region is provided to the most portion of the second substrate SUB2 which is overlapped to the first substrate SUB1.

Figure 81:
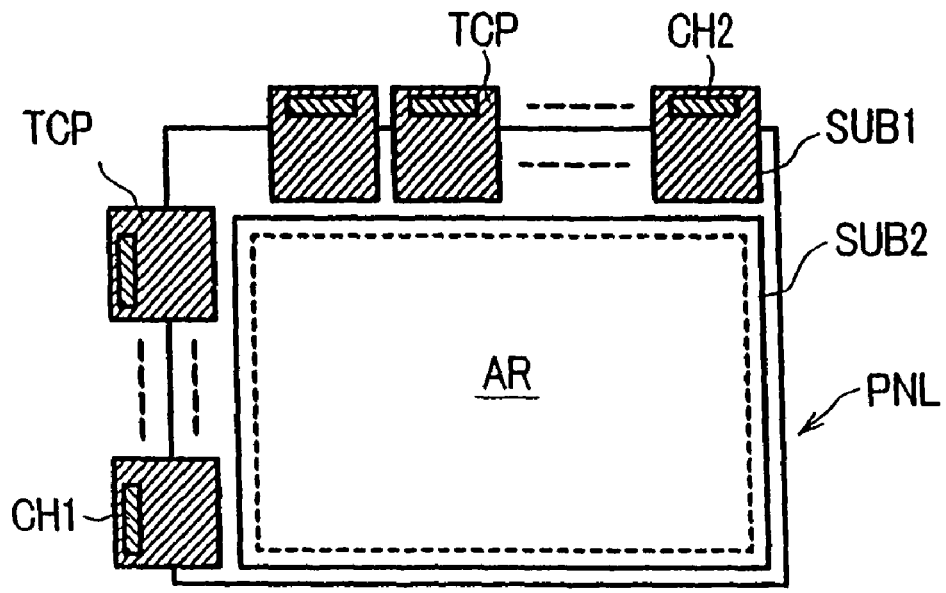
FIG. 81 is an explanatory view showing a state in which a tape carrier package on which a driving circuit is formed is mounted on the first substrate at a terminal region.

FIG. 81 is an explanatory view showing a state in which a tape carrier package loading a driving circuit thereon is mounted on the first substrate SUB1 at the terminal regions. A plurality of tape carrier packages TCP (tape carrier packages for driving drain lines which load drain-line driving circuit chips CH2, tape carrier packages for driving gate lines which load gate-line driving circuit chips CH1) are respectively mounted on the drain-line-side terminal region TMD and the gate-line-side terminal region TMG.

Figure 82:
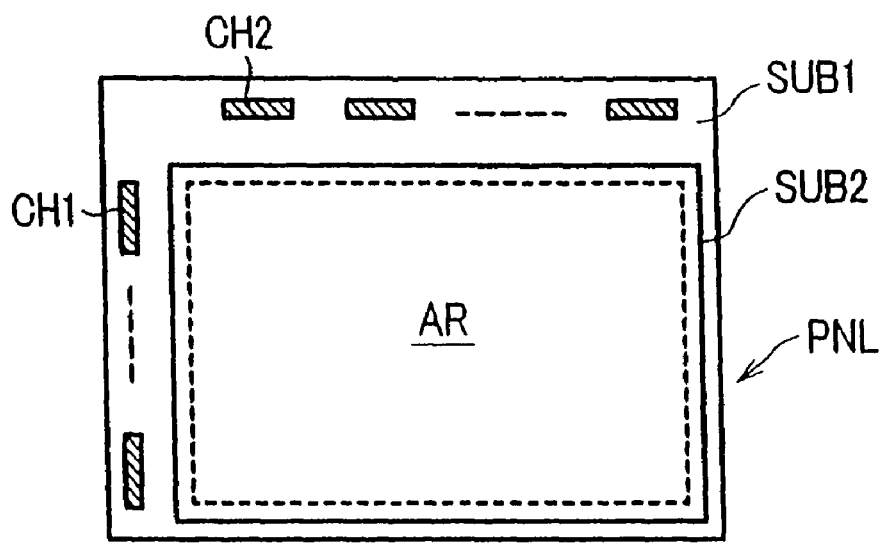
FIG. 82 is an explanatory view showing a state in which a driving circuit chip is directly mounted on the first substrate at the terminal region.

FIG. 82 is an explanatory view showing a state in which driving circuit chips are directly mounted on the first substrate SUB1 at the terminal regions. A plurality of drain-line driving circuit chips CH2 are mounted on the drain-line-side terminal region TMD and a plurality of gate-line driving circuit chips CH1 are mounted on the gate-line-side terminal region TMG. This mounting method is referred to as a FCA method (or a CPG method).

Figure 83:
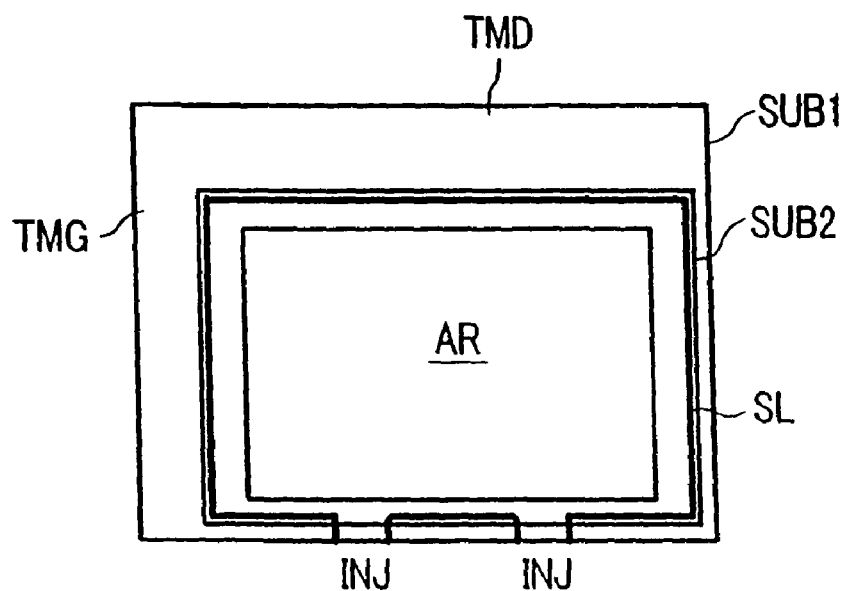
FIG. 83 is an explanatory view of an example of layout of a liquid crystal filling port for allowing liquid crystal to be filled and sealed between two substrates.

FIG. 83 is an explanatory view showing an arrangement example of liquid crystal filling ports through which liquid crystal is filled into a gap defined by two substrates and is sealed thereafter. In this example, two liquid crystal filling ports INJ are formed in a side on which the driving circuit chips are not mounted. The number and mounting positions of the liquid crystal filling ports INJ are determined corresponding to the size of the liquid crystal display device PNL and may be one, three or more.

Figure 84:
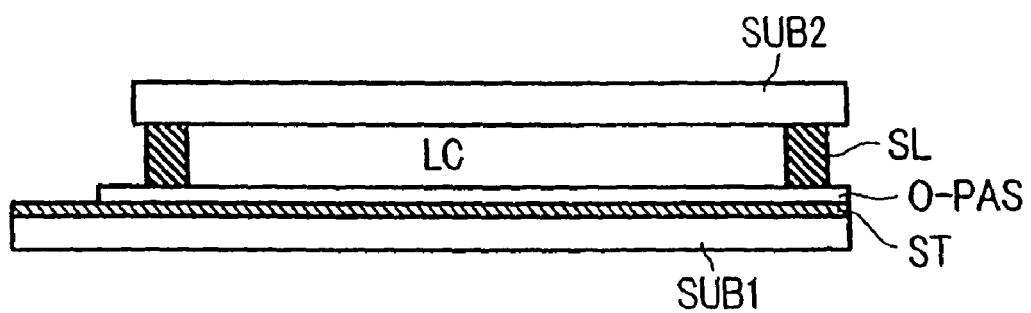
FIG. 84 is a schematic cross-sectional view of the liquid crystal display device of the present invention.

FIG. 84 is a schematic cross-sectional view of the liquid crystal display device of the present invention. On an inner surface of the first substrate SUB1, the reference electrode layer ST is formed and the organic insulation layer O-PAS is formed over the reference electrode layer ST. Other layers and electrodes are omitted from the drawing. The liquid crystal LC is sealed between the first substrate SUB1 and the second substrate SUB2 and a periphery of the effective display region is sealed by a sealing member.

Figure 85A:
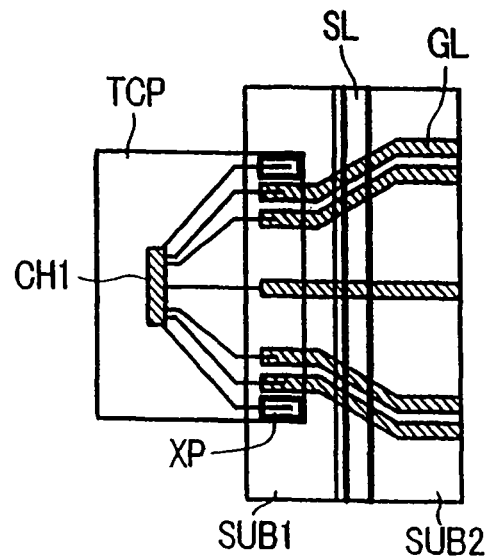
FIG. 85 is a plan view for schematically explaining a terminal region of a gate driving circuit mounted in a tape carrier package method
Figure 85B:
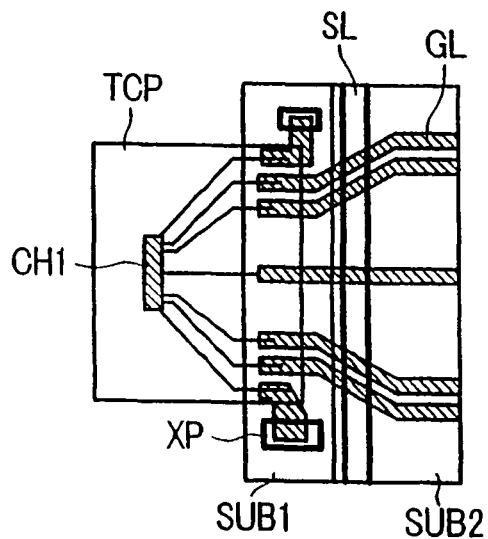
Figure 85C:
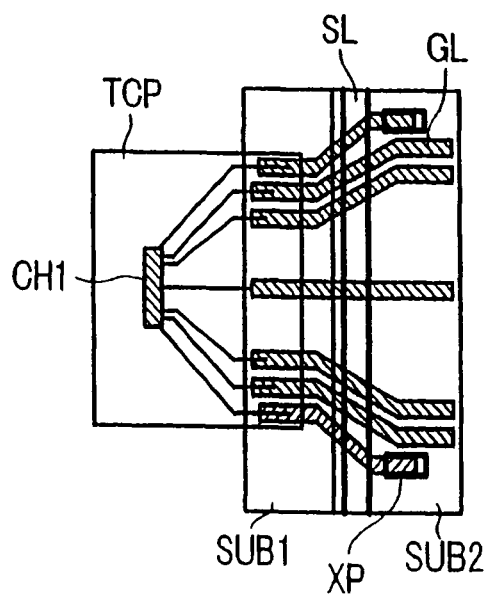

FIG. 85 is a plan view for schematically explaining the terminal regions of the gate driving circuit which is mounted in a tape carrier package method. In FIG. 85(a) to FIG. 85(c), terminals of the driving circuit chip CH1 which are loaded on the tape carrier package TCP are connected to terminal portions of the gate lines which are pulled out to the first substrate SUB1 side. The connection to the reference electrode ST is performed by removing the organic insulation layer O-PAS. Portions where the organic insulation layer O-Pas is removed are indicated by XP. FIG. 85(a) indicates a state in which the removing portions XP are arranged at the outside of the sealing member SL and below the tape carrier package TCP.

FIG. 85(b) shows a state in which the removing portion XP of the organic insulation layer O-PAS is disposed at the outside of the sealing member SL and at positions away from the tape carrier package TCP. Further, FIG. 85(c) shows a state in which the removing portion XP of the organic insulation layer O-PAS is arranged at the inside of the sealing member SL.

Figure 86A:
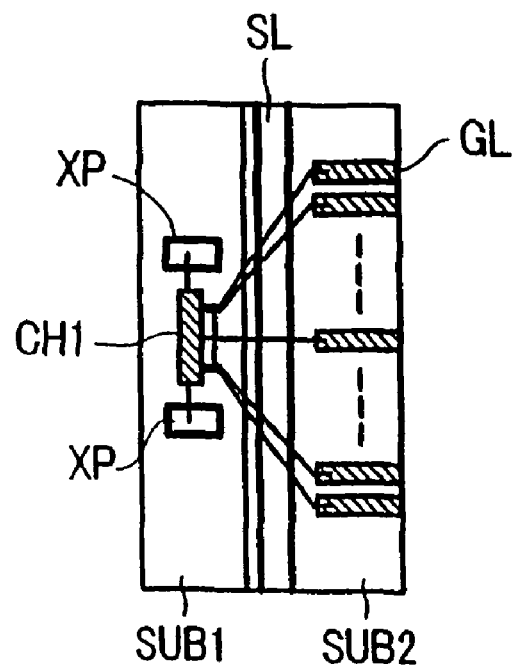
FIG. 86 is a plan view for schematically explaining a terminal region on which a driving circuit chip is mounted in a FCA method.
Figure 86B:
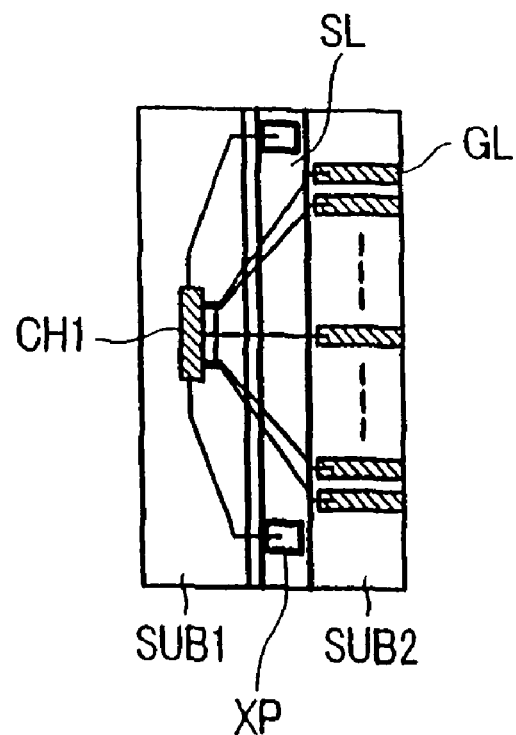

FIG. 86 is a plan view for schematically explaining the terminal region on which the driving circuit chip is mounted by a FCA method. FIG. 86(a) indicates a state in which the organic insulation layer O-PAS is removed at the outside of the sealing member SL and a feeding terminal of the driving circuit chip for the reference electrode layer is connected at this removing portion XP. FIG. 86(b) shows a state in which the organic insulation layer O-PAS is removed at the inside of the seal member SL and the feeding terminal of the driving circuit chip for the reference electrode layer is connected at this removing portion XP. It is desirable that a width of a feeding line to the reference electrode layer is larger than a width of other signal lines for reducing the feeding resistance.

Figure 87A:
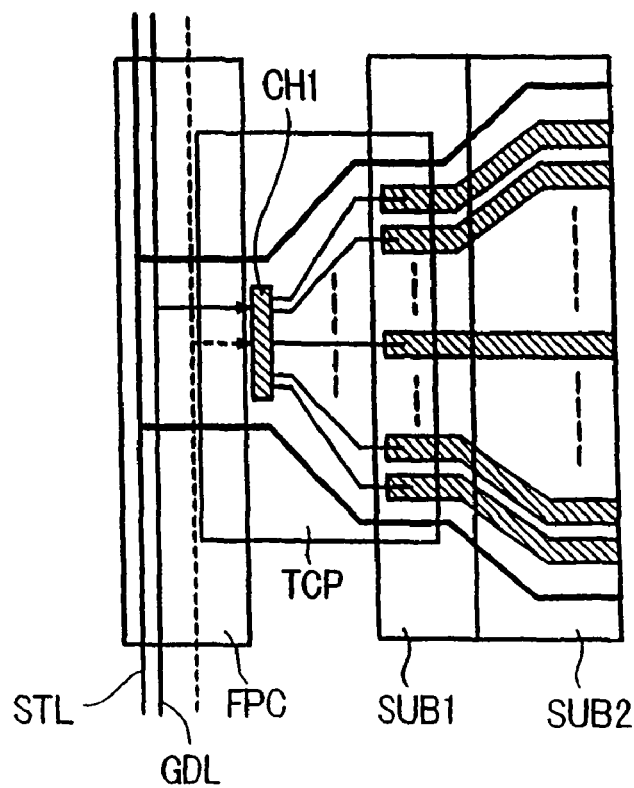
FIG. 87 is a plan view for schematically explaining a terminal region when a method in which electricity is supplied to a flexible printed circuit board or the like from a reference potential generation circuit disposed in a control circuit of the liquid crystal display device is adopted.
Figure 87B:
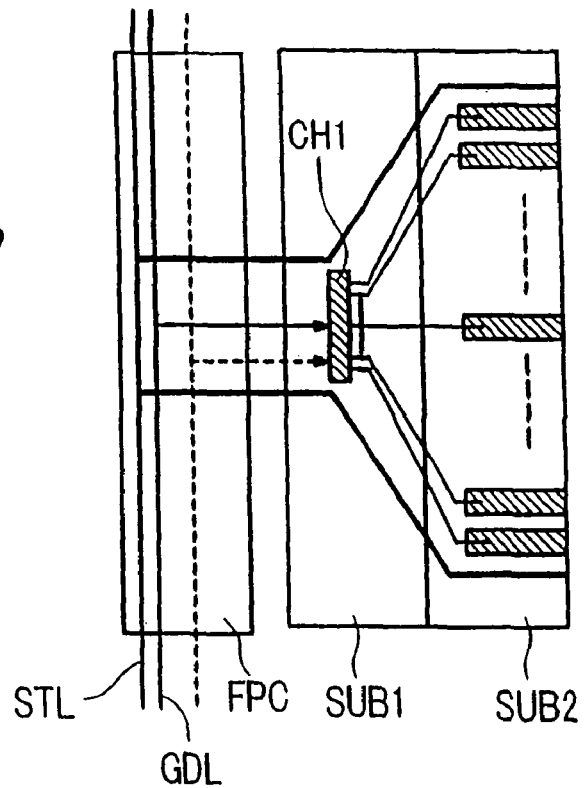

FIG. 87 is a plan view for schematically explaining the terminal region when a method in which electricity is fed from a reference potential generation circuit disposed in a control circuit of the liquid crystal display device to a using flexible printed circuit board or the like is adopted. A reference electrode feeding line STL is formed on the flexible printed circuit board FPC and electricity is fed to a terminal of the reference electrode which is pulled out to the first substrate SUB1 via the flexible printed circuit board FPC from the reference potential generation circuit disposed in the control circuit of the liquid crystal display device. FIG. 87(a) shows a case in which this feeding method is adopted in the tape carrier package mounting method and FIG. 87(b) shows a case in which this feeding method is adopted in a FCA method. In this manner, by performing the feeding of electricity to the reference electrode layer ST using the flexible printed circuit board FPC without going through the driving circuit chip CH1 so that the feeding of electricity can be performed with the further lower feeding resistance. In the drawing, GDL indicates a feeding line to the gate line.

Figure 88:
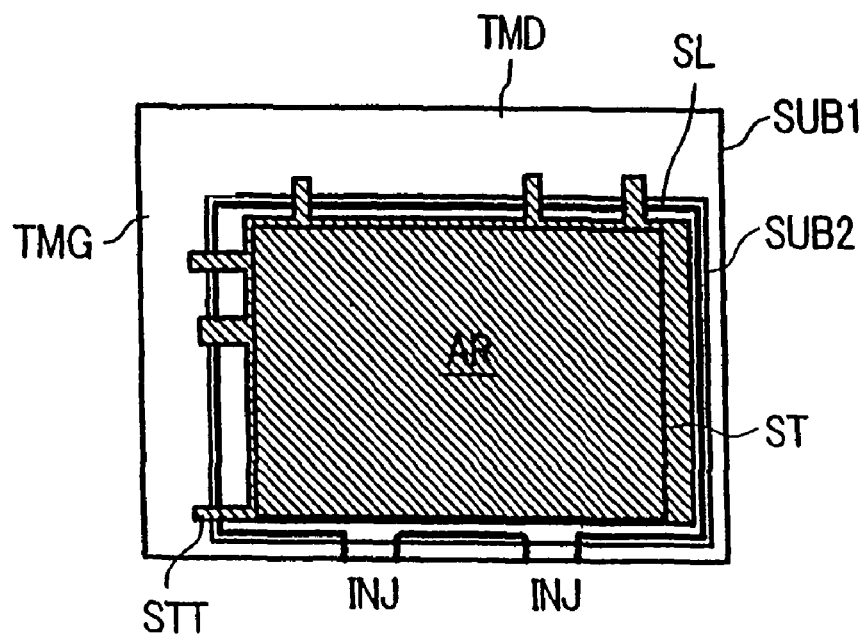
FIG. 88 is a schematic plan view of the liquid crystal display device for explaining a first example in which a feeding terminal to a reference electrode is formed.

FIG. 88 is a schematic plan view of the liquid crystal display device for explaining the first example for forming the feeding terminal to the reference electrode. In both of the vertical field method and the IPS method (including the modified IPS method and other modified IPS method), a periphery of the reference electrode ST is patterned thus forming lead terminals STT and feeding of electricity to the reference electrode ST is performed using constitutions shown in FIG. 84 to FIG. 87.

Figure 89:
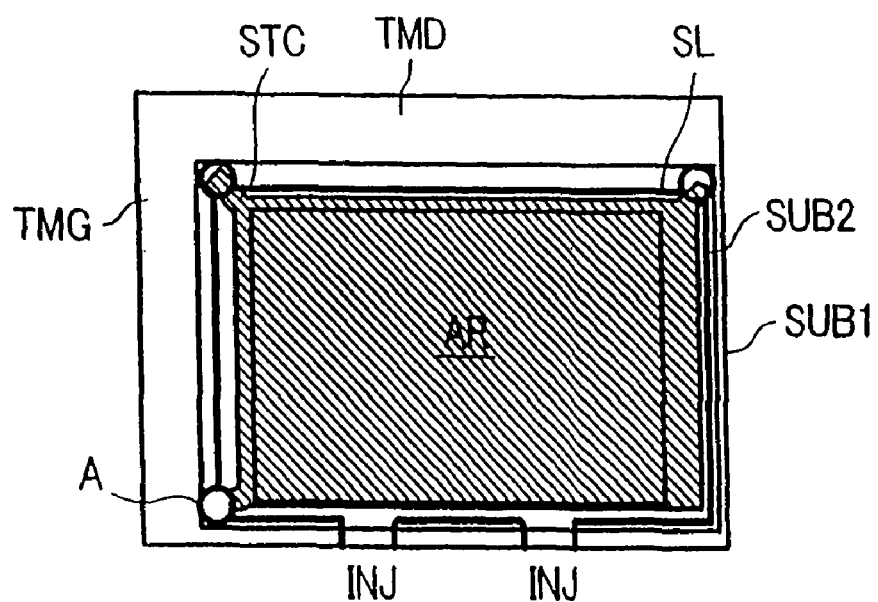
FIG. 89 is a schematic plan view of the liquid crystal display device for explaining a second example in which feeding terminal to a reference electrode is formed.
Figure 90:
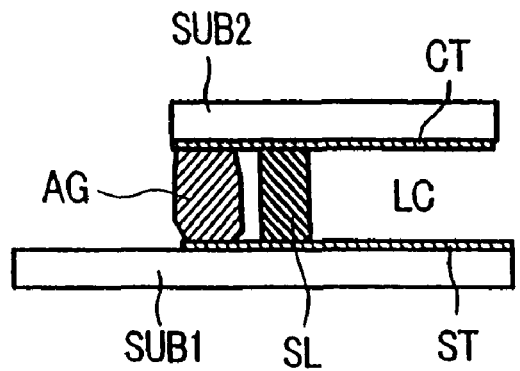
FIG. 90 is a cross-sectional view of an essential part showing a portion A of FIG. 89 in an enlarged manner.

FIG. 89 is a schematic plan view of the liquid crystal display device for explaining a second example for forming feeding terminals to the reference electrode and FIG. 90 is a cross-sectional view of an essential part showing a portion A in FIG. 89 in an enlarged manner. Particularly in the vertical field method having common electrodes at the second substrate SUB2 side, connection portions STC are formed on corner portions of the reference electrode ST by patterning and the common electrode ST is connected to the reference electrode ST at the connection portions STC by means of a conductive paste AG. The feeding of electricity to the reference electrode ST is performed by the common electrode. It is not always necessary to provide the connection portion STC at all corner portions of the reference electrode ST and may be formed atone, two or three corner portions of the reference electrode ST.

Figure 91:
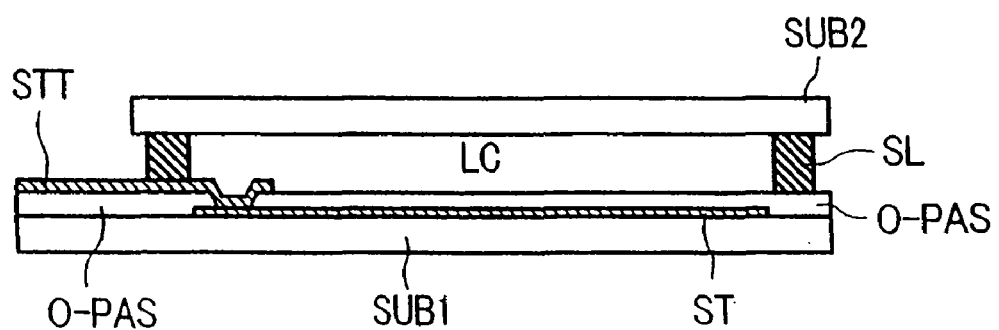
FIG. 91 is a schematic cross-sectional view of the liquid crystal display device for explaining a third example in which a feeding terminal to a reference electrode is formed.
Figure 92:
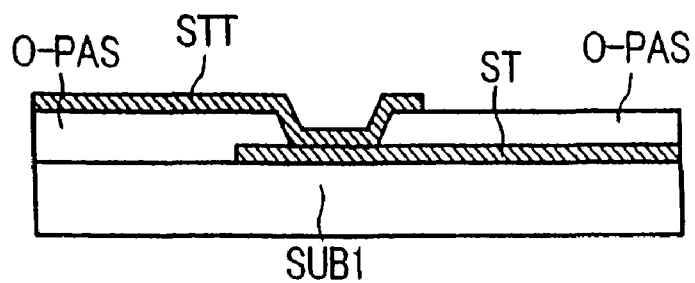
FIG. 92 is a cross-sectional view of an essential part showing the feeding terminal portion of FIG. 91 in an enlarged manner.

FIG. 91 is a schematic cross-sectional view of the liquid crystal display device for explaining a third example of the formation of a feeding terminal to the reference electrode and FIG. 92 is a cross-sectional view of an essential part which shows the feeding terminal portion in FIG. 91 in an enlarged manner. The feeding terminal STT to the reference electrode ST may be formed separately from the formation of the reference electrode ST. Further, the feeding terminal STT may be pulled out as a line which is connected with other line such as the gate line or the drain line at the inside of the seal SL. Here, the connection resistance of both lines are taken into account. The above-mentioned constitution is suitable when the contact resistance between the feeding terminal STT and the reference electrode ST formed of a transparent electrode made of non-Al-based metal (metal of high melting point such as Cr, Mo, Ti, Ta, W, Zr or the like, or alloy thereof) is low. Here, the feeding terminal STT may be formed of a transparent conductive film (ITO, IZO or the like).

Figure 93:
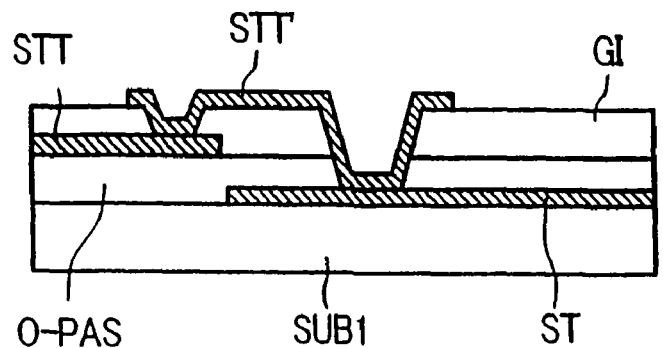
FIG. 93 is a schematic cross-sectional view of the liquid crystal display device for explaining a fourth example in which a feeding terminal to a reference electrode is formed.

FIG. 93 is a schematic cross-sectional view of a liquid crystal display device for explaining a fourth example of the formation of the feeding terminal to the reference electrode. When the contact resistance between the feeding terminal STT and the reference electrode ST is high, it is preferable to connect them using an auxiliary connection line STT'. For example, when the feeding terminal STT is made of Al, the auxiliary connection line STT' made of non-Al-based metal is used. Further, when the auxiliary connection line STT' is also formed of a transparent conductive film and also when the Al-based feeding terminal STT and the reference electrode ST are directly connected to each other, different from usual signal lines, it is possible to perform the multiple-point feeding of electricity and hence, the constitution shown in FIG. 93 is available.

Figure 94:
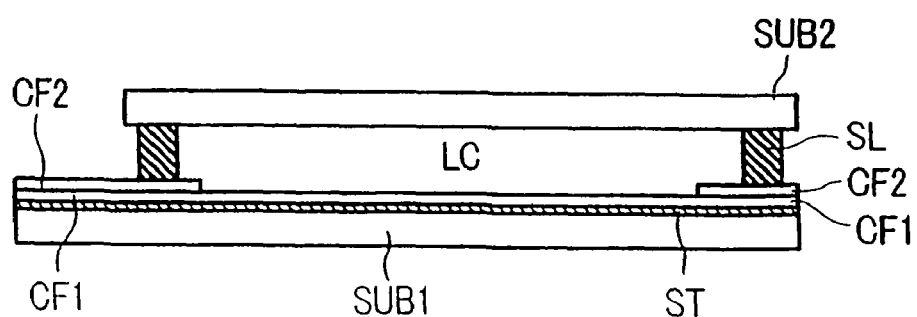
FIG. 94 is a schematic cross-sectional view of a liquid crystal display device for explaining a constitutional example of an outer periphery of an effective display region when an organic insulation layer formed on the first substrate is constituted of color filters.

FIG. 94 is a schematic cross-sectional view of the liquid crystal display device for explaining a constitutional example of an outer periphery of an effective display region when the organic insulation layer formed on the first substrate is formed of a color filter CF. When the organic insulation layer is formed of the color filter CF, the color filter material CF1 of three primary colors (R, G, B) or the color filter material CF1 formed of at least one of these colors and the color filter material CF2 formed of at least other color are laminated to the outer periphery of effective display region. With such a constitution, it is possible to form a light shielding layer on the outer periphery of the effective display region. Further, when two color filter materials are laminated to the outer periphery of the effective display region, one color filter material CF1 is red (R) and the other color filter material CF2 is green (G) or blue (B). The color filter material R absorbs light other than red (R) light. Accordingly, by combining color filter material G or B which absorb red (R) with the color filter material R, the color filter CF can absorb lights of respective colors R, G, B.

Figure 95:
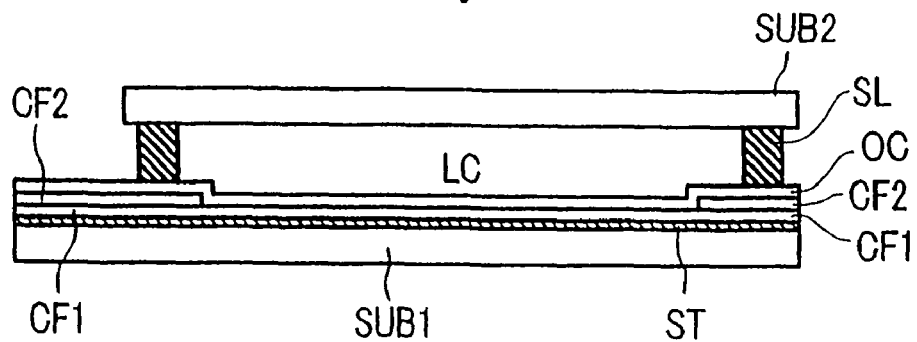
FIG. 95 is a schematic cross-sectional view of a liquid crystal display device for explaining another constitutional example of the outer periphery of the effective display region when the organic insulation layer formed on the first substrate is constituted of color filters.

FIG. 95 is a schematic cross-sectional view of the liquid crystal display device for explaining another constitutional example of the outer periphery of the effective display region when the organic insulation layer formed on the first substrate is formed of the color filter. That is, this example shows a case in which the color filter CF2 which is explained in conjunction with FIG. 94 is laminated to the sealing portion SL and an outer peripheral portion thereof. Further, to protect the whole color filter layer including the color filter layers (CF1, CF2) and the effective display region, it is preferable to form an overcoat layer OC over the color filter layer (CF, CF1, CF2).

Figure 96:
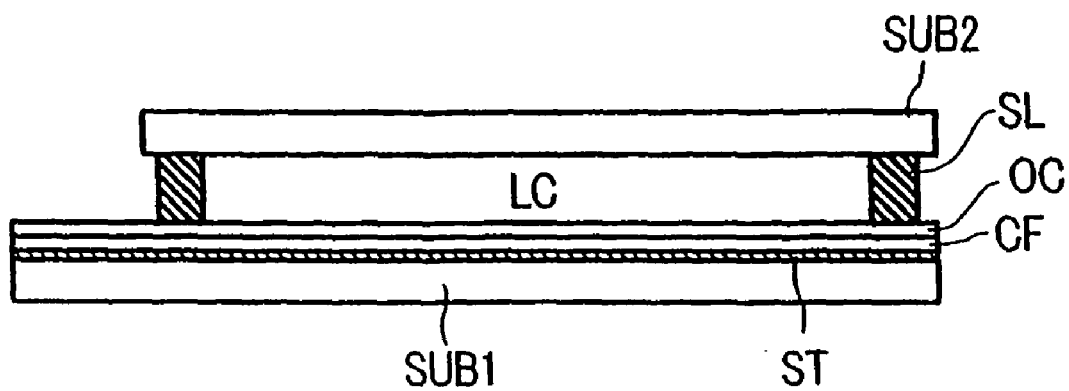
FIG. 96 is a schematic cross-sectional view of a liquid crystal display device for explaining a constitutional example in which color filters are formed on all of a seal, an outer peripheral portion thereof and an effective display region.

FIG. 96 is a schematic cross-sectional view of the liquid crystal display device for explaining a constitutional example in which a color filter is formed over all of a sealing portion, an outer peripheral portion thereof and an effective display region. Also in this case, it is preferable to form an overcoat layer OC over the color filter layer CF which covers all of the sealing portion, the outer peripheral portion thereof and the effective display region.

Figure 97A:
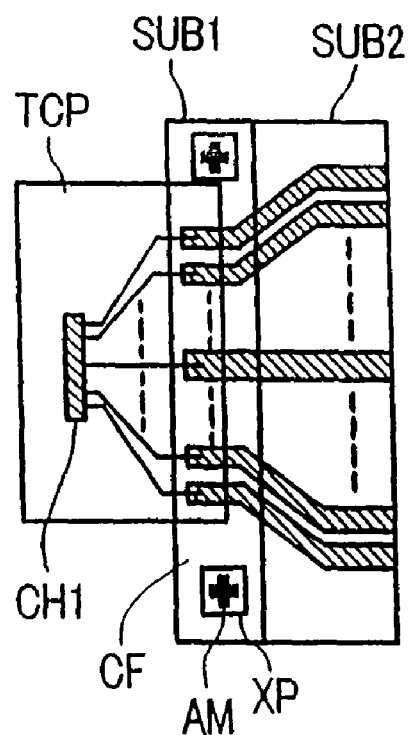
FIG. 97 is an explanatory view of an alignment method when driving circuits are mounted on various lead terminals and feeding terminals which are formed on the first substrate.
Figure 97B:
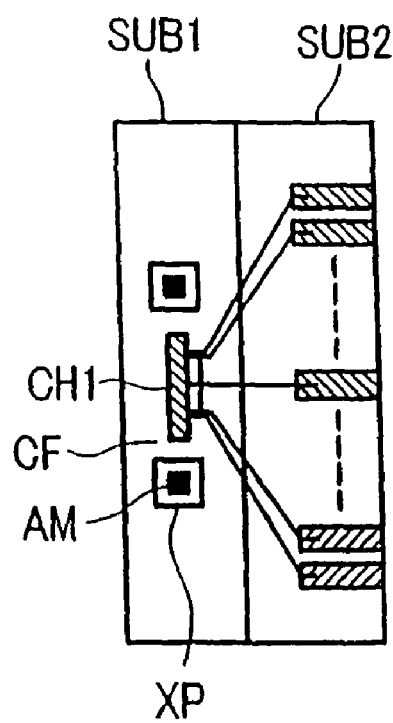

FIG. 97 is an explanatory view of an aligning method in mounting driving circuits to various types of lead terminals and feeding terminals formed on a first substrate. FIG. 97(a) shows a case in which a tape carrier package is used and FIG. 97(b) shows a case in which a FCA method is adopted. In FIG. 97(a) and FIG. 97(b), when a color filter CF is provided also outside the sealing member, it is preferable to form removing portions XP in the color filter CF in the vicinity of alignment marks AM for achieving the alignment of a tape carrier package TCP which mounts a driving circuit chip CH1 thereon or a driving circuit chip CH1 of FCA with various types of lead terminals and feeding terminals formed on the first substrate. Due to such a constitution, the generation of an error at the time of performing the optical recognition of the alignment marks AM is prevented so that the mounting accuracy is ensured.

Figure 98:
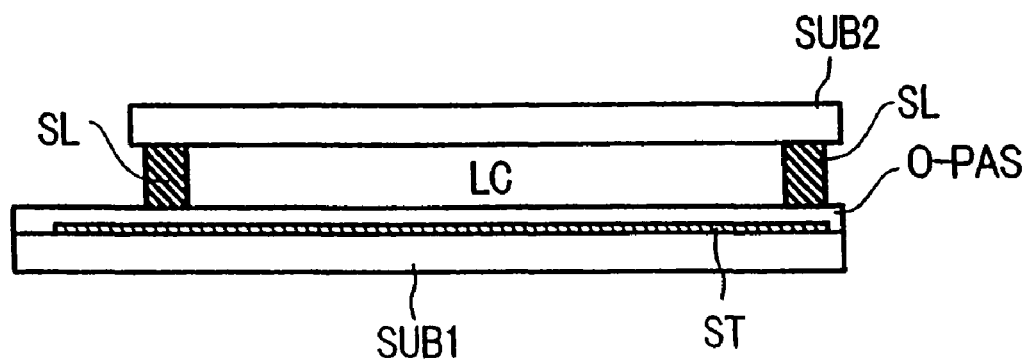
FIG. 98 is a schematic cross-sectional view of a liquid crystal display device which is configured to prevent electrolytic corrosion of a reference electrode layer formed on the first substrate.

FIG. 98 is a schematic cross-sectional view of a liquid crystal display device which is configured to prevent electrolytic corrosion of a reference electrode layer formed on a first substrate. To prevent electrolytic corrosion of the reference electrode layer ST outside a sealing member SL, the reference electrode layer ST including end portions thereof is covered with an organic insulation layer O-PAS.

Figure 99:
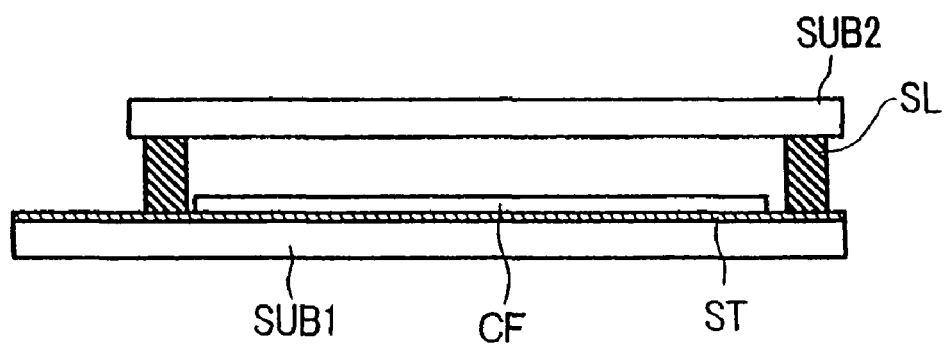
FIG. 99 is a schematic plan view for explaining an example in which color filters are formed when an organic insulation layer which is formed on the first substrate is constituted of the color filters.

FIG. 99 is a schematic plan view for explaining an example of the formation of a color filter when an organic insulation layer formed on a first substrate is made of the color filter. As shown in FIG. 99, the color filter CF may be formed only at an inner side of a sealing member SL. The color filter CF contains a large quantity of pigment or dye to perform a function of selecting wavelength of light. Accordingly, the color filter CF has a tendency of exhibiting higher hygroscopic property compared to a colorless organic insulation layer.

When the color filter CF is disposed in a region outside the sealing member SL which exhibits high temperature and high humidity, the color filter CF in the region absorbs moisture and swells so that wrinkles are generated and hence, there is a possibility that lead lines and feeding lines which are formed over the color filter CF are disconnected. To prevent such a phenomenon, the color filter CF is formed only at the inside of the sealing member SL.

Figure 100:
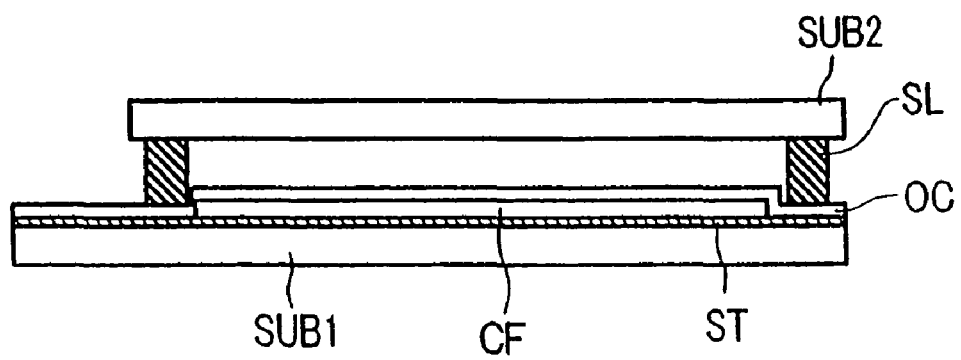
FIG. 100 is a schematic plan view for explaining a constitutional example when an organic insulation layer which is formed on the first substrate is constituted of color filters.

FIG. 100 is a schematic plan view served for explaining an example of the formation of a color filter when an organic insulation layer formed on the first substrate is made of the color filter. Compared to the constitution explained in conjunction with FIG. 99, in this example, the reference electrode layer ST is formed such that the reference electrode layer ST is extended to the outside of the sealing member SL. Further, in this example, to prevent the short-circuiting between the reference electrode layer ST and the scanning signal line or the like, portions of the reference electrode layer ST on which the color filter CF is not formed are covered with an overcoat layer OC. Due to such a constitution, the above-mentioned short-circuiting can be surely prevented.

Figure 101:
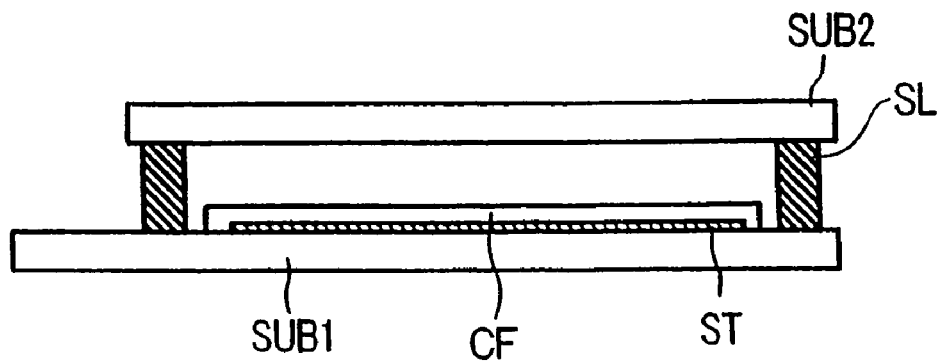
FIG. 101 is a schematic plan view for explaining another constitutional example when an organic insulation layer which is formed on the first substrate is constituted of color filters.

FIG. 101 is a schematic plan view served for explaining another constitutional example in which the organic insulation layer formed on the first substrate is constituted of the color filter. When the color filter layer CF is formed only in the inside of the effective display region of the first substrate SUB1, the reference electrode layer ST is also formed only in the inside of the effective display region. Here, the reference electrode layer ST may be stuck out from the color filter CF provided that the reference electrode layer ST does not cross other lines.

Figure 102:
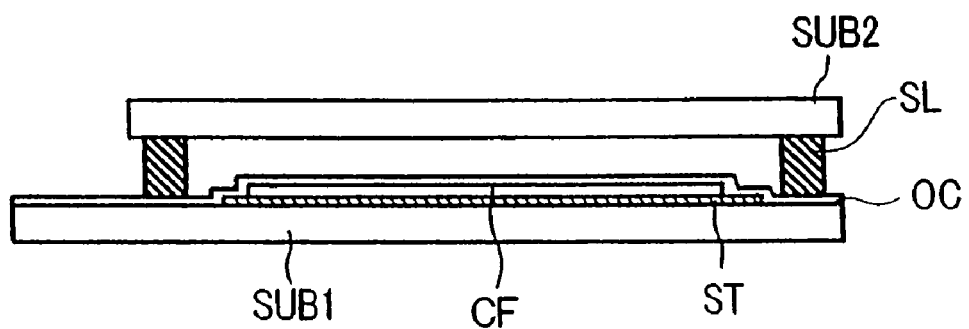
FIG. 102 is a schematic plan view for explaining still another constitutional example when an organic insulation layer which is formed on the first substrate is constituted of color filters.

FIG. 102 is a schematic plan view served for explaining still another constitutional example in which the organic insulation layer formed on the first substrate is constituted of the color filter. Compared to the case shown in FIG. 101, the reference electrode layer ST is formed such that the reference electrode layer ST is stuck out from the color filter CF without crossing other lines in this example as shown in FIG. 102. Further, as shown in FIG. 102, an overcoat layer OC is formed such that the overcoat layer OC covers the color filter CF and the reference electrode ST.

Figure 103:
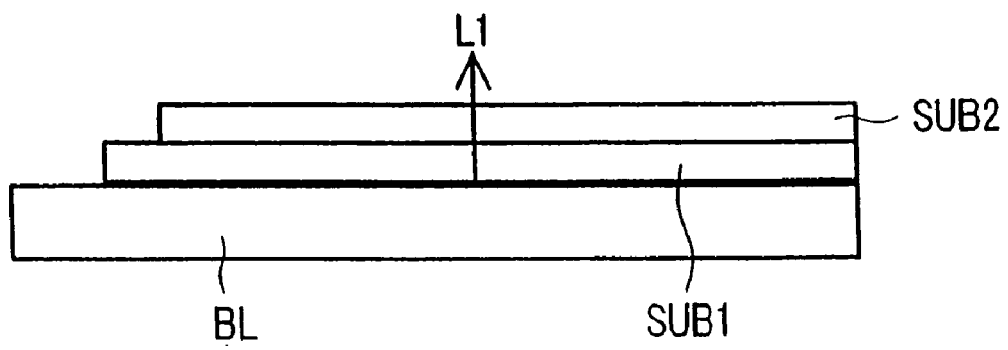
FIG. 103 is a schematic cross-sectional view showing an example of arrangement when the liquid crystal display device of the present invention is used as a transmission-type display module.

FIG. 103 is a schematic cross-sectional view for explaining one arrangement example in which the liquid crystal display device of the present invention is used as a transmission type display module. On a back surface of the first substrate SUB1 of the liquid crystal display device which is formed by laminating the first substrate SUB1 and the second substrate SUB2 to each other, a backlight BL is mounted. This arrangement example is a typical constitution of the transmission type display module. Illumination light L1 from the backlight BL is modulated by the liquid crystal display device when the light L1 passes through the liquid crystal display device and is irradiated from the second substrate SUB2 side.

Figure 104:
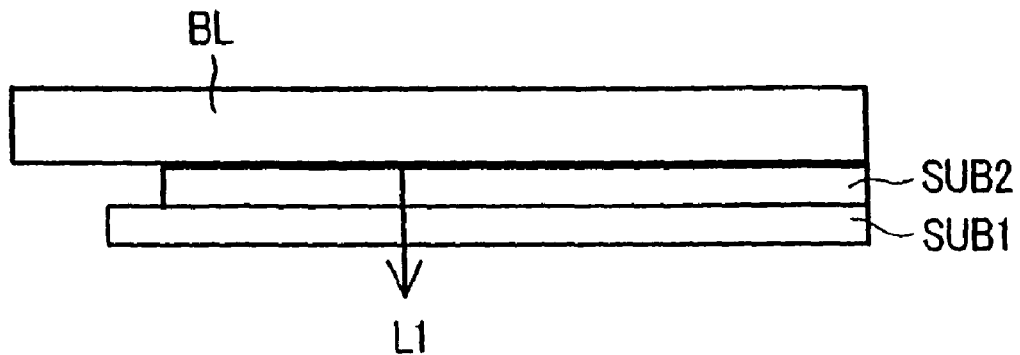
FIG. 104 is a schematic cross-sectional view for explaining another example of arrangement when the liquid crystal display device of the present invention is used as transmission-type display module.

FIG. 104 is a schematic cross-sectional view for explaining another arrangement example in which the liquid crystal display device of the present invention is used as a transmission type display module. On a front surface of the second substrate SUB2 of the liquid crystal display device which is formed by laminating the first substrate SUB1 and the second substrate SUB2 to each other, a front light FL is mounted. Illumination light L1 from the front light FL is modulated by the liquid crystal display device when the light L1 passes through the liquid crystal display device and is irradiated from the first substrate SUB1 side.

Figure 105:
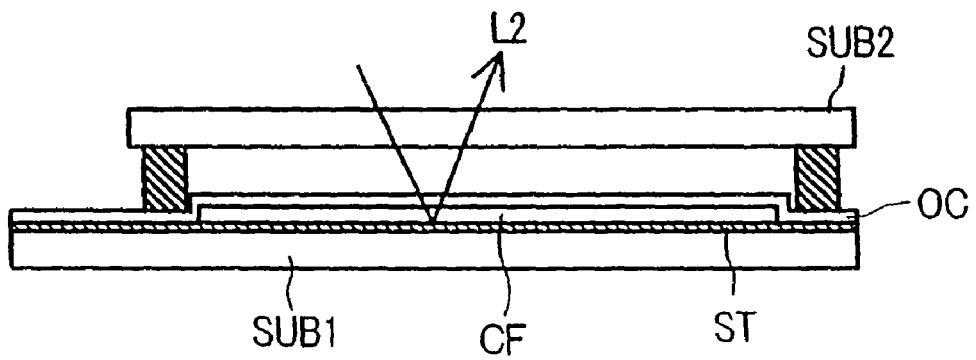
FIG. 105 is a schematic cross-sectional view for explaining an example of arrangement when the liquid crystal display device of the present invention is used as a reflection-type display module.

FIG. 105 is a schematic cross-sectional view for explaining the first arrangement example in which the liquid crystal display device of the present invention is used as a reflection type display module. A reference electrode ST which is provided to the first substrate SUB1 of the liquid crystal display device which is formed by laminating the first substrate SUB1 and the second substrate SUB2 to each other is formed of a reflective metal layer. An external light L2 which is incident on the second substrate SUB2 is reflected on the reference electrode ST and the light L2 which is irradiated from the second substrate SUB2 side is modulated in accordance with an electronic latent image formed in the liquid crystal display device when the light L2 passes through the inside of the liquid crystal display device.

Figure 106:
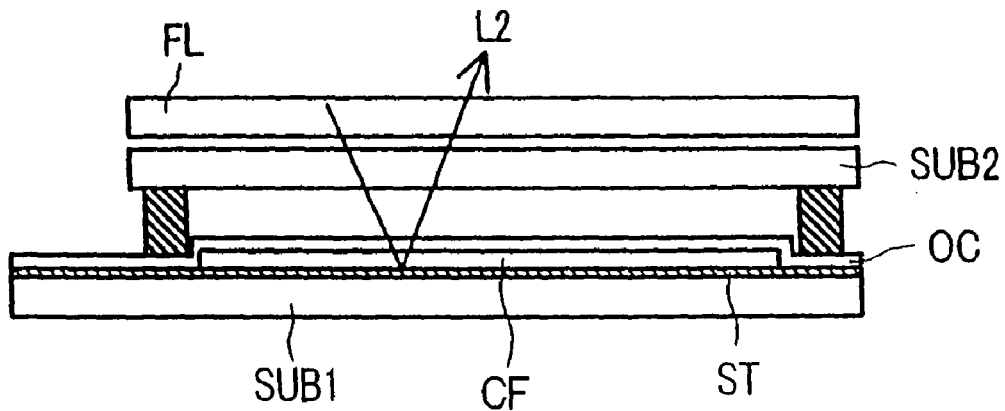
FIG. 106 is a schematic cross-sectional view for explaining another example of arrangement when the liquid crystal display device of the present invention is used as a reflection-type display module.

FIG. 106 is a schematic cross-sectional view for explaining the second arrangement example in which the liquid crystal display device of the present invention is used as a reflection type display module. On a front surface of the second substrate SUB2 of the liquid crystal display device which is formed by laminating the first substrate SUB1 and the second substrate SUB2 to each other, a front light FL is mounted. Light L2 irradiated from the front light FL is reflected on a reference electrode ST which is constituted of a reflective metal layer provided to an inner surface of the first substrate SUB1 and is irradiated from the second substrate SUB2 side through the front light FL. The light L2 is modulated by the liquid crystal display device when the light L2 passes through the inside of the liquid crystal display device.

Figure 107:
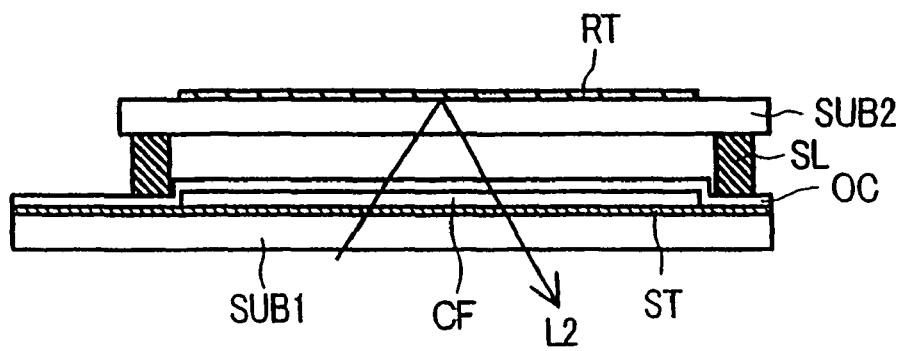
FIG. 107 is a schematic cross-sectional view for explaining still another example of arrangement when the liquid crystal display device of the present invention is used as a reflection-type display module.

FIG. 107 is a schematic cross-section a view for explaining the third arrangement example in which the liquid crystal display device of the present invention is used as a reflection type display module. On a front surface of the second substrate SUB2 of the liquid crystal display device which is formed by laminating the first substrate SUB1 and the second substrate SUB2, a reflection layer RT is mounted. An external light L2 incident from the first substrate SUB1 is reflected on the reflection layer RT and is irradiated from the first substrate SUB1 side. The light L2 is modulated by the liquid crystal display device when the light L2 passes through the inside of the liquid crystal display device.

Figure 108:
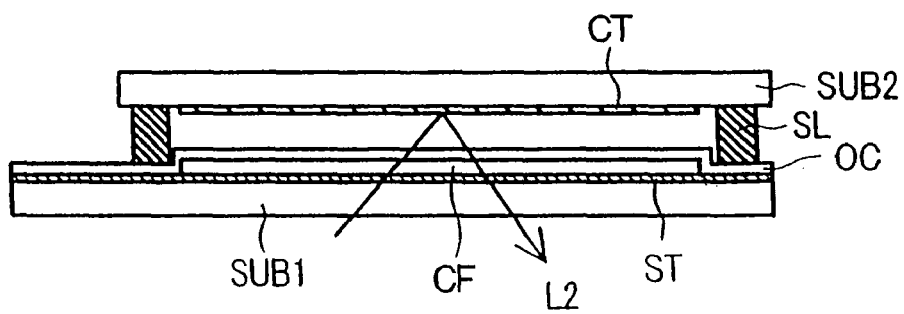
FIG. 108 is a schematic cross-sectional view for explaining still another example of arrangement when the liquid crystal display device of the present invention is used as a reflection-type display module.

FIG. 108 is a schematic cross-sectional view for explaining the fourth arrangement example in which the liquid crystal display device of the present invention is used as a reflection type display module. A common electrode CT which is formed on an inner surface of the second substrate SUB2 of the liquid crystal display device which is formed by laminating the first substrate SUB1 and the second substrate SUB2 is constituted of a reflective metal layer. An external light L2 incident from the first substrate SUB1 is reflected on the common electrode CT and is irradiated from the first substrate SUB1 side. The light L2 is modulated by the liquid crystal display device when the light L2 passes through the inside of the liquid crystal display device.

Figure 109:
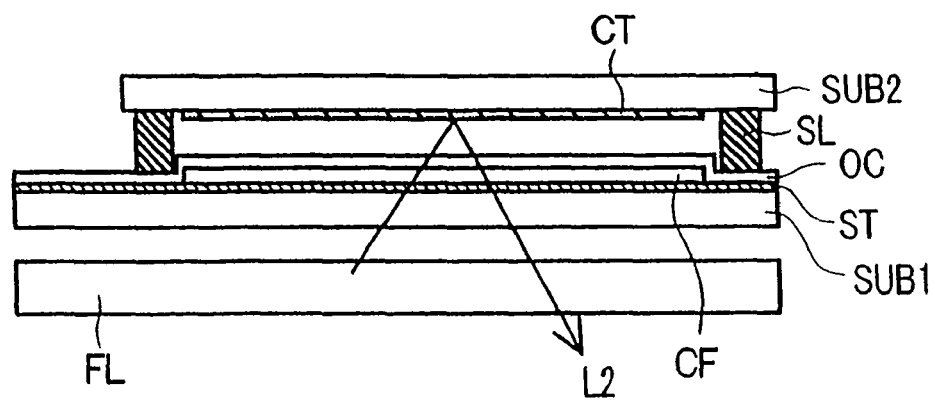
FIG. 109 is a schematic cross-sectional view for explaining still another example of arrangement when the liquid crystal display device of the present invention is used as a reflection-type display module.

FIG. 109 is a schematic cross-sectional view for explaining the fifth arrangement example in which the liquid crystal display device of the present invention is used as a reflection type display module. On a back surface of the first substrate SUB1 of the liquid crystal display device which is formed by laminating the first substrate SUB1 and the second substrate SUB2, a front light FL is mounted. Further, a common electrode CT which is formed on an inner surface of the second substrate SUB2 is constituted of a reflective metal layer. An external light L2 incident on the first substrate SUB1 from the front light FL is reflected on the common electrode CT and is irradiated from the first substrate SUB1 side after passing through the front light FL. The light L2 is modulated by the liquid crystal display device when the light L2 passes through the inside of the liquid crystal display device.

Figure 110:
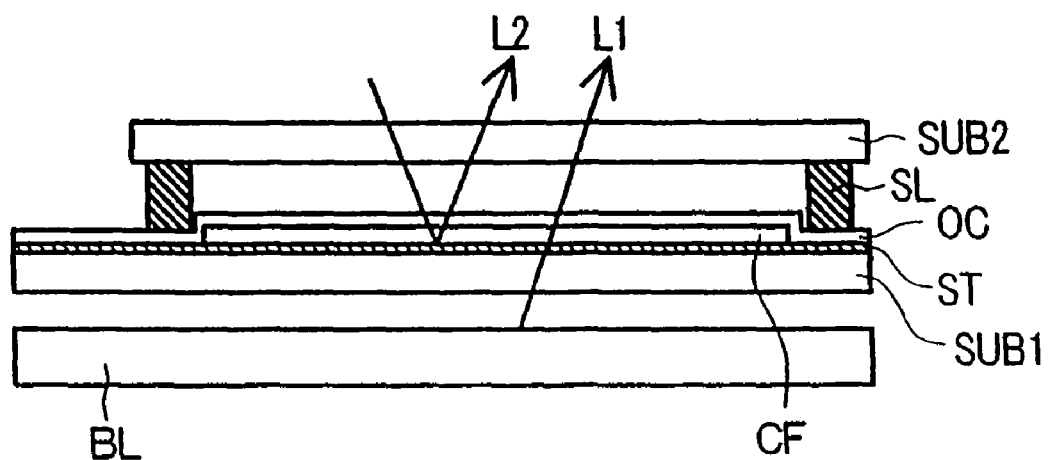
FIG. 110 is a schematic cross-sectional view for explaining an example of arrangement when the liquid crystal display device of the present invention is used as a transmission/reflection-type display module.

FIG. 110 is a schematic cross-sectional view for explaining one arrangement example in which the liquid crystal display device of the present invention is used as a transmission/reflection type display module. A reference electrode ST which is provided to the first substrate SUB1 of the liquid crystal display device formed by laminating the first substrate SUB1 and the second substrate SUB2 is constituted of a reflective metal layer and includes partial apertures (slit holes or dot holes) corresponding to respective pixels.

When the liquid crystal display device is operated in a reflection type mode, an external light L2 incident from the second substrate SUB2 is reflected on the reference electrode ST and is irradiated from the second substrate SUB2. When the liquid crystal display device is operated in transmission type mode, light L1 irradiated from the backlight BL mounted on a back surface of the first substrate SUB1 passes through the apertures of the reference electrode ST and is irradiated through the second substrate SUB2. When either one of the light L2 or the light L1 passes through the inside of the liquid crystal display device, the light L2 or L1 is modulated by the liquid crystal display device. Further, a semitransparent reflection layer may be used as the reference electrode ST in place of the reflective metal layer having apertures. Here, it is needless to say the liquid crystal display device can be operated in both modes, that is, the reflection mode and the transmission mode.

Figure 111:
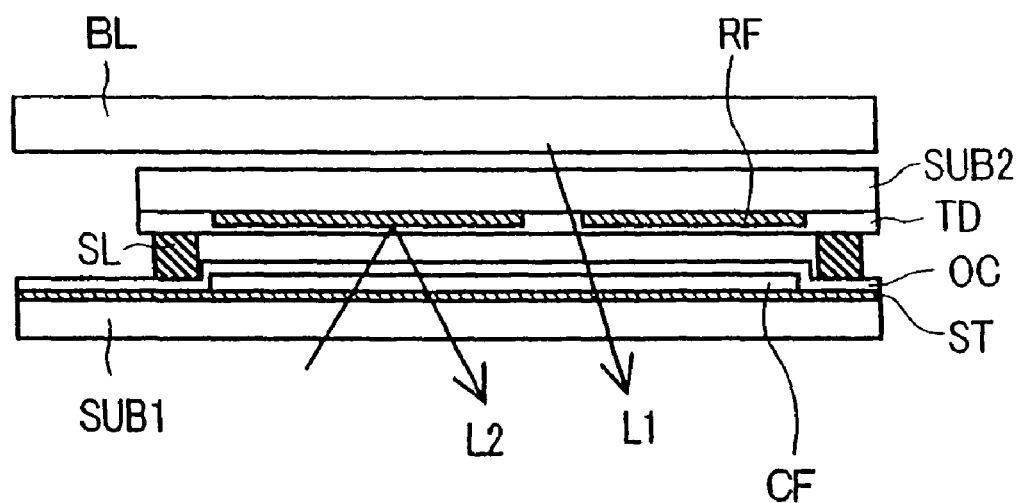
FIG. 111 is a schematic cross-sectional view for explaining another example of arrangement when the liquid crystal display device of the present invention is used as a transmission/reflection-type display module.

FIG. 111 is a schematic cross-sectional view for explaining another arrangement example in which the liquid crystal display device of the present invention is used as a transmission/reflection type display module. A common electrode CT which is provided to the second substrate SUB2 of the liquid crystal display device formed by laminating the first substrate SUB1 and the second substrate SUB2 is constituted of a reflective metal layer and includes partial apertures (slit holes or dot holes).

When the liquid crystal display device is operated in a reflection type mode, an external light L2 incident from the first substrate SUB1 is reflected on the common electrode CT and is irradiated from the first substrate SUB1. When the liquid crystal display device is operated in a transmission type mode, light L1 irradiated from the front light FL mounted on a front surface of the second substrate SUB2 passes through the apertures of the common electrode CT and is irradiated through the first substrate SUB1. When either one of the light L2 or the light L1 passes through the inside of the liquid crystal display device, the light L2 or L1 is modulated by an electronic image formed in the liquid crystal display device. Further, a semitransparent reflection layer may be used as the common electrode CT in place of the reflective metal layer having apertures.

The present invention is not limited to the above-mentioned embodiments and constitutional examples and various liquid crystal display devices can be constituted using the constitution in which the reference electrodes are formed on the substrate side on which the switching elements such as thin film transistors are formed as the basis.

Further, with respect to the substrates used in the above-mentioned respective substrates, the substrate SUB1 may be formed of a glass substrate.

Alternatively, the substrate SUB1 may be formed of a plastic substrate or a resin substrate.

In the present invention, the reference electrode layer ST is formed in advance at the time of producing the substrate or before delivering the substrate and hence, only the non-defective substrate can be applied so that the yield rate is enhanced. Further, since it is unnecessary to form the capacity forming portion with high accuracy, the throughput can be enhanced and the cost can be reduced. Further, the films are formed before forming the TFT layer, a manufacturing method such as a coating method which is liable to generate foreign materials can be used and hence, the cost can be further reduced.

Although the structure which is formed by laminating the gate line GL, the gate insulation film GI and the semiconductor layer in this order has been explained in the above-mentioned respective embodiments, the structure may be formed by laminating them in the order of the semiconductor layer, the gate insulation film GI and the gate line GL. Such a structure is suitable in a case that the semiconductor layer is formed of a layer having crystalline property such as polysilicon, CGS, SLS, SELAX or a layer formed of single crystal.

Further, when the layer having crystalline property is used as the semiconductor layer, further advantages can be realized. In the present invention, between the semiconductor layer and the substrate, the reference electrode layer ST having a large area which extends over the substantially whole pixel region is formed. Although the ion implantation is performed in a step for forming the switching element using the semiconductor layer having the crystalline property, ions are widely implanted covering regions other than the semiconductor layer. According to the present invention, the ion can be shielded with the reference electrode layer ST and hence, it is possible to prevent the ion from reaching the substrate SUB1 whereby the substrate SUB1 is not damaged and the reliability is enhanced.

In the step for forming the semiconductor layer having crystalline property, there has been known a method in which after forming an amorphous semiconductor, laser beams are partially irradiated to the amorphous semiconductor to perform scanning so that the semiconductor is fused partially due to heat of laser beams and crystallized to impart the crystalline property to the semiconductor. For example, SELAX, SLS and the like have been known. In such a method, since heat at a level which can fuse the semiconductor is added to the semiconductor, the heat of high temperature is transmitted to the periphery of the fused portion. The inventors have found that the strain and thermal stress are accumulated in the substrate SUB1 due to this heat of high temperature. Further, the inventors of the present invention have found a new problem that this stress brings about the disturbance in the polarization state and lowers the contrast ratio.

According to the present invention, the reference electrode layer ST is formed between the semiconductor layer and the substrate SUB1. Since the reference electrode layer ST is broad enough to cover the most portion of the pixel region, extends over a plurality of pixels and is conductive. Accordingly, the local high heat generated by laser beams can be instantly dispersed so that it is possible to prevent the damage and stress to the above-mentioned substrate and the reduction of contrast whereby high quality and high reliability can be realized.

This advantageous effect is an advantageous effect which can be realized by providing the conductive layer which extends over the substantially whole pixel region between the crystalline semiconductor layer and the substrate. The present invention also discloses and claims this constitution, that is, an image display device having the conductive layer which extends over the substantially whole pixel region between the crystalline semiconductor layer and the substrate as the present invention.

Further, the above-mentioned respective embodiment shave been explained in conjunction with the liquid crystal display device for the sake of explanation. However, as can be clearly understood from the explanation of the above-mentioned respective embodiments, with the use of the technical concept disclosed by the present invention, the constitution arranged above the substrate SUB1 can be applicable to an organic EL, an inorganic EL or other image display device. Accordingly, "liquid crystal display device" in the claims discloses and claims the image display device in a range of equivalence. Further, in the same manner, "sandwiching liquid crystal between a first substrate and a second substrate which face each other in an opposed manner" in claims of this specification means "a first substrate and a second substrate which are arranged to face each other" in the liquid crystal display device which constitutes an equivalent of the liquid crystal display device.

As has been explained heretofore, according to the present invention, by providing the reference electrode layer functioning as the feeding electrode which forms holding capacity for activated or lit pixels to the substrate side on which the switching elements are formed, the resistance to the feeding electrode can be reduced and, at the same time, the reduction of numerical aperture of the pixels can be obviated thus realizing the active matrix type liquid crystal display device exhibiting high brightness and rapid driving.

Further, it is possible to provide the image display device which can satisfy both of the assurance of holding capacity and the enhancement of numerical aperture.

Still further, it is possible to enhance the image qualities and the reliability of the image display device which uses the crystalline semiconductor.

What is claimed is:

1. A liquid crystal display device, comprising:
   liquid crystal sandwiched between a first substrate and a second substrate which face each other in an opposed manner;
   a plurality of gate lines which extend in a first direction and are arranged in parallel;
   a plurality of drain lines which extend in a second direction which crosses the gate lines and are arranged in parallel;
   a plurality of switching elements which are arranged at crossing portions of the gate lines and the drain lines;
   pixel electrodes which are driven by the switching elements; and
   counter electrodes which generate an electric field for driving pixels between the pixel electrodes, and wherein
   the counter electrodes are formed on an inner surface of the first substrate,
   an electrode forming layer includes the gate lines, the drain lines, the switching elements and the pixel electrodes,
   a reference electrode layer is arranged between the first substrate and the electrode forming layer with a first insulation layer between the reference electrode layer and the electrode forming layer, and
   holding capacities of the pixels are formed among the pixel electrodes and the reference electrode layer.

2. The liquid crystal display device according to claim 1, wherein the counter electrodes are formed over an organic insulation layer, and wherein the counter electrodes are connected to the reference electrode layer via through holes formed in the first insulation layer.

3. The liquid crystal display device according to claim 1, wherein the counter electrodes are formed over a gate insulation layer, and wherein the counter electrodes are connected to the reference electrode layer via through holes formed in the gate insulation layer and the first insulation layer.

4. The liquid crystal display device according to claim 1, wherein the counter electrodes are formed over a passivation layer, and the counter electrodes are connected to the reference electrode layer via through holes formed in the passivation layer, a gate insulation layer and the first insulation layer.

5. The liquid crystal display device according to claim 1, wherein the reference electrode layer is arranged in the extension direction of the gate lines such that the reference electrode layer is arranged parallel to the gate lines and overlaps regions where the pixel electrodes are formed.

6. The liquid crystal display device according to claim 1, wherein the reference electrode layer is provided to a region of the first substrate which includes regions in which the gate lines, the drain lines and the pixel electrodes are formed.

7. The liquid crystal display device according to claim 1, wherein the counter electrodes are formed over the first insulation layer, the counter electrodes extend to neighboring pixel regions by crossing the drain lines and are connected to the reference electrode layers of the neighboring pixel regions via through holes formed in the first insulation layer.

8. The liquid crystal display device according to claim 1, wherein the counter electrodes are formed over an organic insulation layer, conductive layers which extend to neighboring pixel regions by crossing the drain lines are formed over a gate insulation layer, the counter electrodes are connected to the conductive layers via through holes formed in the gate insulation layer, and the conductive layers are connected to the reference electrode layer via through holes formed in the first insulation layer.

9. The liquid crystal display device according to claim 1, wherein the counter electrodes are formed over a passivation layer, conductive layers which extend to neighboring pixel regions by crossing the drain lines are formed over a gate insulation layer, the counter electrodes are connected to the conductive layers via through holes formed in the passivation layer and the gate insulation layer, and the conductive layers are connected to the reference electrode layer via through holes formed in the first insulation layer.

10. The liquid crystal display device according to claim 1, wherein a color filter layer is formed between the reference electrode layer which is formed below the first insulation layer and the first substrate.

11. The liquid crystal display device according to claim 1, wherein the counter electrodes are formed over the first insulation layer parallel to an extension direction of the gate lines, the counter electrodes extend over pixel regions, and the counter electrodes are connected to reference electrodes in respective pixel regions via through holes formed in the first insulation layer.

12. The liquid crystal display device according to claim 1, wherein the counter electrodes are connected to reference electrodes in respective pixel regions via through holes penetrating the first insulation layer and a gate insulation layer, and holding capacities are formed at overlapping portions of the counter electrodes and the pixel electrodes.

13. In the constitution according to claim 1, the pixel electrodes are formed over the gate insulation layer, the counter electrodes are formed below the gate insulation layers, the counter electrodes are connected to the reference electrodes via through holes formed in the first insulation layer, and holding capacities are formed by the counter electrodes and the pixel electrodes.

14. In the constitution according to claim 1, the pixel electrodes and the counter electrodes are formed on the same layer.

15. In the constitution according to claim 1, the counter electrodes are formed over the pixel electrodes and are connected to the reference electrodes by way of through holes formed in a gate insulation film and a first insulation film.

16. In the constitution according to claim 1, the first insulation layer is formed of an organic insulation layer.

* * * * *